| Ai CONT | Qi CONT | Xi CONT | Ti CONT | ICT CONT | ADB CONT | DA CONT | AR CONT | | |
|---|---|---|---|---|---|---|---|---|---|
| A1 | Q1 | X1 | | "0" | "0" | DA1 | "0" | R$_{sw}$ 1 | |
| A2 | Q2 | X2 | | "0" | "0" | DA2 | "0" | R$_{sw}$ 2 | |
| A3 | Q3 | X3 | | "0" | ADB3 | DA3 | "0" | R$_{sw}$ 3 | |
| A4 | Q4 | X4 | | "0" | ADB4 | DA4 | "0" | R$_{sw}$ 4 | |
| A5 | Q5 | X5 | | "0" | ADB5 | DA5 | "0" | R$_{sw}$ 5 | |
| A6 | Q6 | X6 | | ICT13 | ADB6 | DA6 | AR13 | R$_{sw}$ 6 | |
| A7 | Q7 | X7 | | ICT12 | ADB7 | DA7 | AR12 | R$_{sw}$ 7 | |
| A8 | Q8 | X8 | | ICT11 | ADB8 | DA8 | AR11 | R$_{sw}$ 8 | |
| A9 | Q9 | X9 | | ICT10 | ADB9 | DA9 | AR10 | R$_{sw}$ 9 | TO ARITH UNIT |
| A10 | Q10 | X10 | | ICT9 | ADB10 | DA10 | AR9 | R$_{sw}$ 10 | |
| A11 | Q11 | X11 | | ICT8 | ADB11 | DA11 | AR8 | R$_{sw}$ 11 | |
| A12 | Q12 | X12 | | ICT7 | ADB12 | DA12 | AR7 | R$_{sw}$ 12 | |
| A13 | Q13 | X13 | TA | ICT6 | ADB13 | DA13 | AR6 | R$_{sw}$ 13 | |
| A14 | Q14 | X14 | TB | ICT5 | ADB14 | DA14 | AR5 | R$_{sw}$ 14 | |
| A15 | Q15 | X15 | TC | ICT4 | ADB15 | DA15 | AR4 | R$_{sw}$ 15 | |
| A16 | Q16 | X16 | TD | ICT3 | ADB16 | DA16 | AR3 | R$_{sw}$ 16 | |
| A17 | Q17 | X17 | TE | ICT2 | ADB17 | DA17 | AR2 | R$_{sw}$ 17 | |
| A18 | Q18 | X18 | TF | ICT1 | ADB18 | DA18 | AR1 | R$_{sw}$ 18 | |
| A19 | Q19 | | | | | DA19 | | R$_{sw}$ 19 | |
| A20 | Q20 | | | | | DA20 | | R$_{sw}$ 20 | |
| A21 | Q21 | | | | | DA21 | | R$_{sw}$ 21 | |
| A22 | Q22 | | | | | DA22 | | R$_{sw}$ 22 | |
| A23 | Q23 | | | | | DA23 | | R$_{sw}$ 23 | |
| A24 | Q24 | | | | | DA24 | | R$_{sw}$ 24 | |
| A25 | Q25 | | | | | DA25 | | R$_{sw}$ 25 | |
| A26 | Q26 | | | | | DA26 | | R$_{sw}$ 26 | |
| A27 | Q27 | | | | | DA27 | | R$_{sw}$ 27 | TO ARITH UNIT |
| A28 | Q28 | | | | | DA28 | | R$_{sw}$ 28 | |
| A29 | Q29 | | | | | DA29 | | R$_{sw}$ 29 | |
| A30 | Q30 | | | | | DA30 | | R$_{sw}$ 30 | |
| A31 | Q31 | | | | | DA31 | | R$_{sw}$ 31 | |
| A32 | Q32 | | | | | DA32 | | R$_{sw}$ 32 | |
| A33 | Q33 | | | | | DA33 | | R$_{sw}$ 33 | |
| A34 | Q34 | | | | | DA34 | | R$_{sw}$ 34 | |
| A35 | Q35 | | | | | DA35 | | R$_{sw}$ 35 | |
| A36 | Q36 | | | | | DA36 | | R$_{sw}$ 36 | |

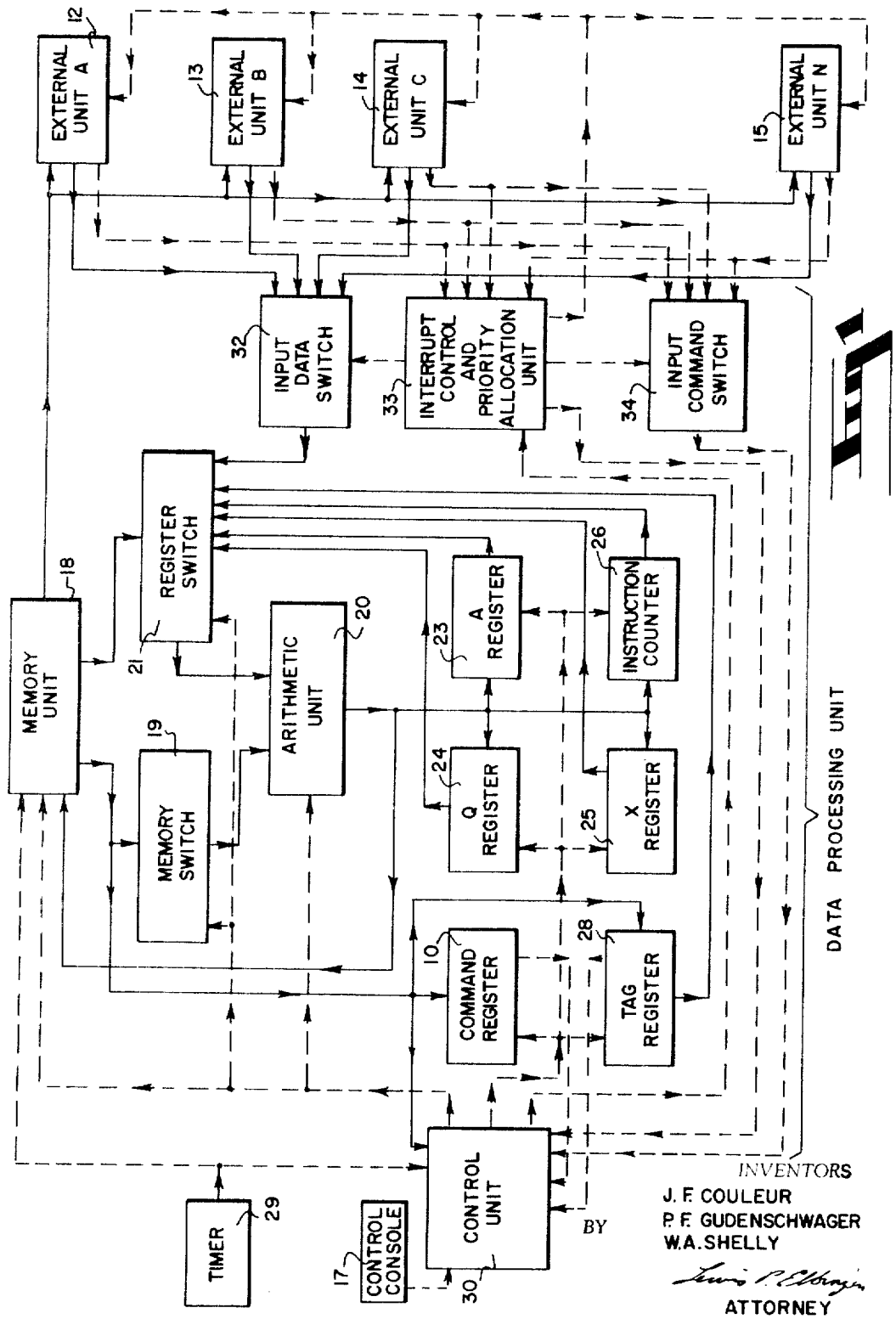

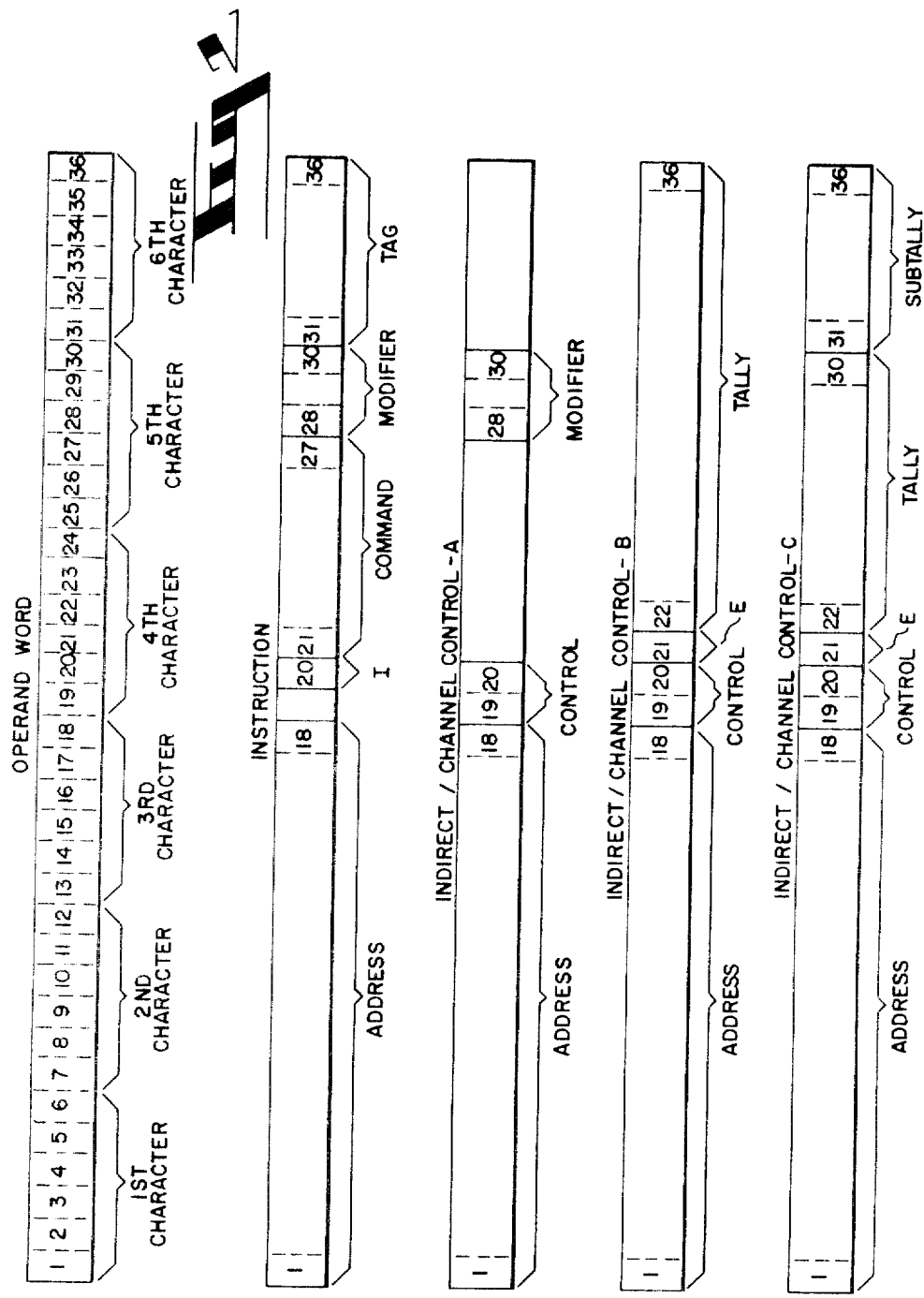

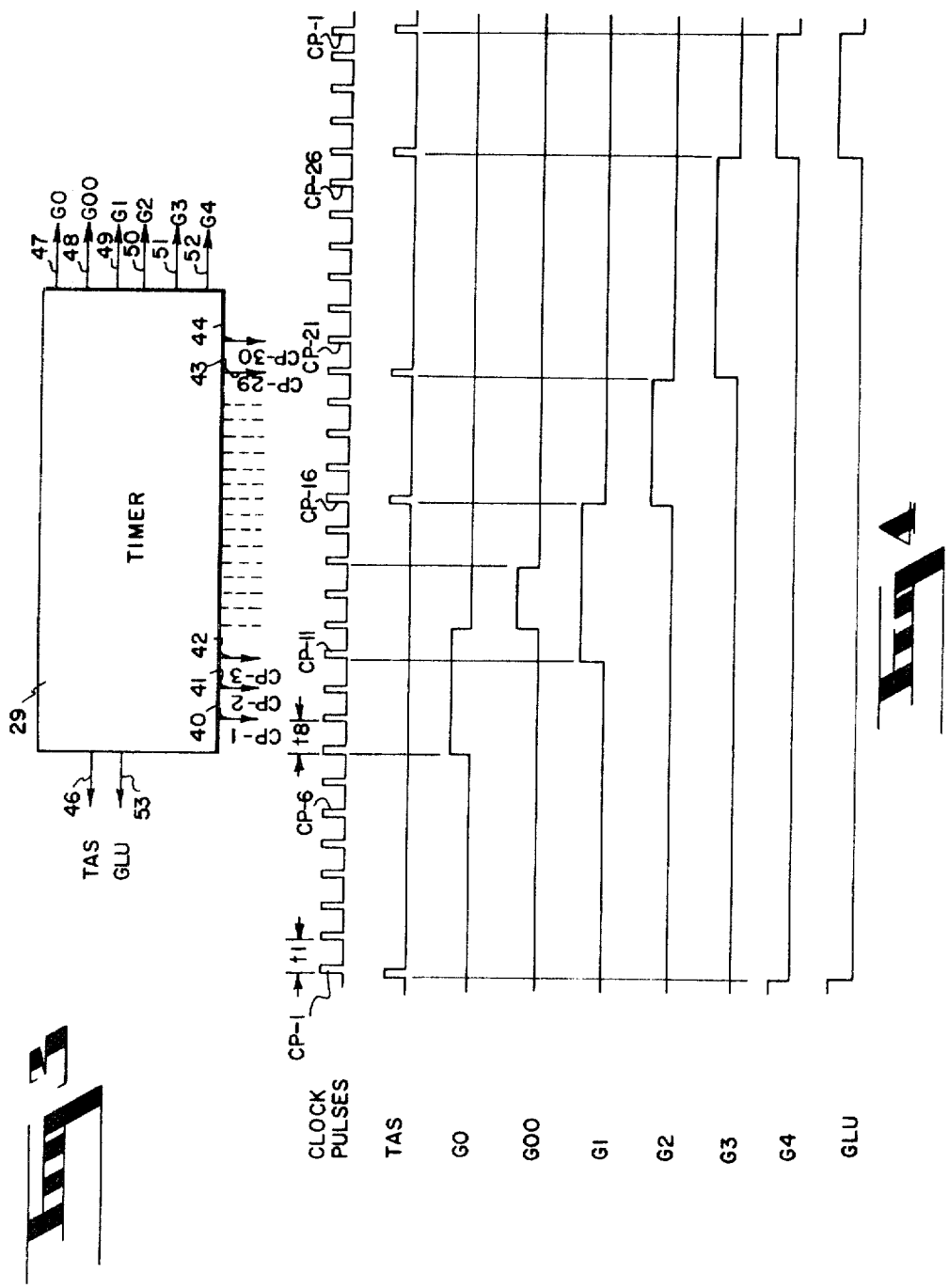

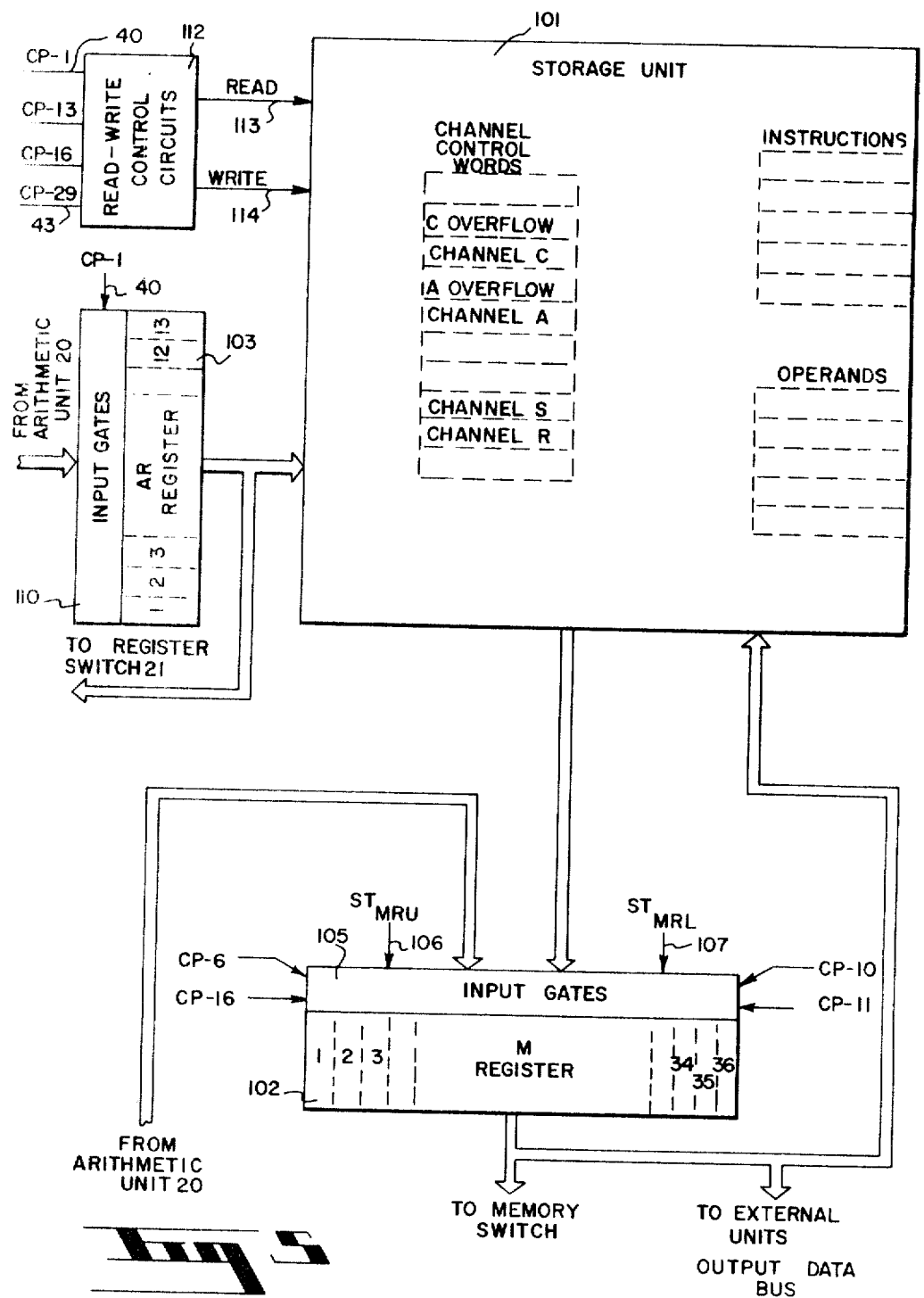

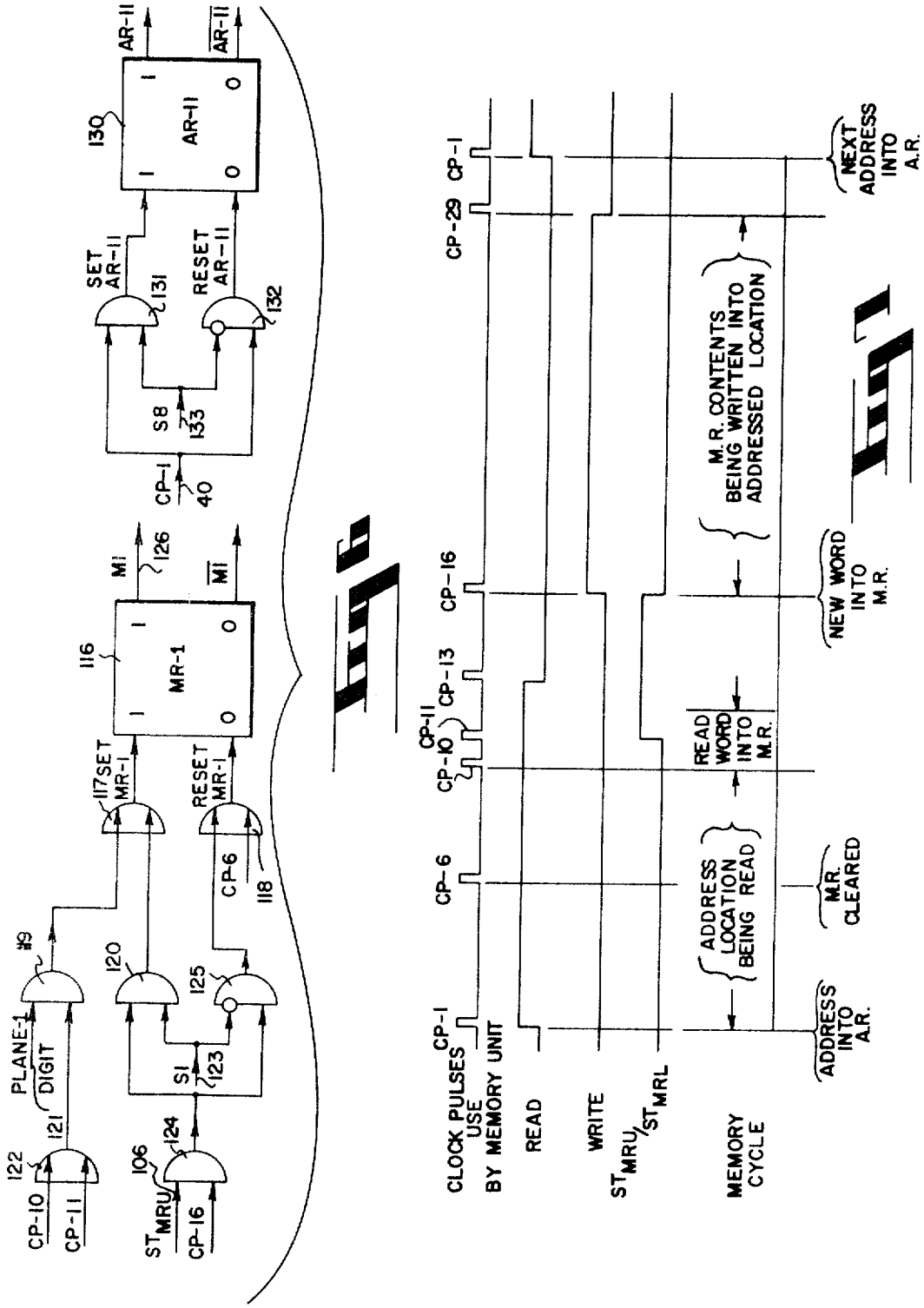

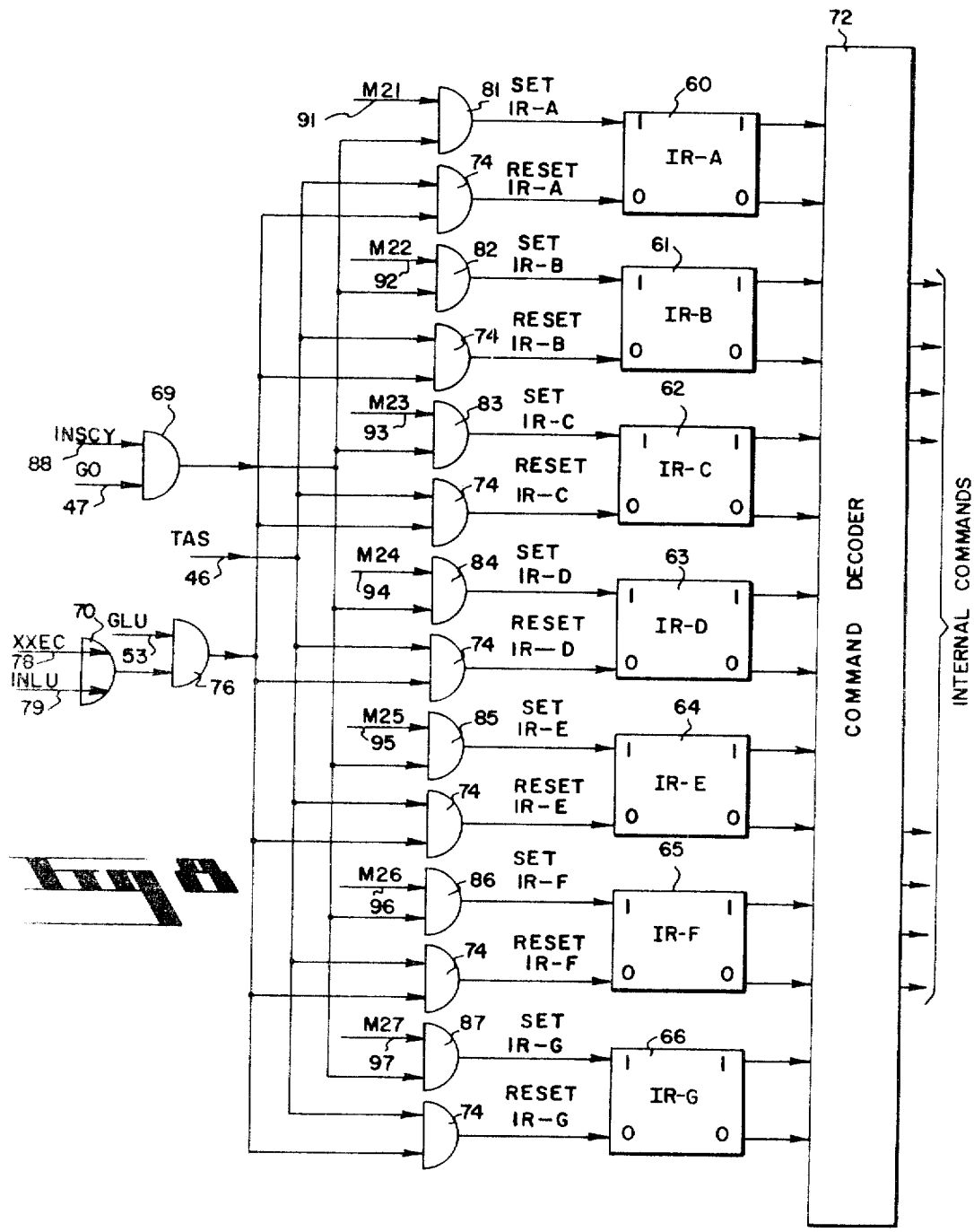

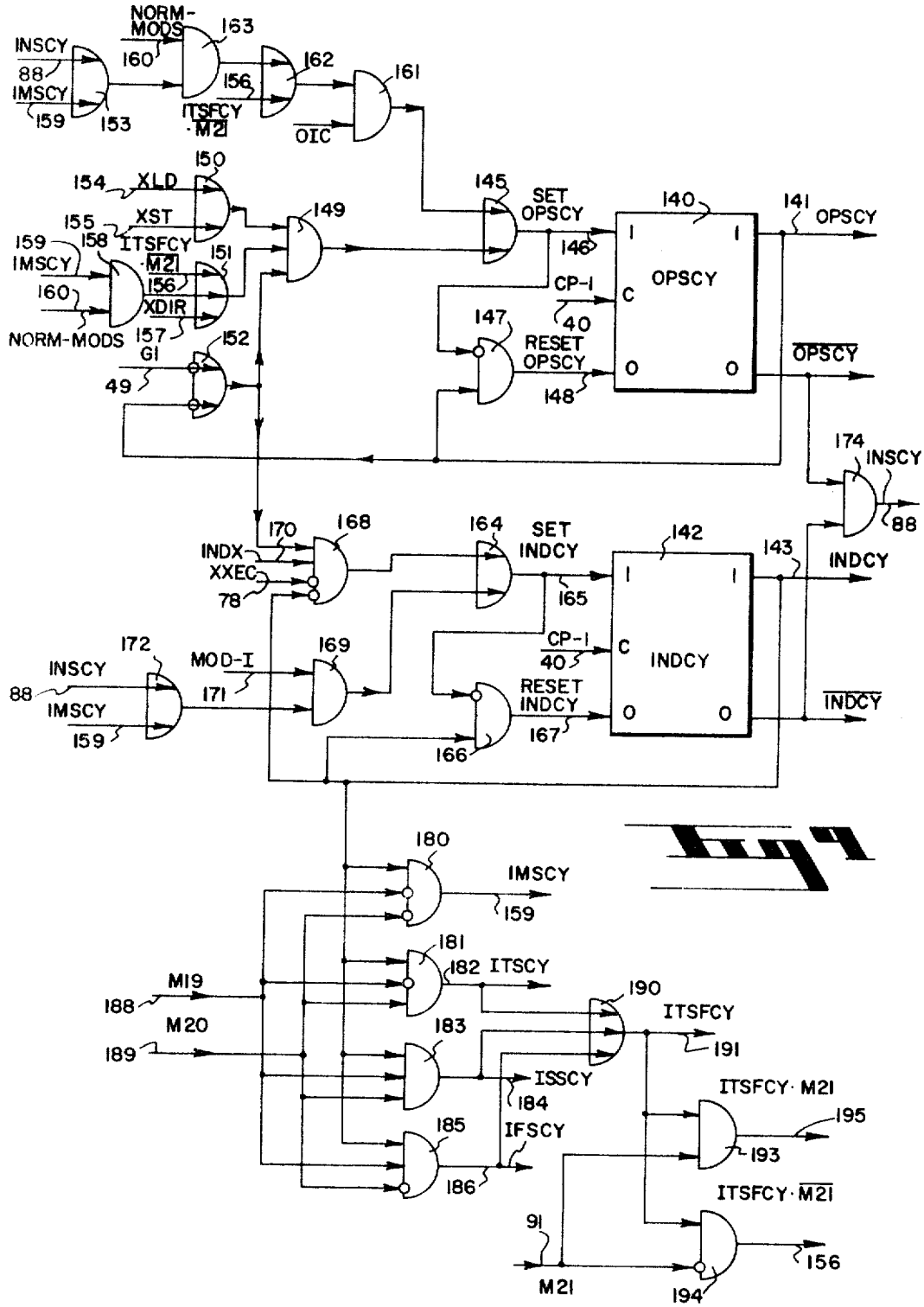

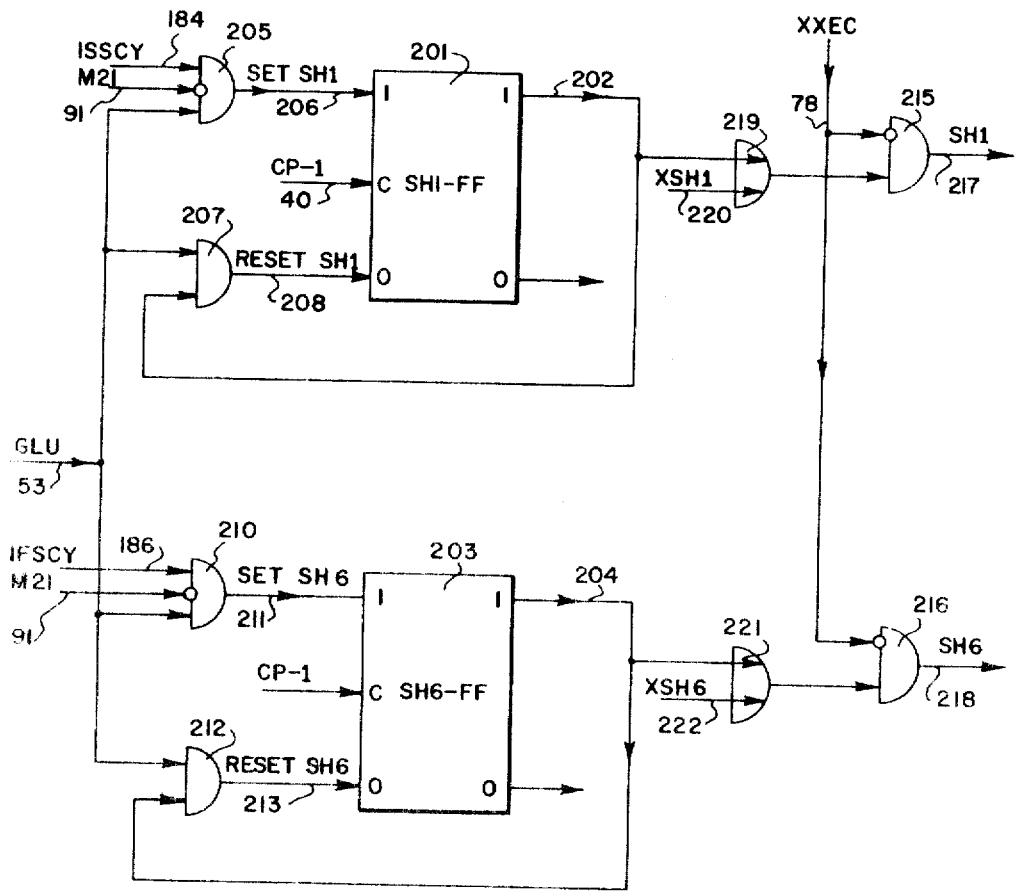

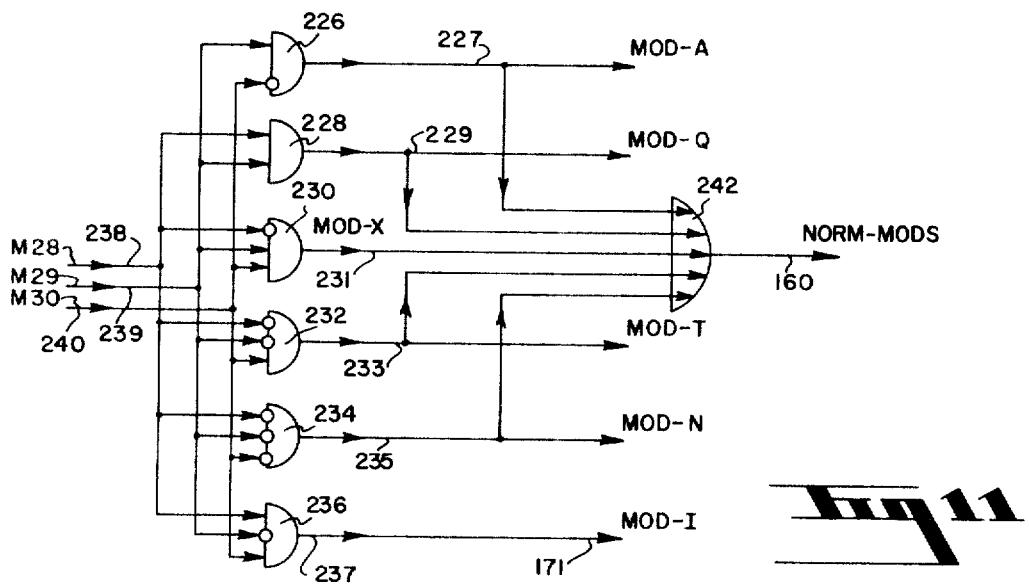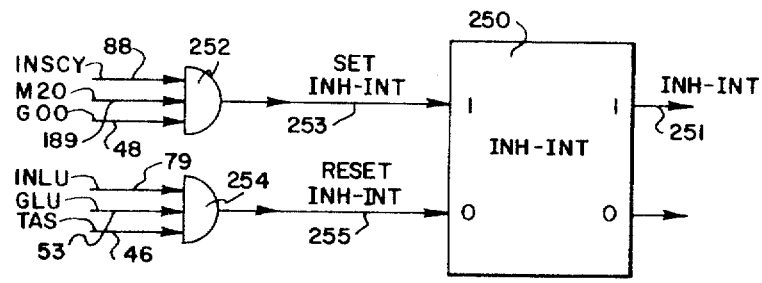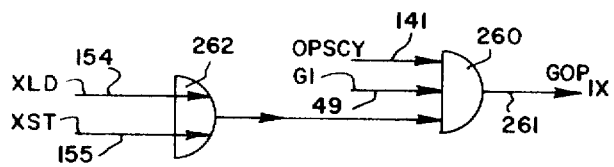

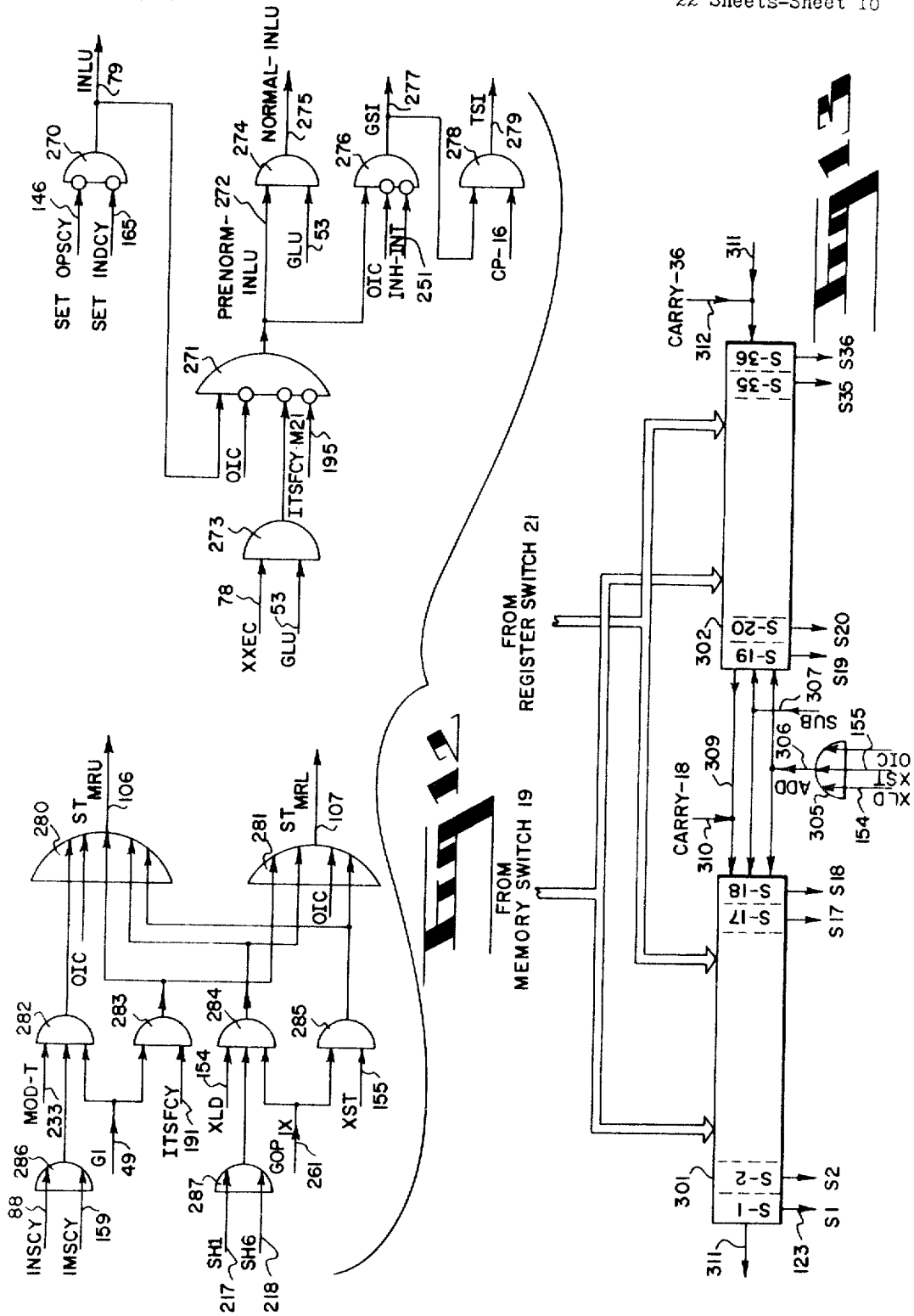

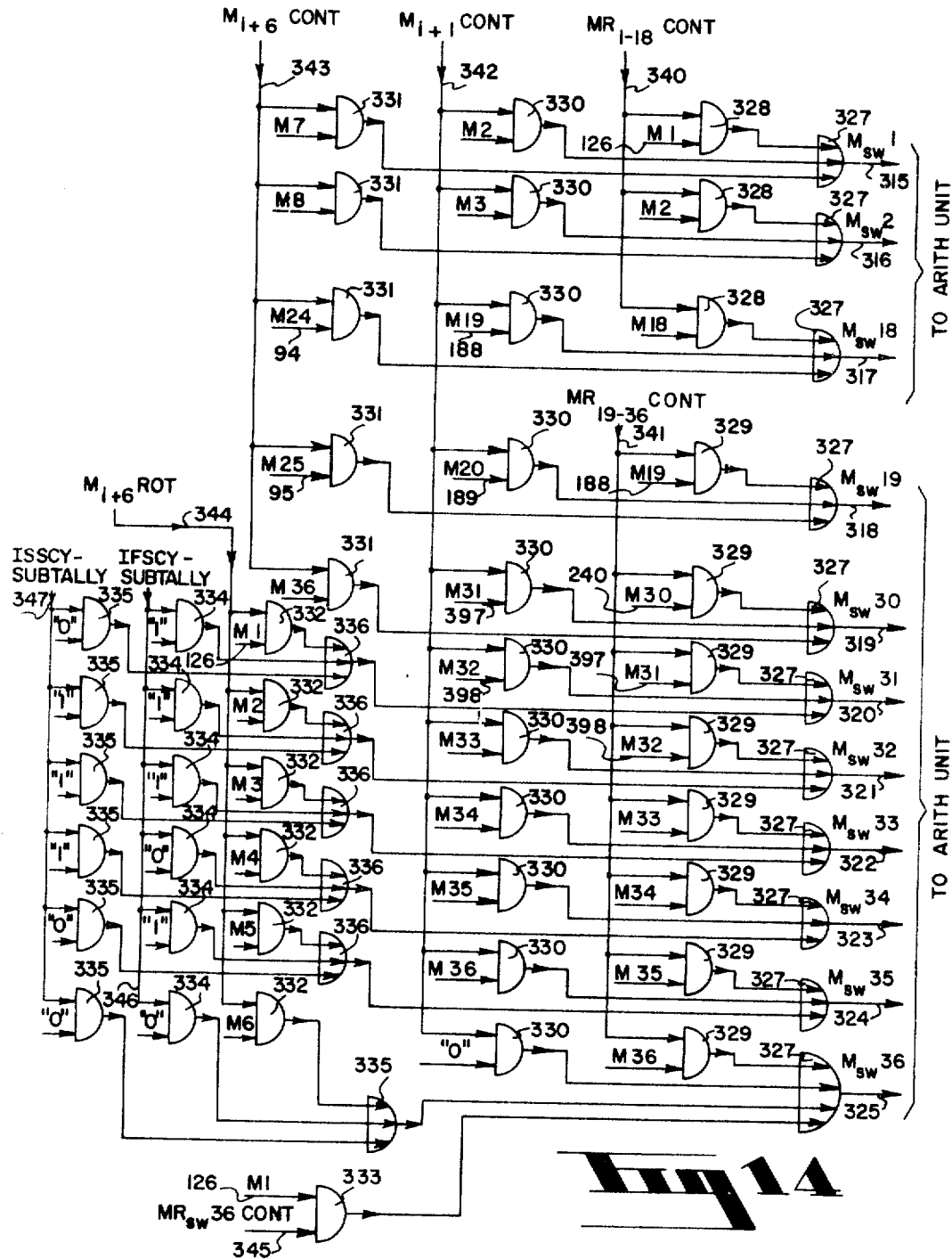

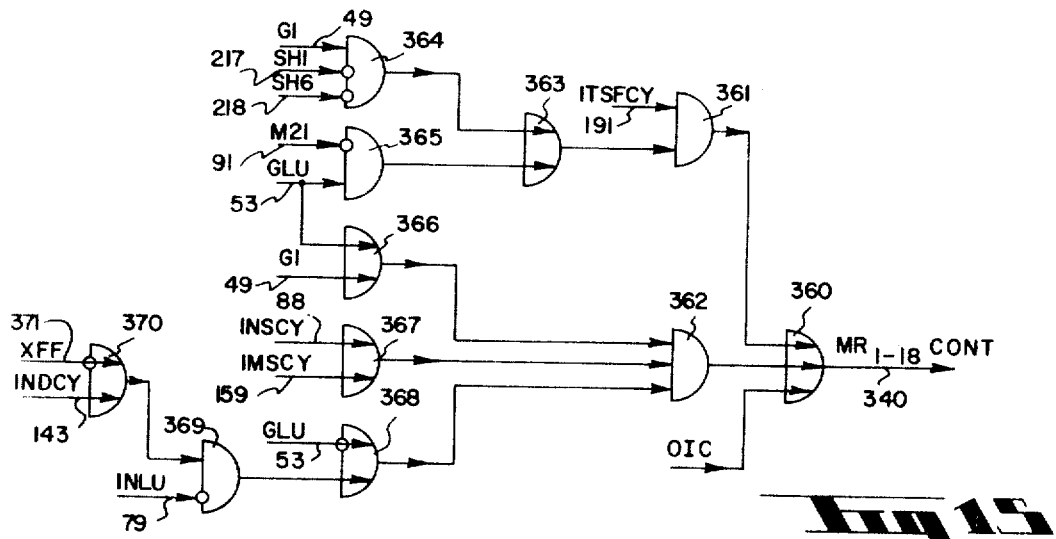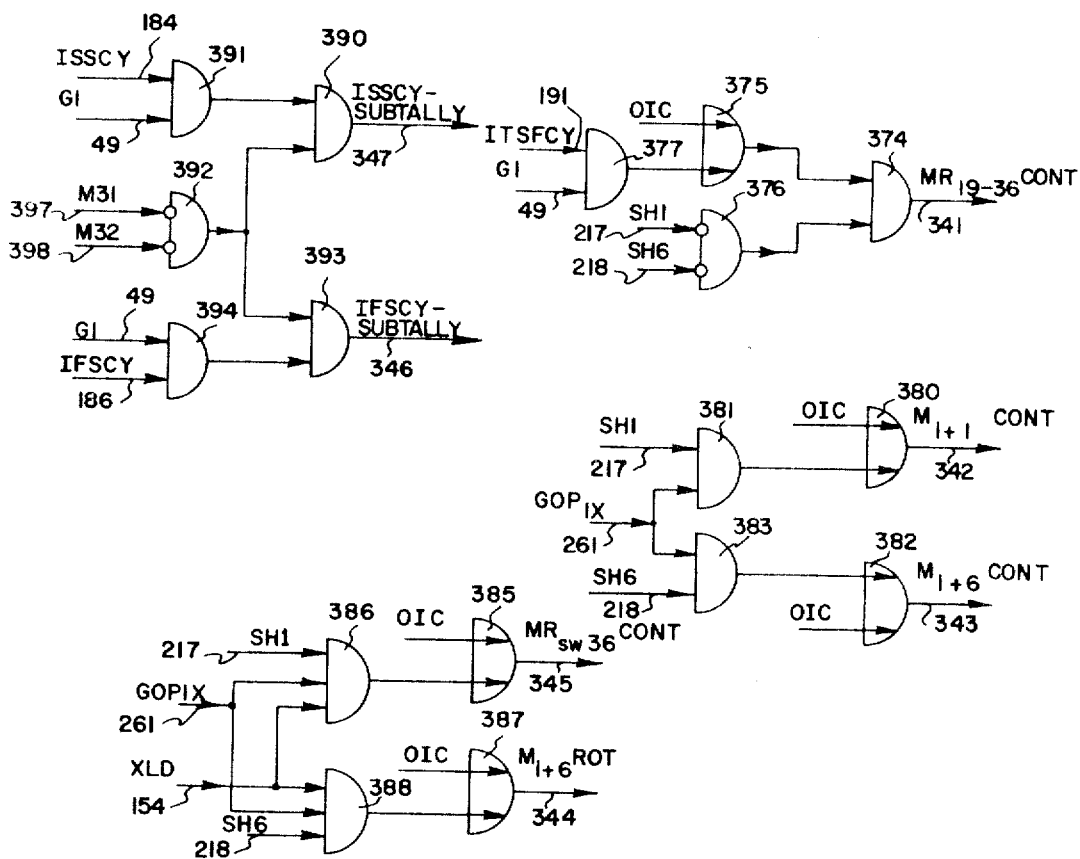

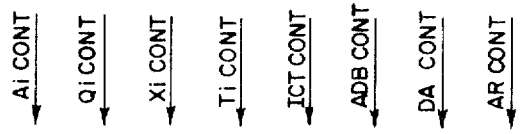

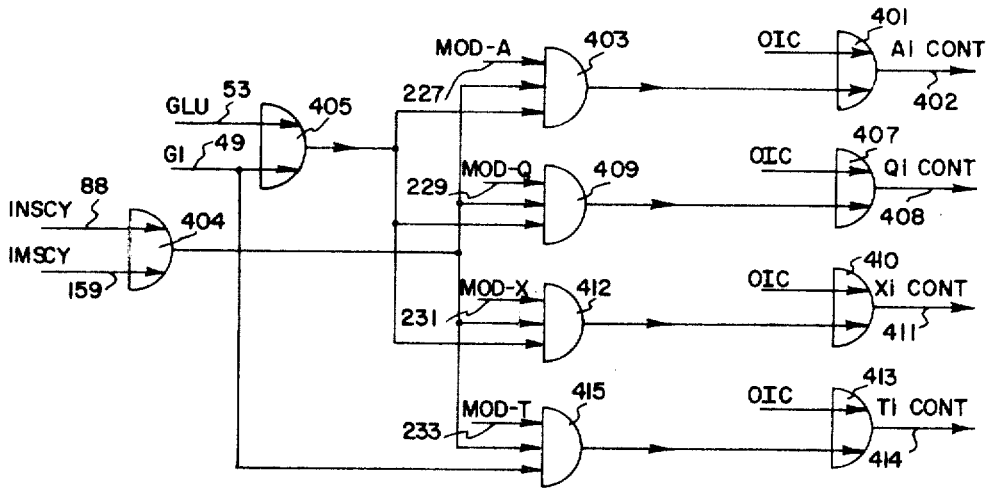
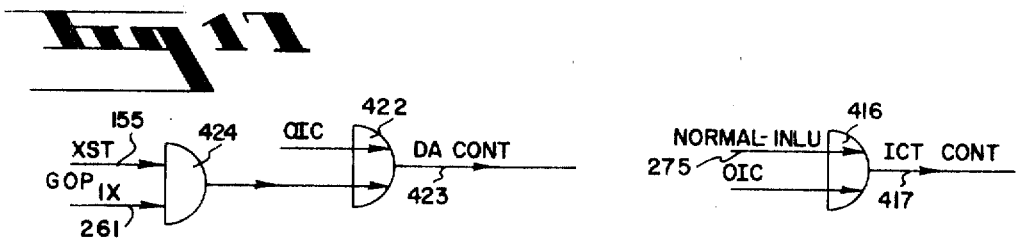
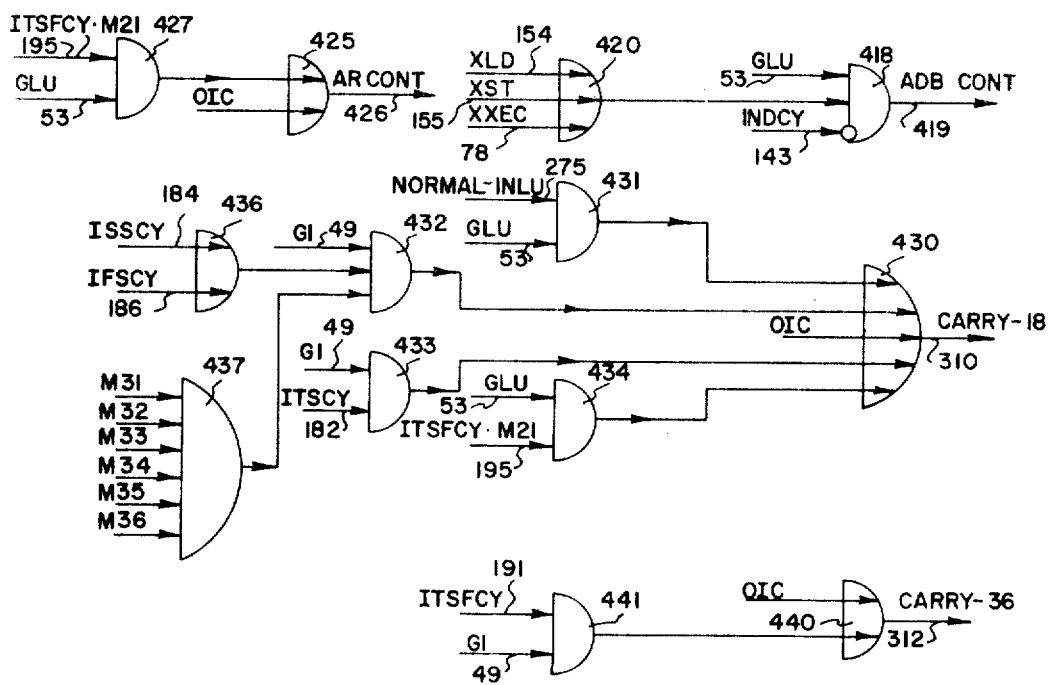

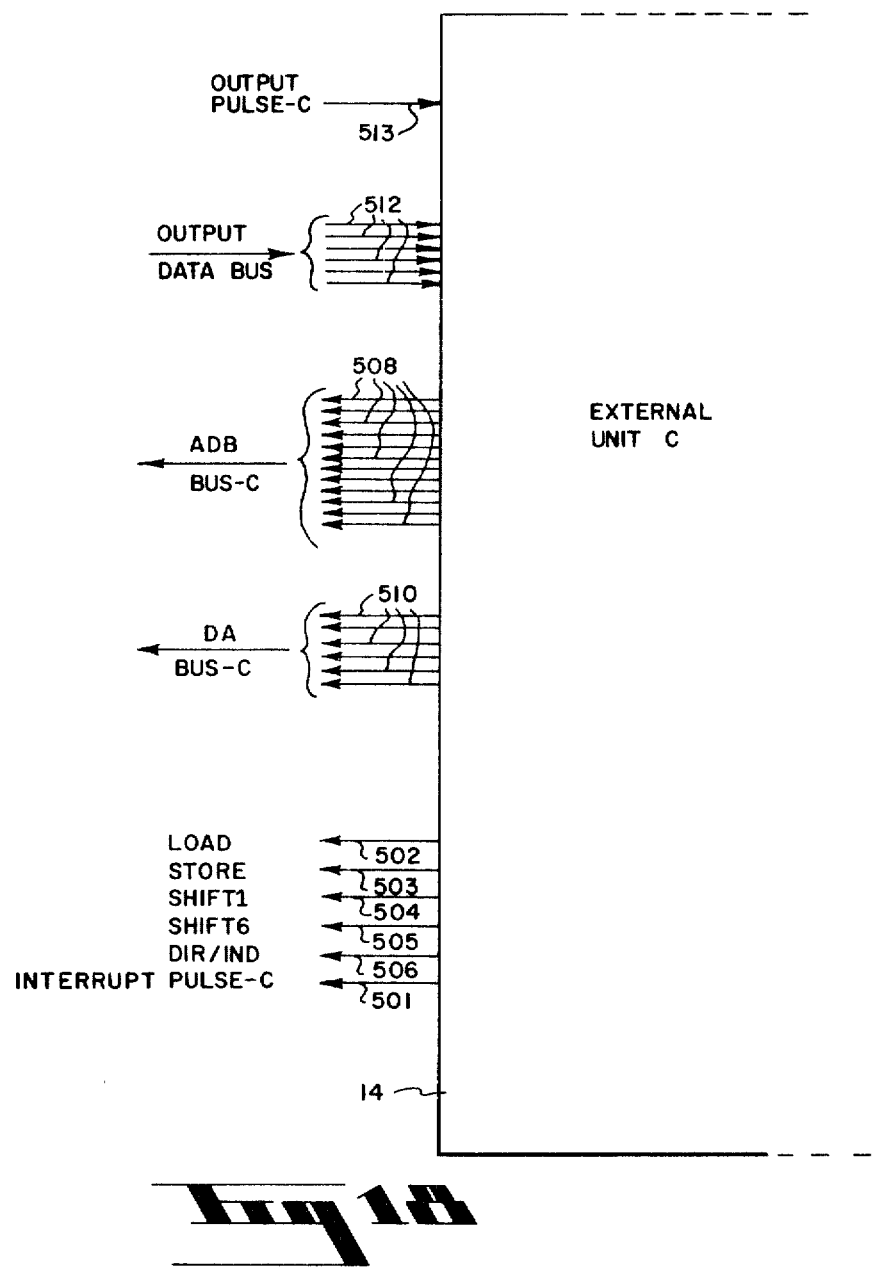

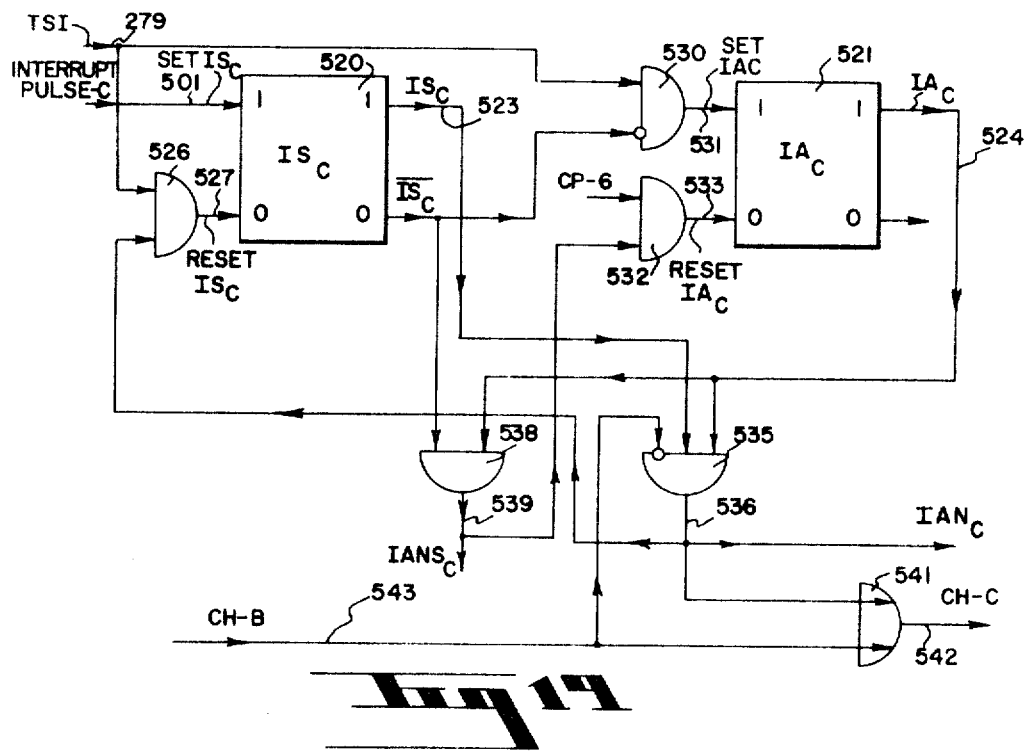
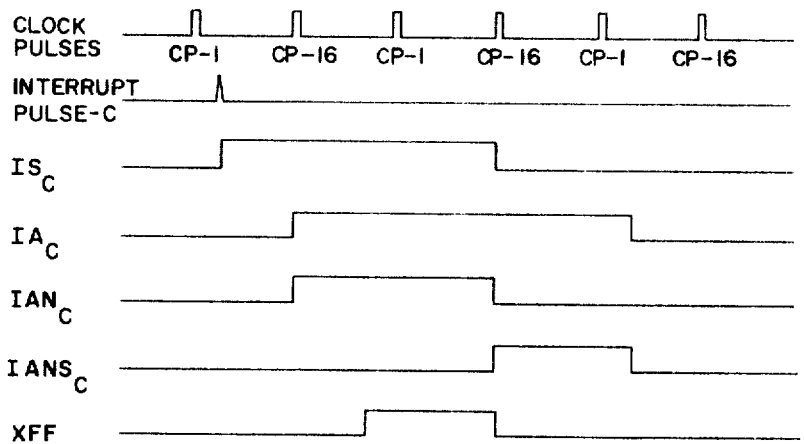

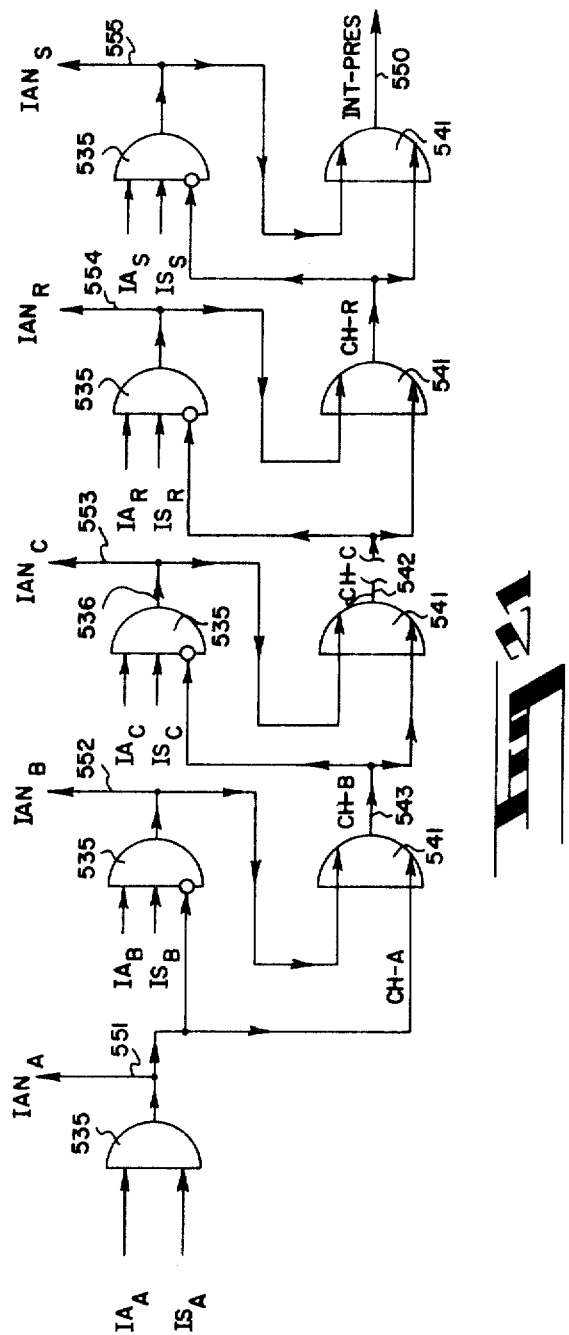

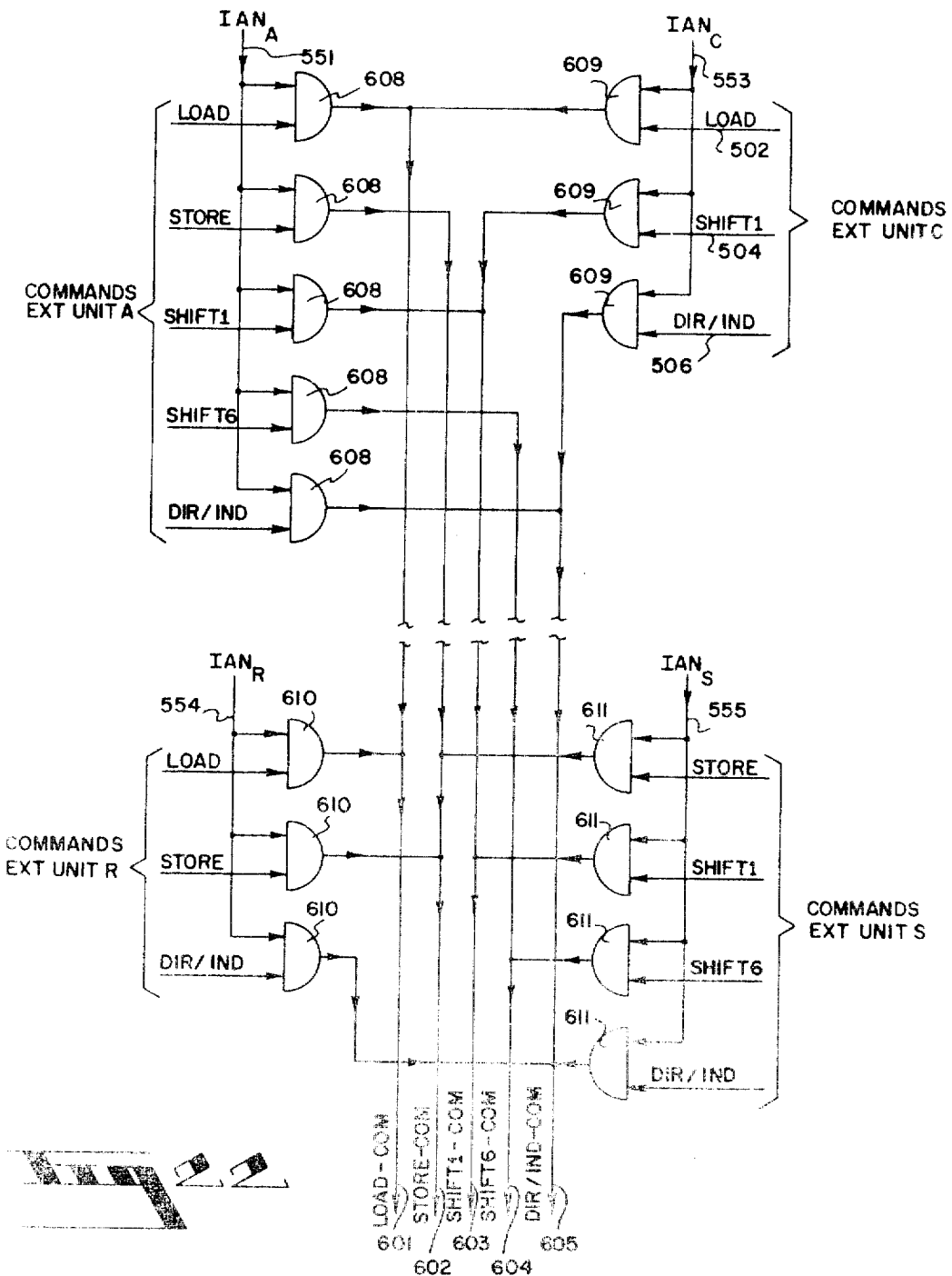

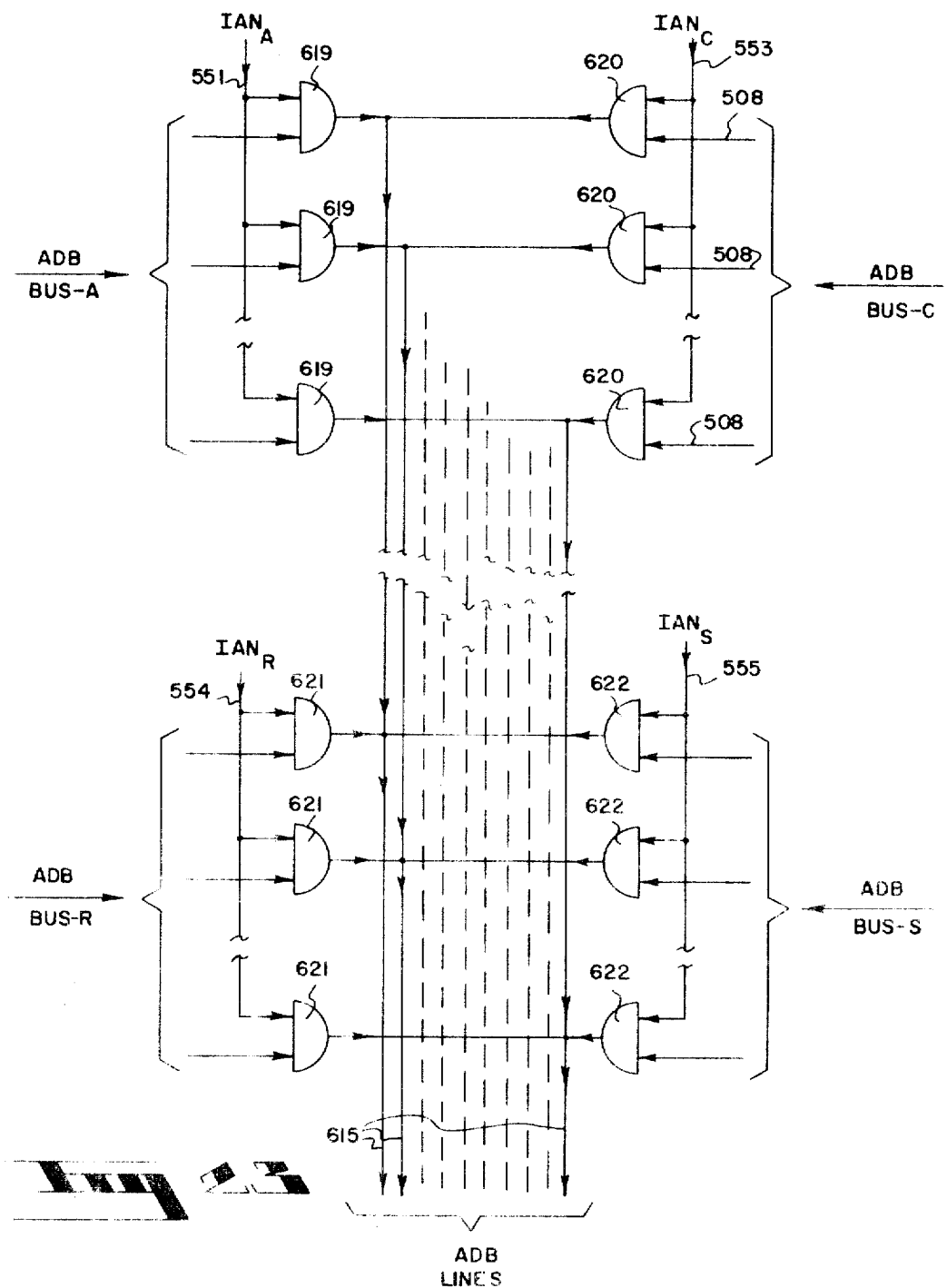

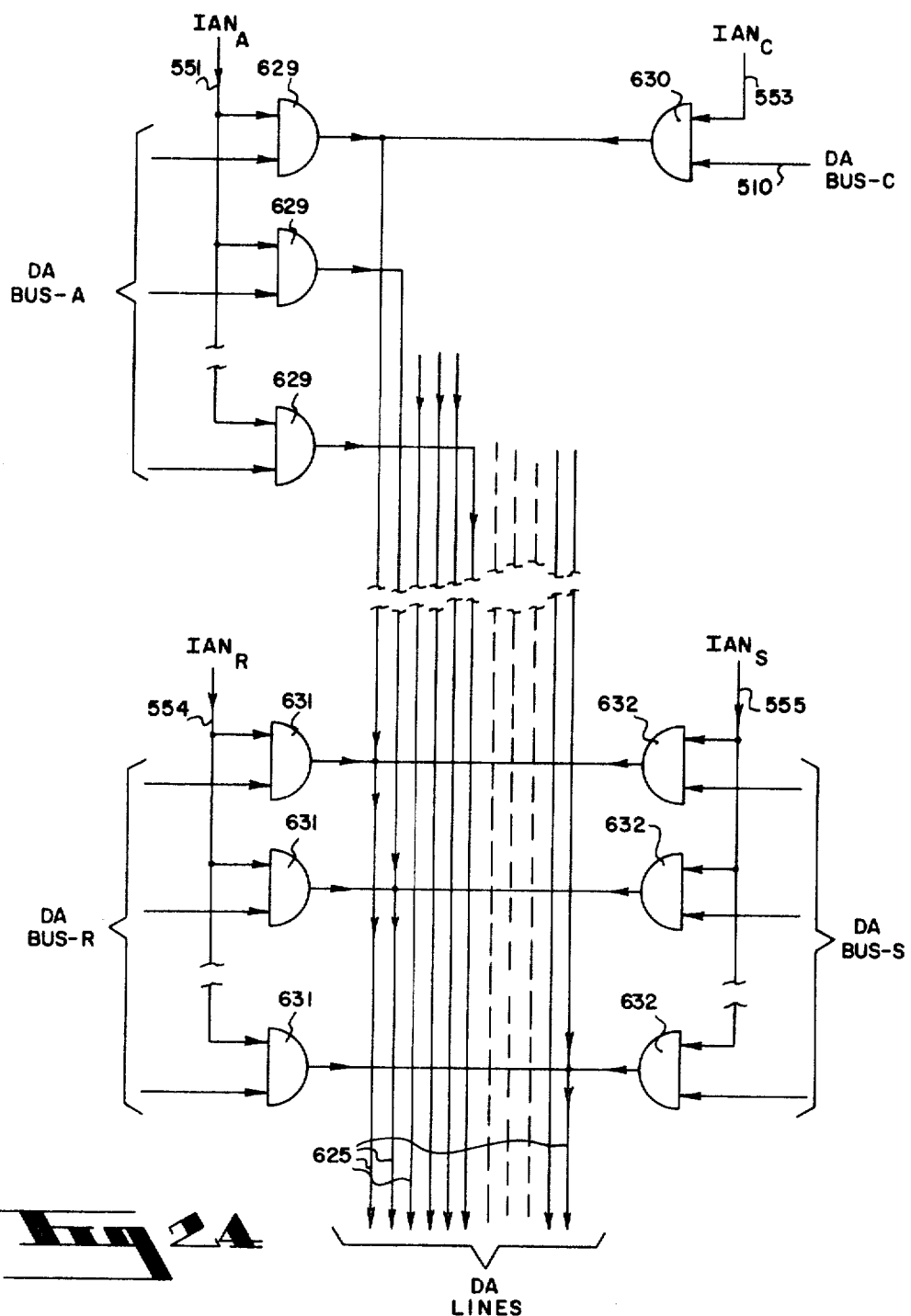

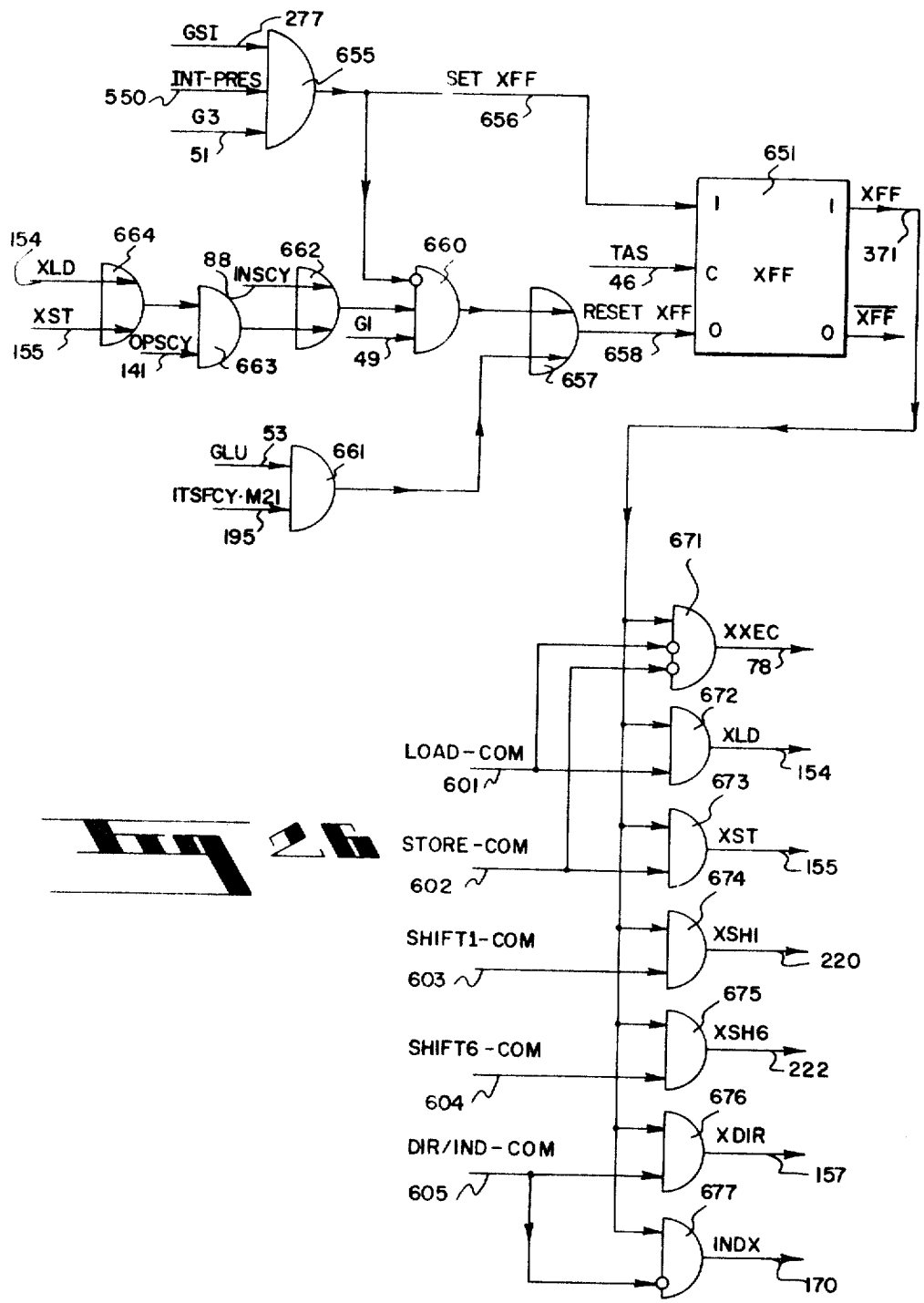

United States Patent Office 3,308,443
Patented Mar. 7, 1967

3,308,443
DATA PROCESSING UNIT FOR PROVIDING SERIAL OR PARALLEL DATA TRANSFER UNDER SELECTIVE CONTROL OF EXTERNAL APPARATUS
John F. Couleur, Philip F. Gudenschwager, and William A. Shelly, Phoenix, Ariz., assignors to General Electric Company, a corporation of New York
Filed May 4, 1964, Ser. No. 364,738
9 Claims. (Cl. 340—172.5)

This invention relates to information processing apparatus and more particularly to apparatus for processing at high speeds data received from a plurality of lower speed external devices.

In the processing of data, various arithmetic, logical, or data transfer operations are performed on data items by a data processing unit, the unit being adapted to execute a sequence of these operations in a very short period of time. Each data item comprises a plurality of data digits. These data items are supplied by external units, which include peripheral apparatus, such as magnetic tape and disc storage devices, punched card readers, and electric typewriters and remote apparatus, such as other data processing apparatuses, radar stations, and radio telemetry transmitters. The processed data is received by external units, which include peripheral apparatus such as magnetic tapes and disc storage devices, card punches, and printers and remote apparatus, such as other data processing apparatuses and radio guidance systems. To maintain a rapid rate of execution of these operations, the data processing unit must be able to obtain data items immediately when needed and to store the items immediately after processing. Rapid supply and storage of data items is provided by a high-speed random access memory.

The random access memory operates at a rate of speed compatible with that of the data processing unit, rapidly supplying a data item required by the data processing unit or rapidly storing a data item processed by the data processing unit. These data items are held in respective addressable storage locations in the memory and a data item is retrieved from or stored in a storage location identified by an address. Additionally, the random access memory holds in a group of storage locations thereof instructions for controlling the sequence of operations to be executed by the data processing unit. An instruction normally comprises a command portion for designating the specific type of arithmetic, logical or data transfer operation to be performed and an address portion identifying the storage location in the memory to be involved in the specific operation.

The data processing unit, prior to processing data received from each of a plurality of lower speed external devices, transfers the data as received into a respective first group of storage locations in the memory. When a predetermined amount of data received from an external device has been stored in the corresponding first storage location group, means is provided to notify the data processing unit, whereupon this data is transferred to a second group of storage locations from which the data is processed. The data results of such processing are then stored in one of a third group of storage locations, a third group being provided for each of the external devices adapted to receive data from the data processing unit.

A high-speed data processing unit of the type described is a complex and costly apparatus. A factor tending to increase the complexity and cost of the data processing unit is that the external devices, although operating at speeds much lower than the data processing unit, also operate at a plurality of mutually different speeds. Additionally, each such external device usually supplies or receives data at a rate asynchronous with respect to the operating rate of the data processing unit. Accordingly, it is common practice for each external device, upon requiring communication with the data processing unit for transferring data to or for receiving data from the memory, to provide a signal, known as an interrupt signal, for notifying the data processing unit of the respective communication requirement. The data processing unit must respond to the interrupt signal by interrupting its normal sequence of data processing operations and granting communication to the external device for effecting the requisite data transfer. However, inasmuch as the external devices operate at different speeds, some cannot wait as long as others before being granted communication with the memory. Therefore, the data processing unit must also provide apparatus for allocating a different priority to each external device, and for recognizing such priorities by granting communication first to the external device allocated highest priority when more than one device requires communication.

Several other factors affect the complexity of the described apparatus as follows: (a) An external device may be adapted either to supply or to receive data at a given time. (b) An external device may be adapted to supply or receive at one time one data digit, a set of digits, or an entire data item. (c) Successive data items supplied by an external device must be transferred to different storage locations of a corresponding first group of locations prior to transfer of the data from this first group to a second group of locations for processing, and successive data items received by an external device must be received from different storage locations of a corresponding third group of locations until these locations are resupplied with processed data. Accordingly, not only must the data processing unit provide means for granting communication to the highest priority external device currently requiring communication, but it must provide for the selective transmittal or reception of data for the external device; it must provide for the transfer of one data digit, a set of digits, or an entire data item during the communication granted; and it must provide that the data be transferred from or to the correct storage location during each communication for the particular external device.

In prior art devices, it has been the practice to store complete control information in the data processing unit, such as in the random access memory thereof, for each external device. Such information represents, for each external device, the direction of communication to be required, the quantity of data to be transferred, and the storage location address to be involved in each communication. Upon recognition of the highest priority external device requiring communication, the data processing unit executes a series of operations to first retrieve the control information for this external unit, and from such control information to initiate a command for providing the appropriate direction for data transfer between the data processing unit and the external device, to activate control circuits to provide for transfer of the requisite number of digits, and to process address-representing control information to provide the correct storage location to be involved in the data transfer. Additionally, the series of operations has to provide for making and updating a record of the number of particular type data transfers executed for each external unit. These records supply information as to when the corresponding first group of storage locations is filled or third group of storage locations is emptied by the external device, so that the data processing unit can respectively empty or fill these groups for subsequent employment by the respective external unit.

A prior art data processing unit constructed to automatically execute these operations for providing the requisite communication is unusually complex and costly. Additionally, the time required to perform these operations reduces the effective speed of the data processing unit for processing data. On the other hand, a prior art data processing unit which performs these operations by executing a corresponding series of instructions must sacrifice memory storage space required for normal data processing operations in order to hold the large set of instructions required, or the unit must be provided with a larger memory. Additionally, this latter type of data processing unit has its effective data processing speed considerably reduced due to the time required to retrieve all required instructions of the set from the memory and to execute such instructions. It is therefore desirable to provide apparatus for freeing the data processing unit of the costly and time-consuming burden of preparing for the particular type of data transfer required by each external device whenever one of a plurality of external devices requires communication with the data processing unit.

Therefore, it is an object of this invention to provide improved apparatus for providing communication between a data processing unit and a plurality of slower operating external devices.

Another object of this invention is to provide apparatus for employment with a data processing unit communicating with a plurality of slower operating external devices for freeing the data processing unit of the costly and time-consuming burden of preparing for one of the many types of data transfer which may be required when an external device requires communication with the data processing unit.

Another object of this invention is to provide rapidly responding, inexpensive, simple and reliable apparatus for providing each one of a plurality of types of communication between a data processing unit and a plurality of external devices.

Another object of this invention is to provide apparatus for effecting communication between a data processing unit and an external device, wherein the external device is adapted to selectively control the type of data transfer to be employed in the communication.

The foregoing objects are achieved by providing an information processing system wherein information control signals are supplied by an external device required to communicate with a data processing unit, such control signals indicating the required direction of data transfer for communication, whether data digits are to be transferred serially or simultaneously, and the address of the storage location involved in such transfer. Each external device, when preparing to communicate with the data processing unit, delivers a first signal denoting that data is to be transferred from the external device to the memory or a second signal denoting that data is to be transferred from the memory to the external device. The external device also delivers a first set of signals denoting whether one data digit of a data item, a set of data digits of a data item, or an entire data item is to be transferred during the communication period granted to the external unit. Additionally, the external device delivers a second set of signals representing either the address of a storage location in a first group of storage location for receiving unprocessed data from the external device, if data is to be received by the memory, or the address of a storage location in a third group of storage locations holding processed data, if data is to be received by the external device. Upon granting communication to an external device, the data processing unit halts execution of its normal sequence of instructions and responds directly to the information signals supplied by the external device to transfer one data digit, a set of data digits, or a data item between the external device and the storage location represented by the address signals supplied, the direction of transfer also being controlled by the information signals. Accordingly, the information processing system of the instant invention frees the data processing unit of the costly and time-consuming burden of preparing signals to control the particular type of communication required by the particular external device granted communication.

DESCRIPTION OF DRAWINGS

This invention will be described with reference to the accompanying drawings wherein:

FIGURE 1 is a block diagram of a data processing system embodying the instant invention;

FIGURE 2 is a symbolic diagram of the contents of the various data words employed in the system of FIG. 1;

FIGURE 3 is a block diagram representing the Timer of the system;

FIGURE 4 illustrates waveforms of the various signals supplied by the Timer;

FIGURE 5 is a block diagram of the Memory Unit;

FIGURE 6 is a schematic diagram of details of the M register and AR Register of the Memory Unit;

FIGURE 7 illustrates waveforms and a timing diagram useful in explaining the mode of operation of the Memory Unit;

FIGURE 8 is a schematic diagram of details of the Command Register;

FIGURE 9 is a schematic diagram of details of the portion of the Control Unit which controls the phases of operation;

FIGURE 10 is a schematic diagram of details of the portion of the Control Unit which controls shifting of data in certain phases of operation;

FIGURE 11 is a schematic diagram of details of portions of the Control Unit which provide various signals, including signals for address modification and for interrupt inhibiting;

FIGURE 12 is a schematic diagram of details of portions of the Control Unit which provide for generation of various control signals;

FIGURE 13 is a block diagram of the Arithmetic Unit;

FIGURE 14 is a schematic diagram of the Memory Switch;

FIGURE 15 is a schematic diagram of details of portions of the Control Unit which provide control signals for the Memory Switch of FIG. 14;

FIGURE 16 is a symbolic diagram of the Register Switch;

FIGURE 17 is a schematic diagram of details of portions of the Control Unit which provide control signals for the Register Switch of FIG. 16 and the Arithmetic Unit;

FIGURE 18 is a symbolic diagram illustrating signals received and transmitted by an External Unit;

FIGURE 19 is a schematic diagram of an Interrupt Cell of the Interrupt Control and Priority Allocation Unit;

FIGURE 20 illustrates waveforms useful in explaining the mode of operation of the Interrupt Cell;

FIGURE 21 is a schematic diagram of the Priority Chain of the Interrupt Control and Priority Allocation Unit;

FIGURE 22 is a schematic diagram of the Input Command Switch;

FIGURE 23 is a schematic diagram of a portion of the Input Data Switch;

FIGURE 24 is a schematic diagram of another portion of the Input Data Switch;

FIGURE 26 is a schematic diagram of details of portions of the Control Unit which provide for controlling the Data Processing Unit when it is interrupted by an External Unit.

DATA PROCESSING SYSTEM—GENERAL

Figure 25:
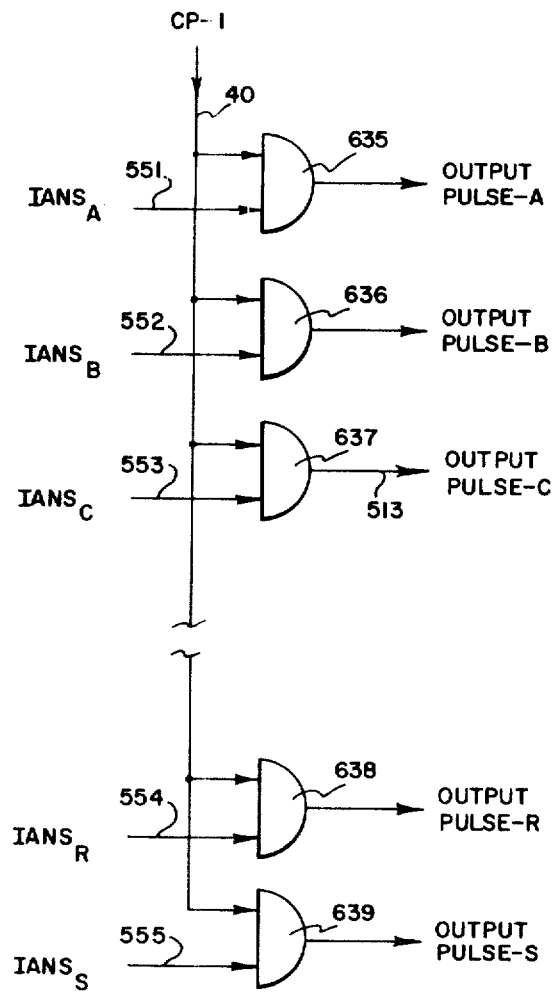
FIGURE 25 is a schematic diagram of the Output Pulse Switch of the Interrupt Control and Priority Allocation Unit.

The Data Processing System of FIG. 1 is adapted to process data under the operational control of a Command Register 10 or one of a plurality of external data handling units, such as External Units 12, 13, 14 and 15. The lines interconnecting the various components illustrated in FIG. 1 symbolically represent paths of data and control communication. Thus, the solid lines represent paths of data communication between the components and the dashed lines represent paths for the transfer of control signals between the components.

The System responds to a plurality of distinct commands to execute a plurality of corresponding operations on data, these commands being supplied in sequential order to Command Register 10, or being supplied by each one of External Units 12–15. The portion of the Data Processing System of FIG. 1 directed to receiving data for processing, processing data, and transmission of processed data is identified herein as the Data Processing Unit. Thus, in FIG. 1, all components, except External Units 12–15, comprise the Data Processing Unit.

The Data Processing Unit comprises a Control Console 17, which provides an indicating and control station for the operator, whereby the operator is provided access to the System for modification of the order of execution of the commands or for revision of data. A Memory Unit 18 stores data items, such as operands which are to be processed, operands which are the result of processing, instructions and other control words for the control of the System by Command Register 10, and channel control words for control of the System by the External Units. The remainder of the System communicates with the Memory Unit to receive therefrom and transmit thereto these operands, instructions, and control words.

All operands received from Memory Unit 18 for processing are transferred through a Memory Switch 19 to an Arithmetic Unit 20. Memory Switch 19 transfers operands directly to Arithmetic Unit 20 or shifts the relative numerical position of the elements of the operands and then transfers the shifted elements to Arithmetic Unit 20. Register Switch 21 provides another source of data items for Arithmetic Unit 20. Register Switch 21 receives portions of data items from Memory Unit 18, data items from storage registers in the Data Processing Unit, and data items from the External Units. Arithmetic Unit 20 performs arithmetic operations, such as addition or subtraction, on the data received from Memory Switch 19 and Register Switch 21 and transmits the data results to Memory Unit 18 or to one of the storage registers.

The Data Processing Unit comprises five storage registers in addition to Command Register 10; namely, A Register 23, Q Register 24, X Register 25, Instruction Counter 26, and Tag Register 28. The A Register, the Q Register, and the X Register provide temporary storage for data items currently being processed. Instruction Counter 26 stores an identification of the Memory Unit location of the next instruction to be employed and is periodically incremented so that instructions may be received in sequence from Memory Unit 18. Registers 23, 24, 25, and 26 selectively receive data results from Memory Unit 18. Command Register 10 and Tag Register 28 provide temporary storage for respective portions of instructions received directly from Memory Unit 18. The contents of registers 23, 24, 25, 26 and 28 are selectively supplied to Register Switch 21.

A timer 29 provides timing signals for timing the sequential execution of the individual steps of the operations performed by the System. A Control Unit 30 responds to signals provided by commands in Command Register 10 or to command signals provided by any one of External Units 12–15 for controlling the type of operation being executed by the System. Additionally, Control Unit 30 responds to the timing signals of Timer 29 for controlling the individual steps of each operation.

Data items to be processed by the Data Processing Unit are supplied by External Units 12–15. These External Units also receive and employ the data after it has been processed. The External Units may be, for example, magnetic tape handlers, punched card readers and punches, and electric typewriters. The External Units also may be remote stations in the System for supplying and receiving data. Data supplied by such remote External Units may include missile tracking information provided by a radar station or telemetry information representing, for example, the present conditions of a missile, such as velocity, temperature, and pressure.

Data items supplied by External Units 12–15 are transmitted to an Input Data Switch 32, which selects one of the External Units for transmission of its supplied data item through Register Switch 21, Arithmetic Unit 20, and into Memory Unit 18, Memory Unit 18 storing this data item for subsequent processing. An Interrupt Control and Priority Allocation Unit 33 receives control signals provided by the ones of External Units 12–15 currently demanding communication with the Data Processing Unit and controls Input Data Switch 32 to provide communication for the one of the External Units allocated highest priority.

Additionally, External Units 12–15 supply complete information for controlling the Data Processing Unit in its storage and processing of the data items received from the External Units and in its transmission of the processed data to the External Units. Accordingly, the External Units supply the identifications of Memory Unit locations to Input Data switch 32 and supply command signals to Input Command Switch 34. Interrupt Control 33 also controls Input Command Switch 34 to transmit to Control Unit 30 the command signals provided by the highest priority External Unit currently demanding communication with the Data Processing Unit. Control Unit 30 responds to these command signals for controlling the handling and processing of the data items supplied by the corresponding External Unit.

Thus, the Data Processing System of FIG. 1, which embodies the instant invention, receives, processes, and transmits data under control of either a centrally located Command Register or any one of a plurality of external or remote data handling units.

*Data word representation*

The Data Processing System of FIG. 1 processes data items represented by the binary code. In the binary code, each element of information is represented by a binary digit, sometimes termed a "bit," each binary digit being either a 1 or a 0. In the instant System the binary 1 may be represented by a relatively positive electrical signal, and the binary 0 by a relatively negative electrical signal.

The data item primarily employed in processing and communication is the data word. The data word comprises 36 binary digits. The first digit of the data word is termed the most significant digit (MSD) and the last digit is termed the least significant digit (LSD) of the word. The digits between the MSD and the LSD are accorded successively decreasing orders of significance. Five types of data words are employed in the System, the organization of these data words being illustrated in FIG. 2.

The operand is a data word on which an arithmetic or logical operation is performed by the System. Two types of operand words are processed, a binary numeric word and an alphanumeric word. The entire binary numeric operand represents a single number of 36 binary digits. The first binary digit of the operand is the MSD and the 36th binary digit is the LSD. The remaining binary digits are accorded successively decreasing orders of numerical significance, depending on their respective positions between the MSD and the LSD. The 36th digit of the binary numeric word represents $2^0$, and, therefore, is equal to the decimal number 1, providing the 36th digit is a binary 1. The 35th digit represents $2^1$, and is equal to the decimal number 2, provided the 35th digit is a binary 1. The 31st digit represents $2^5$, and is equal to the decimal number 32, provided the 31st digit is a binary 1. Thus, in general, the $i$th binary digit of the binary numeric type of operand represents $2^{36-i}$, if this digit is a binary 1. The $i$th binary digit represents 0 if the digit is a binary 0.

The alphanumeric operand represents six characters, each character comprising six binary digits. The alphanumeric character represents any one of the decimal numerals 0–9, any one of the letters of the alphabet, and certain other special symbols such as punctuation marks, etc. The first character is accorded the most significance and the sixth character the least significance. The remaining characters are accorded successively decreasing orders of significance, depending on their respective character positions within the operand. In a character representing a decimal numeral, the two most significant digits are each a binary 0 and the four remaining digits represent the decimal numeral. For example, the character comprising the binary digits 001001 represents the decimal numeral 9. When an alphabetic letter or another special symbol is represented by a character, at least one of the two most significant digits is a binary 1. Such six digit codes for representing alphanumeric characters are well known in the art.

The instruction is a data word representing a distinct operation to be executed by the System. The first eighteen digits of the instruction word are identified as an "address." Each such address is a numerical representation identifying a respective location in Memory Unit 18 from which a data item is to be retrieved for processing, or in which a processed data item is to be stored, in this operation to be executed. Each storage location in Memory Unit 18 is identified by a different address. The number of address digits actually employed depends on the size of the Memory Unit and, hence, the number of locations therein. The 20th digit of the instruction is identified as the I-digit. When the I-digit is a binary 1, it prevents interruption of the Data Processing Unit by the External Units 12–15.

The 21st to 27th digits of the instruction are identified as a "command." Each such command represents a specific operation to be executed by the Data Processing Unit under control of Command Register 10. Accordingly, this command is stored in Command Register 10 and decoded therein. The decoded signals supplied by Command Register 10 are applied to Control Unit 30 for controlling the type of logical or arithmetic operation being executed by the Data Processing Unit. The 28th to 30th digits of the instruction are identified as a "modifier." The employment of the modifier portion of the instruction will be described hereinafter. The 31st to 36th digits of the instruction are identified as the tag portion. The tag portion of the instruction is stored in Tag Register 28 and identifies one of various registers in the system as a recipient or source of data words in a particular operation.

Three other types of data words are employed in the System. These words are identified as either "indirect" words or "channel control" words, depending on the mode of employment of the particular word. The indirect word is a data word primarily employed to control certain operations directed toward obtaining the address of a memory location with respect to which an operation specified by a preceding command is to be executed. All of the indirect words comprise an address consisting of digits 1–18 for identifying a corresponding location in Memory Unit 18. The indirect words further comprise a "control" portion in digits 19 and 20 thereof. The function of the control portion will be described hereinafter.

The 28th to 30th digits of indirect word–A are identified as the modifier, referred to previously.

The 22nd to 36th digits of indirect word–B are identified as the "tally" portion. The tally represents a number which is incremented each time a particular type of operation is executed. Thus, the tally serves as a record of the number of times the particular operation has been executed. Digit 21 is identified as the E-digit and functions as an incrementing overflow digit for the tally. When the tally is incremented to an amount whereby the number represented is too large for digits 22–36, the number "overflows" into the E-digit. Hence, when the E-digit becomes a binary 1 it provides an indication that the particular operation has been executed a predetermined number of times.

The 22nd to 30th digits of indirect word–C are identified as the tally thereof. The 31st to 36th digits are identified as the "subtally" portion. The tally portion of indirect word–C serves as a record of the number of complete operands a particular operation has processed. The subtally portion represents a number which is incremented each time a portion of the particular operand, identified by the tally, is processed by the particular operation. Digit–E of indirect word–C indicates when the particular operation has processed a predetermined number of operands.

SYSTEM CIRCUIT ELEMENTS

Circuits useful as elements of the System of FIG. 1 will now be described. The system will function with these elements or with other similar elements well known in the art; therefore, this invention is not to be considered as limited to the employment of the specific elements described.

The following circuits find general employment in the System: flip-flops, AND-gates, and OR-gates. Standard symbols are employed throughout the system block diagrams to represent these circuits.

Flip-flop

The flip-flop provides temporary storage of a binary digit of a data word or provides temporary storage of a control signal. Generally, when a flip-flop is employed to store a data word digit, it comprises one of an array of flip-flops termed a register. For example, in a register adapted to provide temporary storage for a complete data word, 36 flip-flops are employed, one for each digit of the data word.

The symbols identified by the numerals 60, 61, 62, 63, 64, 65, and 66 represent flip-flops of Command Register 10 and are shown in FIG. 8. The flip-flop, or bistable multivibrator, is a circuit adapted to operate in either one of two stable states and to transfer from the state in which it is operating to the other stable state upon application of a suitable trigger signal thereto. In one state of operation, the flip-flop represents the binary 1 (1-state) and in the other state the binary 0 (0-state). Flip-flops are identified in accordance with the function they perform. For example, flip-flop 60 is identified by the IR–A designation. The IR–A designation indicates that this flip-flop stores the first binary digit of the command portion of an instruction. Thus, flip-flop 60 temporarily stores the 21st digit of the instruction currently being executed (FIG. 2).

The two leads entering the left-hand side of the flip-flop symbol provide the two required trigger signals. The upper input lead, the 1-input lead, provides the 1-input signal and the lower input lead, the 0-input lead, provides the 0-input signal. When the 1-input signal goes positive, the flip-flop is transferred to its 1-state, if it is not already in the 1-state. When the 0-input signal goes positive, the flip-flop is transferred to its 0-state, if it is not already in the 0-state.

The two leads leaving the right-hand side of the flip-flop symbol deliver the two output signals. The upper output lead, the 1-output lead, delivers the 1-output signal of the flip-flop and the lower output lead, the 0-output lead, delivers the 0-output signal. The output signals of a flip-flop are identified by the designation of the flip-flop. For example, the 1-output signal delivered by the IR–A flip-flop is identified as the IR–A signal, whereas the 0-output signal is identified as the $\overline{IR-A}$ signal. When the IR–A flip-flop is in its 1-state, a positive signal is delivered on the 1-output lead and a negative signal is delivered on the 0-output lead. Conversely, when the flip-flop is in its 0-state, a negative signal is delivered on the 1-output lead and a positive output signal on the 0-output lead. The bar over the signal designation denotes a signal having inverse logical significance. Thus, the signal $\overline{IR-A}$ designates that when the IR–A signal is positive, the $\overline{IR-A}$ signal is negative and vice-versa, and therefore designates the 0-output signal provided by the flip-flop.

Another form of flip-flop is represented by the symbol for the X flip-flop in FIG. 26. This flip-flop is a clock pulse-driven flip-flop and can only change state if a clock pulse is applied to the central input lead at the same time that a positive signal is applied to the 1-input lead or the 0-input lead. Thus, if the X flip-flop is in its 0-state when a positive signal is applied to its 1-input lead, the flip-flop cannot change state until a clock pulse, in this instance the TAS clock pulse, is applied to the clock input lead.

Both types of flip-flops described herein are well-known in the art.

AND-gate

The AND-gate provides the logical operation of Conjunction for binary 1 signals applied thereto. In the System, since the binary 1 is represented by a positive signal, the AND-gate provides a positive output signal representing a binary 1 when, and only when, all of the input signals applied thereto are positive and represent binary 1's. The symbol identified by the numeral 69 in FIG. 8 represents a two-input AND-gate. Such an AND-gate delivers a binary 1 output signal only when each of the two input signals applied thereto represents a binary 1.

The two input signals applied to AND-gate 69 are respectively designated INSCY and G0. Therefore, the output signal is designated by INSCY G0, a conjunctive logic expression. This form of expression is used in logical equations, which are also known as Boolean equations, to be employed hereinafter. The conjunctive operation on any two signals, such as the INSCY and G0 signals, is indicated by writing the two signal designation terms adjacent each other with no operator notation therebetween, as written above, or with the operator notation ( · ) between the two terms; as follows: $INSCY \cdot G0$. This conjunctive expression is read as "INSCY and G0."

OR-gate

The OR-gate provides the logical operation of Inclusive-Or for binary 1 input signals applied thereto. In the System, since the binary 1 is represented by a positive signal, the OR-gate provides a positive output signal representing a binary 1 when any one or more of the input signals applied thereto are positive and represent binary 1's. The symbol identified by the numeral 70 in FIG. 8 represents a two-input OR-gate. Such an OR-gate delivers a binary 1 output signal when any one or both of the input signals applied thereto represent binary 1's.

The two input signals applied to OR-gate 70 are respectively designated XXEC and INLU. Therefore, the output signal is designated by $XXEC+INLU$, an inclusive-or logic expression. This form of expression is also used in logical equations to be employed thereinafter. The inclusive-or operation on any two signals, such as the XXEC and INLU signals, is indicated by writing the two signal designation terms with the operator notation (+) between the two terms; as follows: $XXEC+INLU$. This inclusive-or expression is read as "XXEC or INLU."

Inverter

The inverter provides the logical operation of Inversion, or NOT, for an input signal applied thereto. The inverter provides a positive output signal, representing a binary 1, when the input signal applied thereto is negative, representing a binary 0. Conversely, the inverter provides an output signal representing a binary 0 when the input signal represents a binary 1.

For employment in logical equations, the designation of the inverter output signal has an inverse logical significance compared to the input signal. For example, if the inverter receives an input signal designated as the SH1 signal, the output signal is designated as the $\overline{SH1}$ signal.

The symbol for the inverter employed herein is the circle. A signal applied to a circle has the binary sense thereof inverted. Thus, consider the three-input AND-gate 364 of FIG. 15. Two of the input leads thereof deliver input signals through inverters. Accordingly, the three signals which are actually applied to AND-gate 364 are G1, $\overline{SIII}$, and $\overline{SII5}$. Accordingly, the output signal delivered by AND-gate 364 is G1 $\overline{SIII}$ $\overline{SII5}$. In a similar manner in this same figure, OR-gate 370 has one signal applied thereto through an inverter, i.e., the XFF signal. Therefore, the output signal delivered by OR-gate 370 is designated by $\overline{XFF}+INDCY$.

Register

A register is adapted to provide temporary storage of data being processed or data being transferred between system components. The register comprises a plurality of flip-flops, one flip-flop for each digit of the data to be stored therein. A number of the registers of the System store a full data word and, therefore, comprise 36 flip-flops.

The flip-flops of a register are identified according to the register designation and the numerical significance of the digits stored therein. Thus, a particular register flip-flop is designated as the $Q_i$ flip-flop, where Q identifies the Q Register and $i$ identifies the order of significance of the digit stored therein. For example, the Q36 flip-flop stores the least significant digit of the Q Register.

The registers of the System, shown in FIG. 1, receive their contents by parallel transfer of the binary digits of data thereinto and have their contents transmitted to other locations by a parallel transfer of the binary digits stored.

DATA PROCESSING UNIT—ORGANIZATION

The Data Processing Unit of FIG. 1 processes data by performing arithmetic or logical operations on operands under the direct control of commands and under the indirect control of indirect words. In so processing data, the Data Processing Unit responds to commands provided by Command Register 10 and External Units 12–15.

Operands, instructions, and indirect words for immediate employment by the Data Processing Unit are stored in the 4096 word Memory Unit 18. Additionally, commands for immediate employment are provided by the External Units.

Phases of operation—general

During its operation, the Data Processing Unit is always in one of three phases; the Instruction Cycle, the Indirect Cycle, or the Operation Cycle. In the Instruction Cycle the Data Processing Unit retrieves an instruction from a storage location in Memory Unit 18, transfers the command portion of the instruction to Command Register 10, and senses the command modifier, and tag portions and the I-digit to determine the type of operation to be executed and the next phase to be entered. In the Indirect Cycle, the Data Processing Unit retrieves an indirect word from a storage location in the Memory Unit and senses the control portion, and the modifier portion, if present, to determine the type of operation to follow and the next phase to be entered. In the Operation Cycle, the Data Processing Unit receives, processes, or transmits data under control of a command provided by either Command Register 10 or one of the External Units.

The particular phase of operation is determined by the one of three signals which is present; namely, INSCY, INDCY or OPSCY. These signals are provided in accordance with the states of the OPSCY and INDCY flip-flops, shown in FIG. 9 and described in detail hereinafter.

Timer

Timer 29 delivers signals to control the sequential execution of the individual steps performed in the three phases of operation. Thirty different clock periods (FIGS. 3 and 4) are defined by the Timer. A "timing cycle" comprises the 30 clock periods and is the duration of each phase.

Each clock period is initiated when a corresponding clock pulse signal is delivered by timer 29 and ends at the beginning of the next delivered clock pulse signal. Timer 29 supplies clock pulses at a 5 megacycle recurrence rate. Therefore, the duration of a clock period is 0.2 microsecond, or 200 nanoseconds (ns.), where a nanosecond is $10^{-9}$ seconds. Therefore, the timing cycle of 30 clock periods has a duration of 6 microseconds.

The duration of a clock pulse is approximately 40 ns. or about one-fifth of a clock period. Each clock period is defined so that the corresponding clock pulse thereof occurs at the beginning of the clock period. The clock periods are numbered successively from $t1$ to $t30$ during a timing cycle. The clock pulse provided at the beginning of each clock period is correspondingly numbered; i.e., the clock pulse occurring at the beginning of $t1$ is identified as CP–1.

Timer 29 delivers the 30 different clock pulses on respective output leads to the different parts of the System. Clock pulses are delivered to system locations where required to control the occurrence of the various steps in the phases of operation. Thus, in FIG. 3, Timer 29 delivers the clock pulse CP–1 on output lead 40, CP–2 on lead 41, etc. The first waveform of FIG. 4 illustrates the 30 clock pulses occurring in a timing cycle and the mode of identification of the clock pulses and clock periods. The interval of time illustrated between the first clock pulse CP–1 and the second clock pulse CP–1 comprises 30 clock periods and is a complete timing cycle.

In addition to the clock pulses delivered by timer 29, various other timing signals, each comprising a positive voltage or pulse persisting for a predetermined duration, are supplied by Timer 29. Thus, pulses identified as TAS pulses are supplied on an output lead 46. These pulses are approximately of the same duration as the clock pulses and occur in coincidence with the occurrence of clock pulses CP–1, CP–16, CP–20, and CP–27, as shown by the waveforms of FIG. 4.

A signal identified as the G0 signal is supplied on a lead 47 and occurs during the interval $t8-t11$. A signal identified as the G00 signal is supplied on a lead 48 and occurs during interval $t12-t13$. A signal identified as the G1 signal is supplied on a lead 49 and occurs during the interval $t11-t15$. A signal identified as the G2 signal is supplied on a lead 50 and occurs during the interval $t16-t19$. A signal identified as the G3 signal is supplied on a lead 51 and occurs during the interval $t20-t26$. A signal identified as the G4 signal is supplied on a lead 52 and occurs during the interval $t27-t30$. A signal identified as the GLU signal is supplied on a lead 53 and also occurs during the interval $t27-t30$. Waveforms representing the G0, G00, G1, G2, G3, G4, and GLU signals are also shown in FIG. 4.

Memory unit

The Memory Unit 18 stores operands, instructions, and indirect words for immediate employment by the Data Processing Unit or operands which are the results of processing by the Data Processing Unit and which are awaiting transfer to an External Unit.

Memory Unit 18 (FIG. 5) comprises a Storage Unit 101; a buffer register for temporarily holding data words retrieved from and to be stored in the Storage Unit, and denoted as the Memory Register, or M Register, 102; a register for identifying storage locations in the Storage Unit, and denoted as the Address Register, or AR Register, 103, and control circuits and gates.

One form of Storage Unit suitable for employment with Memory Unit 18 is the coincident-current magnetic core type of random access memory, well known in the art. The structure and operation of such a memory element is described, for example, in the publication by C. V. L. Smith, "Electronic Digital Computers," chapter 12, McGraw-Hill Book Company, Inc., New York, 1959 and in the R. R. Johnson U.S. Patent 3,077,984, assigned to the assignee of the instant invention.

Storage Unit 101 may have various capacities for storage. One Storage Unit which may be employed with the instant invention has a capacity for storing 4096 data words of 36 binary digits, each binary digit being stored in a corresponding magnetic core. This Storage Unit comprises 36 planes of cores, each plane having 4096 cores. Each plane stores the binary digit of corresponding order for the 4096 data words. The location of a particular magnetic core in a plane is the address of the core and is identified by a number stored in AR Register 103. Correspondingly located cores in all of the 36 planes are identified by the same address number and store the 36 binary digits of a data word. A particular data word is retrieved from or entered into Storage Unit 101 at the location identified by the contents of AR Register 103.

Storage Unit 101 stores instructions in one group of storage locations, operands in another group of locations, indirect words in another group of locations, and channel control words in another group of locations. The actual storage locations employed to store a particular type of data word are the choice of the operator so that instructions, operands, indirect words, and channel control words may be stored at any location in Storage Unit 101.

M Register 102 stores a data word retrieved from Storage Unit 101 or a data word intended for storage in the Storage Unit. Data words are entered into the M Register through input gates 105 from either Storage Unit 101 or Arithmetic Unit 20. Clock pulses CP–10 and CP–11 control input gates 105 to provide receipt of a data word by M Register 102 from Storage Unit 101. Clock pulse CP–16 and the $ST_{MRU}$ and $ST_{MRL}$ signals received on respective leads 106 and 107 control input gates 105 to provide receipt of all or part of a data word by M Register 102 from Arithmetic Unit 20. Clock pulse CP–6 controls input gates 105 to provide for the clearing of the M Register. Data words stored in the M Register are supplied to Memory Switch 19, to Storage Unit 101, and to External Units 12–15.

The AR Register 103 stores an address identifying the storage location in Storage Unit 101 from which a data word is to be retrieved or into which a data word is to be stored. An address is entered into the AR Register through input gates 110 from Arithmetic Unit 20. Clock pulse CP–1 controls input gates 110 to provide receipt of an address by AR Register 103 from Arithmetic Unit 20. Addresses stored in the AR Register are supplied to Storage Unit 101 and to Register Switch 21.

Read-Write Control Circuits 112 provide output signals to control the retrieval of data words from and the storage of data words into Storage Unit 101. Clock pulses CP–1 and CP–13 control the duration of a read signal provided on an output lead 113. This read signal, in turn, controls the retrieval of a data word from Storage Unit 101. Clock pulses CP–16 and CP–29 control the duration of a write signal provided on output lead 114. This write signal, in turn, controls the storage of a data word in Storage Unit 101.

FIGURE 6 shows one flip-flop of M register 102 and one flip-flop of AR Register 103 and input gates corresponding to these flip-flops for entering binary digits into the M Register and the AR Register. The MR–1 flip-flop 116 stores the most significant digit of the data word in the M Register. The MR–1 flip-flop output signals delivered by the 1-output and 0-output leads are designated respectively as the M1 and $\overline{M1}$ signals. An OR-gate 117 delivers an output signal for transferring the MR–1 flip-flop to the 1-state and an OR-gate 118 delivers an output signal for transferring the MR–1 flip-flop to the 0-state. The signal delivered by OR-gate 117 is identified as the SET MR–1 signal. The signal delivered by OR-gate 118 is identified as the RESET MR–1 signal. OR-gate 117 receives the output signal delivered by an AND-gate 119 on one input lead and the output signal delivered by an AND-gate 120 on the other input lead. AND-gate 119 receives the signal provided on a lead 121 on one input lead and the output signal delivered by an OR-gate 122 on the other input lead. Thus, one input lead of AND-gate 119 receives a signal representing the digit stored in the addressed location of memory plane-1. OR-gate 122 receives the CP–10 clock pulse delivered by Timer 29 on one input lead and the CP–11 clock pulse on the other input lead.

AND-gate 120 receives the signal provided on a lead 123 on one input lead and the output signal delivered by an AND-gate 124 on the other input lead. Thus, one input lead of AND-gate 120 receives the S1 signal, which is the output result signal delivered by the most significant stage of Arithmetic Unit 20. AND-gate 124 receives the $ST_{MRU}$ signal on lead 106 on one input lead and the CP–16 clock pulse on the other input lead.

Accordingly, the output signal delivered by OR-gate 117 and applied to the 1-input lead of flip-flop 116 is represented by the following equation:

(1) $SET\ MR-1 = PLANE-1\ DIGIT\ (CP-10 + CP-11) + S1\ ST_{MRU}\ CP-16$

This equation represents the storage in the MR–1 flip-flop of the most significant digit of the addressed Memory location, if such digit represents a binary 1, during clock periods $t10$ and $t11$. Thus, each of the M Register flip-flops, during $t10$ and $t11$, receive the respective binary digit of the addressed Memory location. Therefore, at the end of $t11$ of each timing cycle the M Register stores the data word contents of the addressed Memory location. Equation 1 also partially represents the transfer to the M Register of the most significant half of the result data word delivered by Arithmetic Unit 20 at clock period $t16$. Thus, in the particular example illustrated if the Arithmetic Unit delivers a most significant result digit representing a binary 1 (S1) and if the $ST_{MRU}$ signal is delivered by the Data Processing Unit at CP–16, this most significant result digit will be stored in the MR–1 flip-flop.

OR-gate 118 receives the CP–6 clock pulse delivered by Timer 29 on one input lead and the output signal delivered by an AND-gate 125 on the other input lead. AND-gate 125 receives, in inverted logic sense, the S1 signal on one input lead and receives the output signal delivered by AND-gate 124 on the other input lead. Accordingly, the output signal delivered by OR-gate 118 and applied to the 0-input lead of flip-flop 116 is represented by the following equation:

(2) $RESET\ MR-1 = CP-6 + \overline{S1}\ ST_{MRU}\ CP-16$

This equation represents the clearing of the M-Register during the sixth clock period of the timing cycle by the clock pulse CP–6. Consequently, the entire M Register is cleared by the end of the sixth clock period. Equation 2 also partially represents the transfer to the M Register of the most significant half of the result data word delivered by the Arithmetic Unit at clock period $t16$. Thus, in the apparatus of FIG. 6, if the Arithmetic Unit delivers a most significant result digit representing a binary 0 and if the $ST_{MRU}$ signal is delivered by the Data Processing Unit at CP–16, this most significant result digit will be stored in the MR–1 flip-flop.

The $ST_{MRU}$ signal enables the input gates 105 corresponding to the most significant half of the data word to be entered into the M Register from the Arithmetic Unit. Thus, the $ST_{MRU}$ signal enables the entry of the Arithmetic Unit result digits S1–S18 into the MR–1 to MR–18 flip-flops of the M Register. The $ST_{MRL}$ signal enables the input gates 105 corresponding to the least significant half of the data word to be entered into the M Register from the Arithmetic Unit. Thus, the $ST_{MRL}$ signal enables the entry of the Arithmetic Unit result digits S19–

S36 into the MR-19 to MR-36 flip-flops of the M Register.

The AR-11 flip-flop 130 stores one of the binary digits of the address in the AR Register. An AND-gate 131 delivers an output signal for transferring the AR-11 flip-flop to the 1-state and an AND-gate 132 delivers an output signal for transferring the AR-11 flip-flop to the 0-state. AND-gate 131 receives the S8 signal on one input lead and the CP-1 clock pulse on the other input lead. Accordingly, the output signal delivered by AND-gate 131 and applied to the 1-input lead of flip-flop 130 is represented by the following equation:

(3) $\quad SET\ AR-11 = S8\ CP-1$

This equation partially represents the transfer to the AR Register of the address delivered by the Arithmetic Unit at clock period $t1$. Thus, in the apparatus illustrated, if the eighth result digit (S8) delivered by the Arithmetic Unit represents a binary 1 CP-1, this result digit will be stored in the AR-11 flip-flop.

AND-gate 132 receives, in inverted logic sense, the S8 signal on one input lead and receives the CP-1 clock pulse on the other input lead. Accordingly, the output signal delivered by AND-gate 132 and applied to the 0-input lead of flip-flop 130 is represented by the following equation:

(4) $\quad RESET\ AR-11 = \overline{S8}\ \overline{CP-1}$

This equation partially represents the transfer to the AR Register of the address delivered by the Arithmetic Unit at clock period $t1$. Thus, at CP-1 if the eighth result digit delivered by the Arithmetic Unit represents a binary 0, this result digit will be stored in the AR-11 flip-flop.

In the present embodiment the AR Register comprises thirteen flip-flops, designated as AR-1 through AR-13. These thirteen flip-flops receive respectively the result digits of Arithmetic Unit 20 designated S18-S6.

The mode of operation and the sequence of the individual steps in the operation of Memory Unit 18 will now be described with reference to the waveforms and the timing diagram of FIG. 7. The first waveform in this figure illustrates the individual clock pulses which are employed in synchronizing and controlling the operation of the Memory Unit and their relative order of appearance in the timing cycle. In the second wave form, the time of occurrence and the duration of the read signal delivered by Control Circuits 112 (FIG. 5) is shown. Thus, the read signal is initiated by the CP-1 clock pulse and terminated by the CP-13 clock pulse. The relative time of occurrence and the duration of the write signal delivered by Control Circuits 112 is shown in the next waveform. The write signal is initiated by the CP-16 clock pulse and terminated by the CP-29 clock pulse. The $ST_{MRU}$ and $ST_{MRL}$ signals, when generated, occur during the interval $t11$ to $t15$.

The lower diagram in FIG. 7 is a timing diagram illustrating the relative time of occurernce of the various steps occurring in Memory Unit 18. At the beginning of the timing cycle, a new address is transferred by input gates 110 into AR Register 103, under control of the CP-1 clock pulse. The transfer apparatus for one address digit is illustrated in FIG. 6. The read signal is also initiated at $t1$ to control the reading of all binary digits of the data word in the addressed storage location out of Storage Unit 101. The CP-6 clock pulse clears the M Register in preparation for receipt of the data word being read from Storage Unit 101. This clearing action is illustrated in FIG. 6 by the application of the CP-6 clock pulse to OR-gate 118. During $t10$ to $t11$ of the timing cycle, the CP-10 and CP-11 clock pulses gate the contents of the addressed storage location from the Storage Unit to the M Register, so that by the end of $t11$ the M Register stores the contents of the newly addressed storage location. This action is illustrated for one M Register flip-flop in FIG. 6 by the gating action of OR-gate 122 and AND-gate 119. Following $t11$, the contents of the M Register are available for employment by the Data Processing Unit.

The CP-16 clock pulse enables the transfer of a new data word through input gates 105 and into the M Register, providing either one or both of the signals $ST_{MRU}$ and $ST_{MRL}$ are present at this time. This action is illustrated in FIG. 6 by the gating action of AND-gates 124, 120 and 125. Following $t16$, either new data has been inserted into the M Register from the Data Processing Unit or the data word originally retrieved from the Storage Unit remains in the M Register. During $t16$ to $t29$ the contents of the M Register are transferred into the addressed location in Storage Unit 101 by the write signal. Upon the occurrence of the next CP-1 clock pulse a new address is transferred into the AR Register and another memory cycle commences.

Therefore, it has been shown above that the memory cycle is coincident with the timing cycle, comprising the full thirty clock periods between two successive CP-1 clock pulses. The memory cycle consists of two portions, the read period occurring from $t1$ to $t15$ and during which the contents of the addressed storage location are transferred to the M Register, and the write period occurring from $t16$ to $t30$ and during which the contents of the M Register are transferred to the addressed location.

*Command Register*

Command Register 10 stores the command portion of the instruction and this command portion controls the type of operation to be executed by the Data Processing Unit, when the Unit is operating under control of Command Register 10. The Command Register, FIG. 8, comprises the seven flip-flops 60-66 for receiving and storing the respective digits 21-27 of the command portion of an instruction. The fourteen output signals delivered by flip-flops 60-66 are applied to a Command Decoder 72. Decoder 72 is a conventional decoding matrix responding to these fourteen signals and delivering a binary 1 output signal on the one of the output leads thereof corresponding to the aggregate state of these fourteen input signals.

For example, if the command in the Command Register designates a transfer operation, whereby the contents of the A Register are to be transferred to the Q Register, the corresponding output lead of Decoder 72 delivers an output signal representing a binary 1. This output signal actuates the appropriate circuits in the Data Processing Unit for effecting the requisite transfer operation. For this exemplary situation, the remainder of the output leads of Decoder 72 deliver signals representing binary 0's.

The Command Register is cleared at $t1$ of the Instruction Cycle and a new command is entered therein at $t11$ of the same Instruction Cycle. Each of a plurality of AND-gates 74 receives the signal provided on lead 46 (FIG. 3) on one input lead and the output signal delivered by an AND-gate 76 on the other input lead. Thus, one input lead of each AND-gate 74 receives the TAS signal. AND-gate 76 receives the signal provided on lead 53 (FIG. 3) on one input lead and the output signal delivered by OR-gate 70 on the other input lead. Thus, one input lead of AND-gate 76 receives the GLU signal. OR-gate 70 receives the signal provided on a lead 78 on one input lead and the signal provided on a lead 79 on the other input lead. Thus, the two input leads of OR-gate 70 receives respectively the XXEC signal and the INLU signal. Accordingly, the output signals delivered by AND-gates 74 and applied to the 0-input leads of flip-flops 60-66 to clear the Command Register are represented by the following equation:

(5) $\quad RESET\ IR-(i) = (INLU + XXEC)\ GLU\ TAS$

This equation represents the delivery of an output signal representing a binary 1 by AND-gates 74 when each of the TAS and the GLU signals represent a binary 1 and when either, or both, the INLU and XXEC signals represent binary 1's.

Prior to the start of each Instruction Cycle, the signal INLU represents a binary 1. The circuit for generating the INLU signal is shown in FIG. 12. The GLU signal represents a binary 1 during $t27$ to $t30$ of the timing cycle immediately preceding the Instruction Cycle. Therefore, AND-gate 74 delivers a binary 1 output signal upon the occurrence of the TAS pulse (FIG. 4) occurring at the beginning of $t1$. At the precise beginning of $t1$, when the TAS pulse occurs, the GLU signal is still in the 1-state from the preceding $t30$ clock period and has not yet had sufficient time to drop to the 0-state. Accordingly, the coincidence of the GLU and the TAS signals occurring at the beginning of the $t1$ clock period and the presence of the INLU signal at this time provide a binary 1 output signal from each AND-gate 74, thereby clearing the Command Register at the beginning of the Instruction Cycle.

Each of a plurality of AND-gates 81, 82, 83, 84, 85, 86 and 87 receives the output signal delivered by AND-gate 69 on one input lead and the signal provided on a respective one of leads 91, 92, 93, 94, 95, 96, and 97 on the other input lead. Thus, one input lead of each of AND-gates 81–87 receives a respective one of the M21-M27 signals provided by the M Register 102 of Memory Unit 18 (FIGS. 5 and 6). AND-gate 69 receives the signal provided on lead 47 (FIG. 3) on one input lead and the signal provided on a lead 88 (FIG. 9) on the other input lead. Thus, one input lead of AND-gate 69 receives the G0 signal and the other input lead receives the INSCY signal. Accordingly, the output signals delivered by AND-gates 81–87 and applied to the 1-input leads of respective ones of flip-flops 60–66 is represented by the following typical equation, for flip-flop 62:

(6)  $SET\ IR\text{-}C = INSCY\ G0\ M23$

This equation represents the delivery of an output signal representing a binary 1 by AND-gate 83 if the M23 flip-flop is in the 1-state, when both the INSCY and the G0 signals represent binary 1's. Inasmuch as the G0 signal is in the 1-state during $t8\text{-}t11$, and since a new instruction is entered into the M Register by $t11$ of the Instruction Cycle, the Command Register receives the command portion of the new instruction during $t11$ of the Instruction Cycle.

Therefore, during each Instruction Cycle Command Register 10 is cleared at $t1$ and a new command is stored therein at $t11$.

*Phases of operation—Control apparatus*

That portion of Control Unit 30 directed toward controlling the three phases of operation of the Data Processing Unit is shown in FIG. 9. When a signal representing a binary 1 is provided on lead 88, this signal, denoted as the INSCY signal, controls the Data Processing Unit to operate in the Instruction Cycle. When a flip-flop 140, denoted as the OPSCY flip-flop, is in the 1-state a binary 1 output signal is delivered on the 1-output lead 141. When this output signal, denoted as the OPSCY signal, is a binary 1 the Data Processing Unit operates in the Operation Cycle. When a flip-flop 142, denoted as the INDCY flip-flop, is in the 1-state a binary 1 output signal is delivered on the 1-output lead 143. When this output signal, denoted as the INDCY signal, is a binary 1 the Data Processing Unit operates in the Indirect Cycle.

An OR-gate 145 delivers an output signal on a lead 146 for transferring the OPSCY flip-flop to the 1-state. An AND-gate 147 delivers an output signal on a lead 148 for transferring the OPSCY flip-flop to the 0-state.

OR-gate 145 receives the output signal delivered by an AND-gate 161 on one input lead and the output signal delivered by an AND-gate 149 on the other input lead. AND-gate 161 receives the output signal delivered by OR-gate 162 on one input lead and the OIC signal on the other input lead. The OIC signal identifies various internal command and control signals generated in the Data Processing Unit, such as those provided by Decoder 72 of FIG. 8, which are effective to provide a binary 1 input signal for AND-gate 161. The OIC signal represents a binary 1 when certain commands are held in Command Register 10. Other signals identified as OIC signals will be found throughout the drawings and are described in the ensuing description. These OIC signals do not always correspond to the same set of command and control signals. The details of the generation of these signals are not essential to a description of the instant invention, it being sufficient for each employment to indicate that the particular circuit element involved is enabled or controlled by certain command and control signals provided in the System.

OR-gate 162 receives the output signal delivered by an AND-gate 163 on one input lead and the $$ITSFCY \cdot \overline{M21}$$

signal on the other input lead. AND-gate 163 receives the NORM–MODS signal on one input lead and the output signal delivered by an OR-gate 153 on the other input lead. OR-gate 153 receives the INSCY and IMSCY signals on respective input leads.

AND-gate 149 receives the output signals delivered by OR-gates 150, 151, and 152 on respective input leads. OR-gate 150 receives the XLD and the XST signals (FIG. 26) on respective input leads. OR-gate 151 receives the $ITSFCY \cdot \overline{M21}$ signal (FIG. 9) on one input lead, the XDIR signal (FIG. 26) on another input lead, and the output signal delivered by an AND-gate 158 on another input lead. AND-gate 158 receives the IMSCY signal and the NORM–MODS signal on respective input leads. OR-gate 152 receives the G1 signal, in inverted logic sense, on one input lead and the OPSCY signal, in inverted logic sense, on the other input lead.

Accordingly, the output signal delivered by the OR-gate 145 and applied to the 1-input lead of the OPSCY flip-flop is represented by the following equation:

(7) $SET\ OPSCY = (XLD + XST)\ (ITSFCY\ \overline{M21}$
$+ IMSCY\ NORM\text{-}MODS + XDIR)\ (\overline{G1} + \overline{OPSCY})$
$+ OIC\ [(INSCY + IMSCY)\ NORM\text{-}MODS$
$+ ITSFCY \cdot \overline{M21}]$ This equation represents the delivery of an output signal representing a binary 1 at the time the conditions in the System require that the next timing cycle be an Operation Cycle. The clock pulse input lead of the OPSCY flip-flop receives the CP–1 clock pulse of Timer 29. Accordingly, if the SET OPSCY signal is a binary 1 at the moment a timing cycle is entered, the CP–1 clock pulse controls the OPSCY flip-flop to transfer to the 1-state and this timing cycle will be an Operation Cycle.

AND-gate 147 receives the SET OPSCY signal, in inverted logic sense, on one input lead and the OPSCY signal on the other input lead. Accordingly, the output signal delivered by AND-gate 147 and applied to the 0-input lead of the OPSCY flip-flop is represented by the following equation:

(8)  $RESET\ OPSCY = \overline{SET\ OPSCY}\ OPSCY$

This equation represents the delivery of an output signal representing a binary 1 when the conditions in the System do not require that the next timing cycle be an Operation Cycle. Accordingly, when the next CP–1 clock pulse is received, the OPSCY flip-flop will transfer to the 0-state, if it is not already in the 0-state.

An OR-gate 164 delivers an output signal on a lead 165 for transferring the INDCY flip-flop to the 1-state. An AND-gate 166 delivers an output signal on a lead 167 for transferring the INDCY flip-flop to the 0-state.

OR-gate 164 receives the output signals delivered by AND-gates 168 and 169 on respective input leads.

AND-gate 168 receives the output signal delivered by OR-gate 152 on one input lead, the INDX signal on another input lead, the XXEC signal, in inverted logic sense, on another input lead, and the INDCY signal, in inverted logic sense, on another input lead. AND-gate 169 receives the MOD–I signal on one input lead, and the output signal delivered by an OR-gate 172 on the other input lead. OR-gate 172 receives the INSCY and IMSCY signals on respective input leads.

Accordingly, the output signal delivered by OR-gate 164 and applied to the 1-input lead of the INDCY flip-flop is represented by the following equation:

(9) $\quad SET\ INDCY = (\overline{G1} + \overline{OPSCY})\ INDX\ \overline{XXEC}$
$\overline{INDCY} + MOD\text{–}I\ (INSCY + IMSCY)$ This equation represents the delivery of an output signal representing a binary 1 at the time the conditions in the System require of the next timing cycle be an Indirect Cycle. The clock pulse input lead of the INDCY flip-flop receives the CP–1 clock pulse. Accordingly, if the SET INDCY signal is a binary 1 at the moment a timing cycle is entered, the CP–1 clock pulse controls the INDCY flip-flop to transfer to the 1-state and this timing cycle will be an Indirect Cycle.

AND-gate 166 receives the SET INDCY signal, in inverted logic sense, on one input lead and the INDCY signal on the other input lead. Accordingly, the output signal delivered by AND-gate 166 and applied to the 0-input lead of the INDCY flip-flop is represented by the following equation:

(10) $\quad RESET\ INDCY = \overline{SET\ INDCY}\ INDCY$

This equation represents the delivery of an output signal representing a binary 1 when the conditions in the System do not require that the next timing cycle be an Indirect Cycle. Accordingly, when the next CP–1 clock pulse is received, the INDCY flip-flop will transfer to the 0-state, if it is not already in the 0-state.

AND-gate 174 receives the 0-output signals delivered by the OPSCY and the INDCY flip-flops on respective input leads. Accordingly, the output signal delivered by AND-gate 174 is represented by the following equation:

(11) $\quad INSCY = \overline{OPSCY}\ \overline{INDCY}$

This equation represents the delivery of an output signal representing a binary 1 if each of the two input signals represents a binary 0. Therefore, the INSCY output signal delivered by AND-gate 174 controls the operation of the System as an Instruction Cycle for all timing cycles which are neither Indirect Cycles nor Operation Cycles.

*Modes of indirect cycle*

The Data Processing Unit, while operating in the phase identified as the Indirect Cycle, performs in one of four modes. The mode of performance of the Data Processing Unit is determined by the control portion of the indirect word (FIG. 2).

The four modes of operation in the Indirect Cycle are identified as the IMSCY, ITSCY, ISSCY, and IFSCY modes. In the IMSCY mode, the modifier portion of the indirect word is tested and the Memory address for the succeeding timing cycle is determined by this modifier portion. In the ITSCY mode, the indirect word employs a tally portion, the tally portion being incremented in the Indirect Cycle and an Operation Cycle following. In the ISSCY mode, the indirect word also employs a tally portion, the tally portion being incremented and the data word to be involved in the succeeding Operation Cycle being shifted by one digit position prior to entry of the System into the Operation Cycle. In the IFSCY mode, the indirect word also employs a tally portion, the tally portion being incremented and the data word to be involved in the succeeding Operation Cycle being shifted by six digit positions prior to entry of the System into the Operation Cycle.

An AND-gate 180 (FIG. 9) delivers an output signal on lead 159, this output signal being identified as the IMSCY signal. An AND-gate 181 delivers an output signal on a lead 182, this output signal being identified as the ITSCY signal. An AND-gate 183 delivers an output signal on a lead 184, this output signal being identified as the ISSCY signal. An AND-gate 185 delivers an output signal on a lead 186, this output signal being identified as the IFSCY signal. In the Indirect Cycle, one, and only one, of the IMSCY, ITSCY, ISSCY, and IFSCY signals represents a binary 1 and the one of these signals so representing the binary 1 determines the mode of operation in the Indirect Cycle.

AND-gate 180 receives the INDCY signal on one input lead, the M19 signal, in inverted logic sense, on another input lead, and the M20 signal, in inverted logic sense, on another input lead. AND-gate 181 receives the INDCY signal on one input lead, the M19 signal, in inverted logic sense, on another input lead, and the M20 signal on another input lead. AND-gate 183 receives the INDCY signal on one input lead, the M19 signal on another input lead, and the M20 signal on another input lead. AND-gate 185 receives the INDCY signal on one input lead, the M19 signal on another input lead, and the M20 signal, in inverted logic sense, on another input lead.

Accordingly, the conditions under which the IMSCY, the ITSCY, the ISSCY, and the IFSCY signals are generated during an Indirect Cycle may be represented by the following table:

TABLE I

|       | M19 | M20 |
|-------|-----|-----|
| IMSCY | 0   | 0   |
| ITSCY | 0   | 1   |
| ISSCY | 1   | 1   |
| IFSCY | 1   | 0   |

Table I indicates, for example, that when the M19 and M20 signals provided by the control portion of an indirect word, when in the M Register, represent respectively a binary 0 and a binary 1, the ITSCY signal is a binary 1 and the Indirect Cycle is in the ITSCY mode.

Control Unit 30 also delivers a signal representing operation in an Indirect Cycle wherein the indirect word has a tally portion. Thus, an OR-gate 190 provides an output signal on a lead 191, this signal being identified as the ITSFCY signal. OR-gate 190 receives the output signals delivered by AND-gates 181, 183, and 185 on respective input leads. Accordingly, the ITSFCY signal represents a binary 1 whenever the Data Processing Unit is operating in the ITSCY, the ISSCY, or the IFSCY modes.

Control Unit 30 also provides signals to indicate whether or not the tally portion of an indirect word has overflowed by incrementation. AND-gate 193 (FIG. 9) delivers an output signal on a lead 195 and an AND-gate 194 delivers an output signal on lead 156. AND-gate 193 receives the ITSFCY signal on one input lead, and the M21 signal on the other input lead. Accordingly, the output signal delivered by AND-gate 193 represents the logic expression ITSFCY·M21. AND-gate 194 receives the ITSFCY signal on one input lead, and the M21 signal, in inverted logic sense, on the other input lead. Accordingly, the output signal delivered by AND-gate 194 represents the logic expression ITSFCY·$\overline{M21}$. The M21 signal represents the contents of the 21st flip-flop in the M Register, and, therefore, represents the E-digit, or overflow digit, when an indirect word–B or an indirect word–C is in the M Register. Consequently, during an Indirect Cycle wherein an indirect word employing a tally portion is held in the M Register, a binary 1 signal delivered on lead 195 indicates that the incrementation of the tally portion has caused an overflow into the E- digit, whereas a binary 1 signal delivered on lead 156 indicates that the incrementation of the tally portion has not caused an overflow into the E-digit. The Data Processing Unit takes alternative courses of action in accordance with the signals delivered on leads 195 and 156.

*Data shift control apparatus*

In the preceding section it was indicated that when the System is operating in the ISSCY mode of an Indirect Cycle, the data word to be involved in the succeeding Operation Cycle is shifted by one digit position. Similarly, in the IFSCY mode of an Indirect Cycle the data word to be involved in the succeeding Operation Cycle is shifted by six digit positions. That portion of Control Unit 30 directed toward controlling the shifting of a data word during an Indirect Cycle is shown in FIG. 10. When a flip-flop 201, denoted as the SH1–FF flip-flop is in the 1-state a binary 1 output signal, denoted as the SH1–FF signal, is delivered on the 1-output lead 202. The SH1–FF signal enables the Data Processing Unit to shift the data word to be involved in the succeeding Operation Cycle by one digit position prior to entry of the System into such Operation Cycle. When a flip-flop 203, denoted as the SH6–FF, is in the 1-state a binary 1 output signal, denoted as the SH6–FF signal, is delivered on the 1-output lead 204. The SH6–FF signal enables the Data Processing Unit to shift the data word to be involved in the succeeding Operation Cycle by six digit positions prior to entry of the System into such Operation Cycle.

An AND-gate 205 delivers an output signal on a lead 206 for transferring the SH1–FF flip-flop to the 1-state. An AND-gate 207 delivers an output signal on a lead 208 for transferring the SH1–FF flip-flop to the 0-state. AND-gate 205 receives the ISSCY signal on one input lead, the M21 signal, in inverted logic sense, on another input lead, and the GLU signal on another input lead.

Accordingly, the output signal delivered by AND-gate 205 and applied to the 1-input lead of the SH1–FF flip-flop is represented by the following equation:

(12) $\quad SET\ SH1 = ISSCY\ \overline{M21}\ GLU$

This equation represents the delivery of an output signal representing a binary 1 during $t27$–$t30$ of an ISSCY type of Indirect Cycle, providing the tally portion of the indirect word has not overflowed ($\overline{M21}$). The clock pulse input lead of the SH1–FF flip-flop receives the CP–1 clock pulse. Accordingly, if the SET SH1 signal is a binary 1 at the moment a timing cycle is entered, the CP–1 clock pulse controls the SH1–FF flip-flop to transfer to the 1-state and enables the appropriate data shift during this timing cycle.

AND-gate 207 receives the SH1–FF and the GLU signals on respective input leads. Accordingly, the output signal delivered by AND-gate 207 and applied to the 0-input lead of the SH1–FF flip-flop is represented by the following equation:

(13) $\quad RESET\ SH1 = SH1\text{-}FF\ GLU$

This equation represents the delivery of an output signal representing a binary 1 at the conclusion of the timing cycle wherein the SH1–FF flip-flop is in the 1-state. Accordingly, when the next CP–1 clock pulse is received, the SH1–FF flip-flop transfers to the 0-state.

An AND-gate 210 delivers an output signal on a lead 211 for transferring the SH6–FF flip-flop to the 1-state. An AND-gate 212 delivers an output signal on a lead 213 for transferring the SH6–FF flip-flop to the 0-state. AND-gate 210 receives the IFSCY signal on one input lead, the M21 signal, in inverted logic sense, on another input lead, and the GLU signal on another input lead.

Accordingly, the output signal delivered by AND-gate 210 and applied to the 1-input lead of the SH6–FF flip-flop is represented by the following equation:

(14) $\quad SET\ SH6 = IFSCY\ \overline{M21}\ GLU$

This equation represents the delivery of an output signal representing a binary 1 during $t27$–$t30$ of an IFSCY type of Indirect Cycle, providing the tally portion of the indirect word has not overflowed. The clock pulse input lead of the SH6–FF flip-flop receives the CP–1 clock pulse. Accordingly, if the SET SH6 signal is a binary 1 at the moment a timing cycle is entered, the CP–1 clock pulse controls the SH6–FF flip-flop to transfer to the 1-state and enables the appropriate data shift during this timing cycle.

AND-gate 212 receives the SH6–FF and the GLU signals on respective input leads. Accordingly, the output signal delivered by AND-gate 212 and applied to the 0-input lead of the SH6–FF flip-flop is represented by the following equation:

(15) $\quad RESET\ SH6 = SH6\text{-}FF\ GLU$

This equation represents the delivery of an output signal representing a binary 1 at the conclusion of the timing cycle wherein the SH6–FF flip-flop is in the 1-state. Accordingly, when the next CP–1 clock pulse is received, the SH6–FF flip-flop transfers to the 0-state.

A pair of AND-gates 215 and 216 directly control the shifting of a data word in the current timing cycle. AND-gate 215 delivers an output signal, designated as the SH1 signal, on a lead 217. This signal, when a binary 1, controls the shifting of a data word by one digit position. AND-gate 215 receives the XXEC signal, in inverted logic sense, on one input lead and the output signal delivered by an OR-gate 219 on the other input lead. OR-gate 219 receives the SH1–FF and the XSH1 signals on respective input leads. Accordingly, the output signal delivered by AND-gate 215 is represented by the following equation:

(16) $\quad SH1 = (SH1\text{-}FF + XSH1)\ \overline{XXEC}$

This equation represents the delivery of an output signal representing a binary 1 when the SH1–FF flip-flop is in the 1-state or the XSH1 signal represents a binary 1, provided that the XXEC signal represents a binary 0.

AND-gate 216 delivers an output signal, designated as the SH6 signal, on a lead 218. This signal, when a binary 1, controls the shifting of a data word by six digit positions. AND-gate 216 receives the XXEC signal, in inverted logic sense, on one input lead and the output signal delivered by an OR-gate 221 on the other input lead. OR-gate 221 receives the SH6–FF and the XSH6 signals on respective input leads. Accordingly, the output signal delivered by AND-gate 216 is represented by the following equation:

(17) $\quad SH6 = (SH6\text{-}FF + XSH6)\ \overline{XXEC}$

This equation represents the delivery of an output signal representing a binary 1 when the SH6–FF flip-flop is in the 1-state or the XSH6 signal represents a binary 1, provided that the XXEC signal represents a binary 0.

*Address modification apparatus*

That portion of Control Unit 30 directed toward controlling the modification of an address is shown in FIG. 11. In either an Instruction Cycle or the IMSCY mode of an Indirect Cycle, the address portion of the data word inserted into M Register 102 from Storage Unit 101 may be modified prior to its transfer to the AR Register at the beginning of the next timing cycle. This modification is controlled by signals generated from the modifier portion of the word in the M Register (FIG. 2). Modification is effected by adding the contents of a denoted register to the address portion of the word in the M Register. The result address is inserted in the AR Register at the beginning of the next timing cycle.

An AND-gate 226 delivers an output signal, designated as the MOD-A signal, on a lead 227. The MOD-A signal controls the addition of the contents of the A Register to the address portion of the data word in the M Register.

AND-gate 226 receives the M29 signal on one input lead and the M30 signal, in inverted logic sense, on the other input lead.

An AND-gate 228 delivers an output signal, designated as the MOD-Q signal, on a lead 229. The MOD-Q signal controls the addition of the contents of the Q Register to the address portion of the data word in the M Register. AND-gate 228 receives the M28 and M29 signals on respective input leads.

An AND-gate 230 delivers an output signal, designated as the MOD-X signal, on a lead 231. The MOD-X signal controls the addition of the contents of the X Register to the address portion of the data word in the M Register. AND-gate 230 receives the M28 signal, in inverted logic sense, on one input lead, the M29 signal on another input lead, and the M30 signal on another input lead.

An AND-gate 232 delivers an output signal, designated as the MOD-T signal, on a lead 233. The MOD-T signal controls the addition of the contents of the Tag Register to the address portion of the data word in the M Register. AND-gate 232 receives the M28 signal, in inverted logic sense, on one input lead, the M29 signal, in inverted logic sense, on another input lead, and the M30 signal on another input lead.

An AND-gate 234 delivers an output signal, designated as the MOD-N signal, on a lead 235. The MOD-N signal is present when the modifier portion of the data word in the M Register is to have no effect; i.e., no address modification or other operation is to be controlled by the modifier when the MOD-N signal represents a binary 1. AND-gate 234 receives the M28, M29, and M30 signals on respective input leads, each of these signals being received in inverted logic sense.

An AND-gate 236 delivers an output signal, designated as the MOD-I signal, on a lead 237. The MOD-I signal is effective at the end of an Instruction Cycle or Indirect Cycle to control the next timing cycle to be an Indirect Cycle. AND-gate 236 receives the M28 signal on one input lead, the M29 signal, in inverted logic sense, on another input lead, and the M30 signal on another input lead.

Accordingly, the modifier states which control the various address modification signals may be represented by the following table:

TABLE II

|       | M28 | M29 | M30 |
|-------|-----|-----|-----|
| MOD-A |     | 1   | 0   |
| MOD-Q | 1   | 1   |     |
| MOD-X | 0   | 1   | 1   |
| MOD-T | 0   | 0   | 1   |
| MOD-N | 0   | 0   | 0   |
| MOD-I | 1   | 0   | 1   |

Table II indicates, for example, that when the M29 and M30 signals provided by the modifier portion of a data word in the M Register respectively represent a binary 1 and a binary 0, the MOD-A signal is a binary 1 regardless of the state of the M28 signal.

Control Unit 30 also delivers a signal which indicates that the state of the modifier portion of the word in the M Register is not one which controls the phase of operation, but instead, is one which either controls the modification of the address or is ineffective to control the operation. Accordingly, an OR-gate 242 delivers an output signal on a lead 160, this signal being identified as the NORM-MODS signal. OR-gate 242 receives the output signals delivered by AND-gates 226, 228, 230, 232, and 234 on respective input leads. Thus, the NORM-MODS signal represents a binary 1 whenever any one of the MOD-A, MOD-Q, MOD-X, MOD-T, or MOD-N signals is a binary 1.

*Interrupt inhibiting apparatus*

As has been indicated previously, Control Unit 30 responds to signals provided by commands in Command Register 10 or to command signals provided by any one of External Units 12–15 for controlling the type of operation being executed by the System. In responding to command signals provided by an External Unit, the Control Unit interrupts the normal sequence of operations being controlled solely by the Command Register in order to transfer control to the External Units. However, apparatus is provided for preventing Control Unit 30 from responding to the command signals provided by an External Unit, and hence, for preventing interruption of the internally-controlled operation of the Data Processing Unit.

When a flip-flop 250 (FIG. 11), denoted as the INH-INT flip-flop, is in the 1-state, a binary 1 output signal, designated as the INH-INT signal, is delivered on the 1-output lead 251. The INH-INT signal prevents an External Unit from interrupting operation of the System under sole control of a sequence of commands inserted into Command Register 10 from Memory Unit 18. An AND-gate 252 delivers an output signal on a lead 253 for transferring the INH-INT flip-flop to the 1-state. An AND-gate 254 delivers an output signal on a lead 255 for transferring the INH-INT flip-flop to the 0-state.

AND-gate 252 receives the INSCY, M20 and G00 signals on respective input leads. Accordingly, the output signal delivered by AND-gate 252 and applied to the 1-input lead of the INH-INT flip-flop is represented by the following equation:

(18) $SET\ INH\text{-}INT = INSCY\ M20\ G00$

This equation represents the delivery of an output signal representing a binary 1 during an Instruction Cycle if the 20th digit of the instruction (the I-digit, FIG. 2) is a binary 1; this event, when enabled, occurring at the time the G00 signal is supplied by Timer 29.

AND-gate 254 receives the INLU, GLU, and TAS signals on respective input leads. Accordingly, the output signal delivered by AND-gate 254 and applied to the 0-input lead of the INH-INT flip-flop is represented by the following equation:

(19) $RESET\ INH\text{-}INT = INLU\ GLU\ TAS$

This equation represents the delivery of an output signal representing a binary 1 at the time of the first clock pulse of an Instruction Cycle. Prior to the start of each Instruction Cycle the signal INLU represents a binary 1, and it has been shown heretofore that the GLU signal represents a binary 1 during $t27$–$t30$ of the timing cycle immediately preceding the Instruction Cycle. Consequently, AND-gate 254 delivers a binary 1 output signal upon the occurrence of the TAS pulse at the beginning of the $t1$ clock period.

Therefore, the INH-INT flip-flop is transferred to the 1-state to inhibit interruption of the Data Processing Unit by an External Unit during an Instruction Cycle wherein the I-digit of the instruction represents a binary 1, and the INH-INT flip-flop remains in the 1-state until the beginning of the next-following Instruction Cycle.

*Miscellaneous control apparatus*

Control Unit 30 provides various other control signals for controlling various steps in the three phases of operation of the Data Processing Unit. That portion of Control Unit 30 directed toward generating these various controls will now be described.

The $G0P_{1X}$ control signal is generated by an AND-gate 260 and delivered on a lead 261 (FIG. 11). The $G0P_{1X}$ signal controls certain data transfer steps when the Data Processing Unit operates under control of commands provided by one of the External Units. AND-gate 260 receives the OPSCY signal on one input lead, the G1 signal on another input lead, and the output signal delivered by an OR-gate 262 on another input lead. OR-gate 262 receives the XLD and XST signals on respective input leads. Accordingly, the output signal delivered by AND-gate 260 is represented by the following equation:

(20) $\quad G0P_{1X} = (XLD + XST)OPSCY\ G1$

This equation represents the delivery of an output signal representing a binary 1 at the time the G1 signal is present during an Operation Cycle, providing either an XLD or XST command signal is also present. The XLD and XST command signals are initiated by one of the External Units and actually generated when recognition of the External Unit is acknowledged by the Data Processing Unit.

The INLU control signal is generated by an AND-gate 270 and delivered on lead 79 (FIG. 12). The INLU signal is the basic control signal for initiating an Instruction Cycle. AND-gate 270 receives the SET OPSCY signal, in inverted logic sense, on one input lead and the SET INDCY signal, in inverted logic sense, on the other input lead. These two signals received by AND-gate 270 are those employed to transfer the OPSCY and INDCY flip-flops to the 1-state (FIG. 9). Accordingly, the output signal delivered by AND-gate 270 is represented by the following equation:

(21) $\quad INLU = \overline{SET\ OPSCY}\ \overline{SET\ INDCY}$

This equation represents the delivery of an output signal representing a binary 1 when neither the OPSCY flip-flop nor the INDCY flip-flop is about to be transferred to or retained in its 1-state. In such event, the next timing cycle is initiated as an Instruction Cycle by the INLU signal.

The PRENORM–INLU control signal is generated by an AND-gate 271 and delivered on a lead 272. The PRENORM–INLU signal exercises final control over the initiating of an Instruction Cycle. AND-gate 271 receives the INLU signal on one input lead, the OIC signal, in inverted logic sense, on another input lead, the $$ITSFCY \cdot M21$$

signal, in inverted logic sense, on another input lead, and the output signal delivered by an AND-gate 273, in inverted logic sense, on another input lead. AND-gate 273 receives the XXEC and GLU signals on respective input leads. Accordingly, the output signal delivered by AND-gate 271 is represented by the following equation:

(22) $\quad PRENORM\text{--}INLU = INLU\ (\overline{XXEC + GLU})$
$$\overline{ITSFCY \cdot M21}\ \overline{OIC}$$

This equation represents the delivery of an output signal representing a binary 1 when the INLU signal is present, providing certain other conditions do not occur; namely, the presence of various commands which require a special succeeding timing cycle (the OIC signal), the presence of an overflow from a tally portion of an indirect word ($ITSFCY \cdot M21$), or the presence of an XXEC signal when the GLU signal occurs.

The NORMAL–INLU control signal is generated by an AND-gate 274 and delivered on a lead 275 (FIG. 12). The NORMAL–INLU signal directly controls the steps for initiating a normal Instruction Cycle. AND-gate 274 receives the PRENORM–INLU and the GLU signals on respective input leads. Accordingly, the output signal delivered by AND-gate 274 is represented by the following equation:

(23) $\quad NORMAL\text{--}INLU = PRENORM\text{--}INLU\ \overline{GLU}$

This equation represents the delivery of an output signal representing a binary 1 at the time the $\overline{GLU}$ signal occurs if the PRENORM–INLU signal represents a binary 1. Thus, the NORMAL–INLU signal is effective to initiate a normal Instruction Cycle if the conditions for generating the PRENORM–INLU signal are present during $t27$–$t30$.

The GSI control signal is generated by an AND-gate 276 and delivered on a lead 277 (FIG. 12). The GSI signal controls the conditions under which an External Unit may interrupt operation of the Data Processing Unit and thereby have the commands delivered by the External Unit rendered effective for controlling the System. AND-gate 276 receives the PRENORM–INLU signal on one input lead, the OIC signal, in inverted logic sense, on another input lead, and the INH–INT signal, in inverted logic sense, on another input lead. Accordingly, the output signal delivered by AND-gate 276 is represented by the following equation:

(24) $\quad GSI = PRENORM\text{--}INLU\ \overline{INH\text{--}INT}\ \overline{OIC}$ This equation represents the delivery of an output signal representing a binary 1 at the time conditions exist for initiation of a normal Instruction Cycle, provided certain other conditions do not occur; namely, the presence of various commands which require a special succeeding timing cycle (OIC signal) or the presence of the INH–INT signal (FIG. 11), the latter signal being intended for preventing interruption by an External Unit.

The TSI control signal is generated by an AND-gate 278 and delivered on a lead 279 (FIG. 12). The TSI signal controls certain steps of operation of the interrupt cells (FIG. 19) employed by the External Units in interrupting the Data Processing Unit. AND-gate 278 receives the GSI and CP–16 signals on respective input leads. Accordingly, the output signal delivered by AND-gate 278 is represented by:

(25) $\quad TSI = GSI\ CP\text{--}16$

This equation represents the delivery of an output signal representing a binary 1 at the time of occurrence of the CP–16 clock pulse if the GSI signal, which permits interruption of the Data Processing Unit by an External Unit, is in the 1-state.

The $ST_{MRU}$ and $ST_{MRL}$ control signals are generated by the respective OR-gates 280 and 281 and delivered on the respective leads 106 and 107. The functions of the $ST_{MRU}$ and $ST_{MRL}$ signals are described heretofore in the Memory Unit section. In such section these two signals are described as controlling the transfer of the respective most significant and least significant halves of data words to M Register 102 from Arithmetic Unit 20.

OR-gate 280 receives the output signal delivered by an AND-gate 282 on one input lead, the output signal delivered by an AND-gate 283 on another input lead, the output signal delivered by an AND-gate 284 on another input lead, the output signal delivered by an AND-gate 285 on another input lead, and the OIC signal on another input lead. AND-gate 282 receives the MOD–T signal on one input lead, the G1 signal on another input lead, and the output signal delivered by an OR-gate 286 on another input lead. OR-gate 286 receives the INSCY and IMSCY signals on respective input leads. AND-gate 283 receives the G1 and ITSFCY signals on respective input leads. AND-gate 284 receives the XLD signal on one input lead, the $G0P_{1X}$ signal on another input lead, and the output signal delivered by an OR-gate 287 on another input lead. OR-gate 287 receives the SH1 and SH6 signals on respective input leads. AND-gate 285 receives the $G0P_{1X}$ and the XST signals on respective input leads. Accordingly, the output signal delivered by OR-gate 280 is represented by the following equation:

(26) $ST_{MRU} = MOD\text{--}T\ (INSCY + IMSCY)\ G1$
$\quad + ITSFCY\ G1 + XLD\ (SH1 + SH6)\ G0P_{1X}$
$\quad\quad + XST\ G0P_{1X} + OIC$ This equation represents the delivery of an output signal representing a binary 1 when conditions in the System require the transfer of the most significant half of the data word result delivered by Arithmetic Unit 20 to M Register 102.

OR-gate 281 receives the output signal delivered by AND-gate 283 on one input lead, the output signal delivered by AND-gate 284 on another input lead, the output signal delivered by AND-gate 285 on another input lead, and the OIC signal on another input lead. Accordingly, the output signal delivered by OR-gate 281 is represented by the following equation:

(27) $ST_{MRL} = ITSFCY \ G1 + XLD \ (SH1 + SH6) \ G0P_{1x} + XST \ G0P_{1x} + OIC$

This equation represents the delivery of an output signal representing a binary 1 when conditions in the System require the transfer of the least significant half of the data word result delivered by Arithmetic Unit 20 to M Register 102.

Arithmetic Unit

Arithmetic Unit 20 is shown in block diagram form in FIG. 13. The Arithmetic Unit is adapted to perform the operations of addition, subtraction, and various other logical operations, not shown, on data received thereby, under control of respective control signals applied thereto. Data digits on which the Arithmetic Unit performs operations are received directly from Memory Switch 19 and Register Switch 21.

The Arithmetic Unit comprises an upper half 301 and a lower half 302. Upper half 301, comprising 18 digit stages S-1, S-2 . . . S-18, is adapted to perform an arithmetic or logical combination on the most significant 18 digits of a data word received from Memory Switch 19 and a data word received from Register Switch 21, and to provide the corresponding 18 result digit signals, S1, S2 . . . S18. Lower half 302, comprising 18 digit stages S-19, S-20 . . . S-36, is adapted to perform an arithmetic or logical combination on the least significant 18 digits of a data word received from Memory Switch 19 and a data word received from Register Switch 21, and to provide the corresponding 18 result digit signals S19, S20 . . . S36. Each stage of upper half 301 and lower half 302 provides an arithmetic or logical combination on the respective pair of binary digits received. Each stage also responds to a carry signal received from the next lower order stage for providing both a corresponding output result digit signal and a corresponding carry signal for the next higher stage. Arithmetic units for performing the arithmetic and logical operations described herein are well-known in the art.

The type of operation performed by Arithmetic Unit 20 is determined by the control signal provided. Two such control signals are illustrated in FIG. 13; namely, an ADD signal and a SUB signal for controlling the respective arithmetic operations of addition and subtraction. Other control signals, not necessary to the description herein, may be applied to Arithmetic Unit 20 for controlling various logical operations.

The ADD control signal is generated by an OR-gate 305 and delivered on a lead 306 to both halves of the Arithmetic Unit. OR-gate 305 receives the XLD, XST, and OIC signals on respective input leads. Accordingly, the Arithmetic Unit performs the operation of addition on the pair of data words provided by Memory Switch 19 and Register Switch 21 when either the XLD or XST command signals are provided by one of the External Units or when an internal command, directed by Command Register 10, requires that this operation be performed (OIC signal). The SUB control signal is provided on a lead 307 when a subtraction operation is required by the System.

A lead 309 couples the carry signal generated by the 19th stage of the Arithmetic Unit to the 18th stage. An additional signal may be transferred to lead 309 from a lead 310 and similarly coupled to the 18th stage. This control signal, provided on lead 310, is identified as the CARRY-18 signal. The application of the CARRY-18 signal to lead 310 is effective to add the quantity 1 to the contents of upper half 301 of the Arithmetic Unit. A lead 311 similarly couples the carry signal generated by the most significant stage of the Arithmetic Unit to the least significant stage, as required. A lead 312 also supplies a signal, identified as the CARRY-36 signal, to lead 311 for application to the least significant stage of the Arithmetic Unit. The application of the CARRY-36 signal to lead 312 is effective to add the quantity 1 to the contents of lower half 302.

The output signals of the Arithmetic Unit 20, representing the digital results of the arithmetic or logical operation performed, may be transmitted to M Register 102 or AR Register 103 of Memory Unit 18, or may be transmitted to A Register 23, Q Register 24, X Register 25, or Instruction Counter 26.

Arithmetic Unit 20 is adapted to transfer a data word therethrough without performing an arithmetic or logic operation on the word. For example, if a data word is provided by Memory Switch 19, no data word is provided by Register Switch 21, and the ADD control signal is supplied, the output result signals delivered by the Arithmetic Unit represent the data word supplied by the Memory Switch. In a similar manner data may be transferred unaltered through the Arithmetic Unit from Register Switch 21.

Memory Switch

Memory Switch 19 provides one source of data items for Arithmetic Unit 20. The contents of all or a portion of M Register 102 are selectively gated by Memory Switch 19 to Arithmetic Unit 20 under control of various signals provided by Control Unit 30. Additionally, data items representing predetermined numbers may be selectively gated by Memory Switch 19 to Arithmetic Unit 20.

Memory Switch 19 is partially illustrated by the schematic diagram of FIG. 14. The gates of Memory Switch 19 receive input signals, $M(i)$ directly from the individual flip-flops of M Register 102. These M Register signals are selectively transferred to the Arithmetic Unit on the output leads 315–325 of the Memory Switch, the signals on these output leads being designated, generally, as $M_{SW}(i)$. Each Memory Switch output signal is directly coupled to the corresponding digit stage of the Arithmetic Unit. For example, the $M_{SW}1$ output signal provided on lead 315 is coupled to digit stage S-1. The output signals delivered by Memory Switch 19 are provided by a plurality of OR-gates 327.

Six control signals selectively transfer the contents of the M Register through Memory Switch 19; namely, the control signals designated as $MR_{1-18}$ CONT, $MR_{19-36}$ CONT, $M_{i+1}$ CONT, $M_{i+6}$ CONT, $M_{i+6}$ ROT, and $MR_{SW36}$ CONT. The MR-18 CONT signal transfers the 18 most significant digits of the M Register to the Arithmetic Unit upper half by enabling AND-gates 328. The $MR_{19-36}$ CONT signal transfers the 18 least significant digits of the M Register to the Arithmetic Unit lower half by enabling AND-gates 329. Accordingly, the $MR_{1-18}$ CONT and $MR_{19-36}$ CONT signals, together, transfer the contents of the entire M Register to the Arithmetic Unit.

The $M_{i+1}$ CONT signal transfers each of the 2nd to 36th digits in the M Register to the next higher digit stages in the Arithmetic Unit by enabling AND-gates 330. The $M_{i+1}$ CONT signal also transfers a binary 0 to the least significant digit stage of the Arithmetic Unit. Accordingly, the $M_{i+1}$ CONT signal shifts upwardly (to a more significant order) by one digit position the M Register contents and transfers the shifted contents to the Arithmetic Unit. In such transfer the most significant digit in the M Register is lost.

The $M_{i+6}$ CONT signal transfers each of the 7th to 36th digits in the M Register to an Arithmetic Unit digit stage accorded six higher orders of significance by enabling AND-gates 331. Accordingly, the $M_{i+6}$ CONT signal shifts upwardly by six digit positions the M Register contents and transfers the shifted contents to the Arithmetic Unit. In such transfer, the six most significant digits in the M Register are lost, unless the $M_{i+6}$ ROT signal is also effective.

The $M_{i+6}$ ROT signal transfers the six most significant digits in the M Register to corresponding ones of the six least significant digit stages of the Arithmetic Unit by enabling AND-gates 332. Accordingly, the $M_{i+6}$ CONT and $M_{i+6}$ ROT signals, together, rotate the contents of the M Register upwardly through six digit positions and transfer the rotated contents to the Arithmetic Unit.

The $MR_{SW36}$ CONT signal transfers the most significant digit in the M Register to the least significant digit stage of the Arithmetic Unit by enabling AND-gate 333.

The IFSCY–SUBTALLY signal transfers six binary digits, 111010, representing the decimal number 58, to the six least significant digit stages of the Arithmetic Unit by enabling AND-gates 334. The ISSCY–SUBTALLY signal transfers six binary digits, 011100, representing the decimal number 28, to the six least significant digit stages of the Arithmetic Unit by enabling AND-gates 335.

Each of OR-gates 336 delivers an output signal representing a binary 1 whenever any one of the corresponding ones of AND-gates 332, 334, or 335 delivers an output signal representing a binary 1.

*Memory switch—Control apparatus*

That portion of Control Unit 30 directed toward providing the control signals for Memory Switch 19 is shown in FIG. 15.

An OR-gate 360 delivers the $MR_{1-18}$ CONT signal on a lead 340. OR-gate 360 receives the output signal delivered by an AND-gate 361 on one input lead, the output signal delivered by an AND-gate 362 on another input lead, and the OIC signal on another input lead. AND-gate 361 receives the ITSFCY signal on one input lead and the output signal delivered by an OR-gate 363 on the other input lead. OR-gate 363 receives the output signals delivered by AND-gates 364 and 365 on respective input leads. AND-gate 364 receives the G1 signal on one input lead, the SH1 signal, in inverted logic sense, on another input lead, and the SH6 signal, in inverted logic sense, on another input lead. AND-gate 365 receives the M21 signal, in inverted logic sense, on one input lead and the GLU signal on the other input lead.

AND-gate 362 receives the output signals delivered by OR-gates 366, 367, and 368 on respective input leads. OR-gate 366 receives the GLU and G1 signals on respective input leads. OR-gate 367 receives the INSCY and IMSCY signals on respective input leads. OR-gate 368 receives the GLU signal, in inverted logic sense, on one input lead, and the output signal delivered by an AND-gate 369 on the other input lead. AND-gate 369 receives the output signal delivered by an OR-gate 370 on one input lead and the INLU signal, in inverted logic sense, on the other input lead. OR-gate 370 receives the XFF signal, in inverted logic sense (FIG. 26) on one input lead, and the INDCY signal on the other input lead.

Accordingly, the output signal delivered by OR-gate 360 is represented by the following equation:

(28) $MR_{1-18}\ CONT = ITSFCY\ (\overline{SH1}\ \overline{SH6}\ G1 + \overline{M21}\ GLU) + OIC + [GLU + G1]\ [IMSCY + \overline{IMSCY}]\ [\overline{GLU} + \overline{INLU}\ (\overline{XFF} + INDCY)]$ This equation represents delivery of the $MR_{1-18}$ CONT signal, representing a binary 1, when conditions in the System require the transfer of the contents of the most significant half of the M Register to the upper half of the Arithmetic Unit.

An AND-gate 374 delivers the $MR_{19-36}$ CONT signal on a lead 341. AND-gate 374 receives the output signal delivered by an OR-gate 375 on one input lead and the output signal delivered by an AND-gate 376 on the other input lead. OR-gate 375 receives the OIC signal on one input lead and the output signal delivered by an AND-gate 377 on the other input lead. AND-gate 377 receives the ITSFCY and G1 signals on respective input leads. AND-gate 376 receives the SH1 and SH6 signals, each signal in inverted logic sense, on respective input leads. Accordingly, the output signal delivered by AND-gate 374 is represented by the following equation:

(29) $MR_{19-36}\ CONT = (ITSFCY\ G1 + OIC)\ \overline{SH1}\ \overline{SH6}$

This equation represents the delivery of the $MR_{19-36}$ CONT signal, representing a binary 1, when conditions in the System require the transfer of the contents of the least significant half of the M Register to the lower half of the Arithmetic Unit.

An OR-gate 380 delivers the $M_{i+1}$ CONT signal on a lead 342. OR-gate 380 receives the OIC signal on one input lead and the output signal delivered by an AND-gate 381 on the other input lead. AND-gate 381 receives the SH1 and $G0P_{1X}$ signals on respective input leads. Accordingly, the output signal delivered by AND-gate 380 is represented by the following equation:

(30) $M_{i+1}\ CONT = SH1\ G0P_{1X} + OIC$

This equation represents the delivery of the $M_{i+1}$ CONT signal, representing a binary 1, when conditions in the System require that the contents of the M Register be shifted upwardly by one digit position and transferred to the Arithmetic Unit.

An OR-gate 382 delivers the $M_{i+6}$ CONT signal on a lead 343. OR-gate 382 receives the output signal delivered by an AND-gate 383 on one input lead and the OIC signal on the other input lead. AND-gate 383 receives the $G0P_{1X}$ and SH6 signals on respective input leads. Accordingly, the output signal delivered by OR-gate 382 is represented by the following equation:

(31) $M_{i+6}\ CONT = SH6\ G0P_{1X} + OIC$

This equation represents the delivery of the $M_{i+6}$ CONT signal, representing a binary 1, when conditions in the System require that the contents of the M Register be shifted upwardly by six digit positions and transferred to the Arithmetic Unit.

An OR-gate 385 delivers the $MR_{SW36}$ CONT signal on a lead 345. OR-gate 385 receives the OIC signal on one input lead and the output signal delivered by an AND-gate 386 on the other input lead. AND-gate 386 receives the SH1, $G0P_{1X}$, and XLD signals on respective input leads. Accordingly, the output signal delivered by OR-gate 385 is represented by the following equation:

(32) $MR_{SW36}\ CONT = SH1\ G0P_{1X}\ XLD + OIC$

This equation represents the delivery of the $MR_{SW36}$ CONT signal, representing a binary 1, when conditions in the System require that the most significant digit in the M Register be transferred to the least significant digit stage of the Arithmetic Unit.

An OR-gate 387 delivers the $M_{i+6}$ ROT signal on a lead 344. OR-gate 387 receives the OIC signal on one input lead and the output signal delivered by AND-gate 388 on the other input lead. AND-gate 388 receives the XLD, $G0P_{1X}$, and SH6 signals on respective input leads. Accordingly, the output signal delivered by OR-gate 387 is represented by the following equation:

(33) $M_{i+6}\ ROT = SH6\ G0P_{1X}\ XLD + OIC$

This equation represents the delivery of the $M_{i+6}$ ROT signal, representing a binary 1, when conditions in the System require that the six most significant digits of the M Register be transferred to the six least significant digit stages of the Arithmetic Unit.

An AND-gate 390 delivers the ISSCY–SUBTALLY signal on a lead 347. AND-gate 390 receives the output signals delivered by AND-gates 391 and 392 on respective input leads. AND-gate 391 receives the ISSCY and G1 signals on respective input leads. AND-gate 392 receives the M31 and M32 signals, each signal in inverted logic sense, on respective input leads. Accordingly, the output signal delivered by AND-gate 390 is represented by the following equation:

(34)  $ISSCY\text{-}SUBTALLY = ISSCY \cdot G1 \cdot \overline{M31} \cdot \overline{M32}$ This equation represents the delivery of the ISSCY-SUBTALLY signal, representing a binary 1, when conditions in the System require that signals representing the decimal numeral 28 be transferred to the six least significant digit stages of the Arithmetic Unit.

An AND-gate 393 delivers the IFSCY-SUBTALLY signal on a lead 346. AND-gate 393 receives the output signals delivered by AND-gates 392 and 394 on respective input leads. AND-gate 394 receives the G1 and IFSCY signals on respective input leads. Accordingly, the output signal delivered by AND-gate 393 is represented by the following equation:

(35)  $IFSCY\text{-}SUBTALLY = IFSCY \cdot G1 \cdot \overline{M31} \cdot \overline{M32}$ This equation represents the delivery of the IFSCY-SUBTALLY signal, representing a binary 1, when conditions in the System require that signals representing the decimal numeral 58 be transferred to the six least significant digit stages of the Arithmetic Unit.

*Register Switch*

Register Switch 21 provides another source of data items for Arithmetic Unit 20. The contents of the A Register 23, the Q Register 24, the X Register 25, the Tag Register 28, the Instruction Counter 26, and the AR Register 103 of Memory Unit 18 are selectively gated by Register Switch 21 to Arithmetic Unit 20, under control of various control signals provided by Control Unit 30. Additionally, addresses and other data items provided by External Units 12–15 are selectively gated by Register Switch 21 to Arithmetic Unit 20.

Register Switch 21 comprises a plurality of AND-gates and OR-gates arranged similarly to those of Memory Switch 19 (FIG. 14), wherein a column, or group, of AND-gates is enabled by a particular control signal and thereupon transfers a plurality of data digits to the Arithmetic Unit. However, for clarity and simplicity, Register Switch 21 is shown symbolically in FIG. 16. The input control signals to Register Switch 21 are shown at the top of the diagram opposite the respective downwardly pointing arrows. The output digit signals are represented by the symbols $R_{SW}(i)$ at the right of the diagram. Each Register Switch output signal is directly coupled to the corresponding digit stage of the Arithmetic Unit. For example, the $R_{SW}1$ output signal is coupled to digit stage S-1. All of the signals represented in a column are gated to Arithmetic Unit 20 by the corresponding control signal denoted at the head of the column. Thus, the signals in each row in FIG. 16 represent the digits which are transferred to the corresponding digit stage of the Arithmetic Unit when the respective control signals identified at the head of the corresponding columns represent binary 1's.

The following data item transfers are effected by Register Switch 21 and illustrated by FIG. 16. The $A_i$ CONT signal transfers the 36 digits stored in the A Register to corresponding digit stages of the Arithmetic Unit. The $Q_i$ CONT signal transfers the 36 digits stored in the Q Register to corresponding digit stages of the Arithmetic Unit. The $X_i$ CONT signals transfers the 18 digits stored in the X register to corresponding digit stages of the upper half 301 of the Arithmetic Unit. The $T_i$ CONT signal transfers the six digits stored in the Tag Register to the respective digit stages S-13 to S-18 of the Arithmetic Unit. The ICT CONT signal transfers the 13 digits stored in the Instruction Counter to the respective digit stages S-6 to S-18 of the Arithmetic Unit. The ICT CONT signal, in addition, transfers binary 0 signals to the digit stages S-1 to S-5 of the Arithmetic Unit. The ADB CONT signal transfers the 16 digits provided on the ADB lines (FIG. 23) to the respective digit stages S-3 to S-18 of the Arithmetic Unit. The ADB CONT signal, in addition, transfers binary 0 signals to the digit stages S-1 and S-2 of the Arithmetic Unit. The DA CONT signal transfers the 36 digits provided on the DA lines (FIG. 24) to corresponding digit stages of the Arithmetic Unit. The AR CONT signal transfers the 13 digits stored in the AR Register of the Memory Unit to the respective digit stages S-6 to S-18 of the Arithmetic Unit. The AR CONT signal, in addition, transfers binary 0 signals to the digit stages S-1 to S-5 of the Arithmetic Unit.

*Register Switch—Control apparatus*

That portion of Control Unit 30 directed toward providing the control signals for Register Switch 21 is shown in FIG. 17.

An OR-gate 401 delivers the $A_i$ CONT signal on a lead 402. OR-gate 401 receives the OIC signal on one input lead and the output signal delivered by an AND-gate 403 on the other input lead. AND-gate 403 receives the MOD-A signal on one input lead, the output signal delivered by an OR-gate 404 on another input lead and the output signal delivered by an OR-gate 405 on another input lead. OR-gate 404 receives the INSCY and IMSCY signals on respective input leads. OR-gate 405 receives the GLU and G1 signals on respective input leads. Accordingly, the output signal delivered by OR-gate 401 is represented by the following equation:

(36)  $A_i \ CONT = MOD\text{-}A \cdot$
$\qquad (INSCY + IMSCY) \cdot (G1 + GLU) + OIC$ This equation represents the delivery of the $A_i$ CONT signal, representing a binary 1, when conditions in the System require the transfer of the contents of the A Register to the Arithmetic Unit.

An OR-gate 407 delivers the $Q_i$ CONT signal on a lead 408. OR-gate 407 receives the OIC signal on one input lead and the output signal delivered by an AND-gate 409 on the other input lead. AND-gate 409 receives the MOD-Q signal on one input lead, the output signal delivered by OR-gate 404 on another input lead, and the output signal delivered by OR-gate 405 on another input lead. Accordingly, the output signal delivered by OR-gate 407 is represented by the following equation:

(37)  $Q_i \ CONT = MOD\text{-}Q \cdot$
$\qquad (INSCY + IMSCY) \cdot (G1 + GLU) + OIC$ This equation represents the delivery of the $Q_i$ CONT signal, representing a binary 1, when conditions in the System require the transfer of the contents of the Q register to the Arithmetic Unit.

An OR-gate 410 delivers the $X_i$ CONT signal on a lead 411. OR-gate 410 receives the OIC signal on one input lead and the output signal delivered by an AND-gate 412 on the other input lead. AND-gate 412 receives the MOD-X signal on one input lead, the output signal delivered by OR-gate 404 on another input lead, and the output signal delivered by OR-gate 405 on another input lead. Accordingly, the output signal delivered by OR-gate 410 is represented by the following equation:

(38)  $X_i \ CONT = MOD\text{-}X \cdot (INSCY$
$\qquad + IMSCY) \cdot (G1 + GLU) + OIC$ This equation represents the delivery of the $X_i$ CONT signal, representing a binary 1, when conditions in the System require the transfer of the contents of the X Register to the upper half of the Arithmetic Unit.

An OR-gate 413 delivers the $T_i$ CONT signal on the lead 414. OR-gate 413 receives the OIC signal on one input lead and the output signal delivered by an AND-gate 415 on the other input lead. AND-gate 415 receives the MOD–T signal on one input lead, the output signal delivered by OR-gate 404 on another input lead, and the G1 signal on another input lead. Accordingly, the output signal delivered by OR-gate 413 is represented by the following equation:

(39) $T_1\ CONT = MOD-T\ (INSCY + IMSCY)\ G1 + OIC$

This equation represents the delivery of the $T_1$ CONT signal, representing a binary 1, when conditions in the System require the transfer of the contents of the Tag Register to the upper half of the Arithmetic Unit.

An OR-gate 416 delivers the ICT CONT signal on the lead 417. OR-gate 416 receives the NORMAL–INLU and OIC signals on respective input leads. Accordingly, the output signal delivered by OR-gate 416 is represented by the following equation:

(40)  $ICT\ CONT = NORMAL-INLU + OIC$

This equation represents the delivery of the ICT CONT signal, representing a binary 1, when conditions in the System require the transfer of the contents of the Instruction Counter to the upper half of the Arithmetic Unit.

An AND-gate 418 delivers the ADB CONT signal on the lead 419. AND-gate 418 receives the GLU signal on one input lead, the output signal delivered by an OR-gate 420 on another input lead, and the INDCY signal, in inverted logic sense, on another input lead. OR-gate 420 receives the XLD, XST, and XXEC signals on respective input leads. Accordingly, the output signal delivered by AND-gate 418 is represented by the following equation:

(41) $ADB\ CONT = GLU\ \overline{INDCY}\ (XLD + XST + XXEC)$

This equation represents the delivery of the ADB CONT signal, representing a binary 1, when conditions in the System require the transfer of the signals provided on the ADB lines to the upper half of the Arithmetic Unit.

An OR-gate 422 delivers the DA CONT signal on a lead 423. OR-gate 422 receives the OIC signal on one input lead and the output signal delivered by an AND-gate 424 on the other input lead. AND-gate 424 receives the XST and $GOP_{1X}$ signals on respective input leads. Accordingly, the output signal delivered by OR-gate 422 is represented by the following equation:

(42)  $DA\ CONT = XST\ GOP_{1x} + OIC$

This equation represents the delivery of the DA CONT signal, representing a binary 1, when conditions in the System require the transfer of the signals provided on the DA lines to the Arithmetic Unit.

An OR-gate 425 delivers the AR CONT signal on a lead 426. OR-gate 425 receives the output signal delivered by an AND-gate 427 on one input lead and the OIC signal on the other input lead. AND-gate 427 receives the $ITSFCY \cdot M21$ signal and the GLU signal on respective input leads. Accordingly, the output signal delivered by OR-gate 425 is represented by the following equation:

(43)  $AR\ CONT = ITSFCY\ M21\ GLU + OIC$

This equation represents the delivery of the AR CONT signal, representing a binary 1, when conditions in the System require the transfer of the contents of the AR Register to the upper half of the Arithmetic Unit.

*Arithmetic unit—Control apparatus*

That portion of Control Unit 30 directed toward providing a pair of control signals for Arithmetic Unit 20 (FIG. 13) is also shown in FIG. 17. An OR-gate 430 delivers the CARRY–18 signal on a lead 310. OR-gate 430 receives the output signal delivered by an AND-gate 431 on one input lead, the output signal delivered by an AND-gate 432 on another input lead, the output signal delivered by an AND-gate 433 on another input lead, the output signal delivered by an AND-gate 434 on another input lead, and the OIC signal on another input lead. AND-gate 431 receives the NORMAL–INLU and GLU signals on respective input leads. AND-gate 432 receives the G1 signal on one input lead, the output signal delivered by an OR-gate 436 on another input lead and the output signal delivered by an AND-gate 437 on another input lead. OR-gate 436 receives the ISSCY and IFSCY signals on respective input leads. AND-gate 437 receives the M31, M32, M33, M34, M35, and M36 signals on respective input leads. AND-gate 433 receives the G1 and ITSCY signals on respective input leads. AND-gate 434 receives the GLU and $ITSFCY \cdot M21$ signals on respective input leads.

Accordingly, the output signal delivered by OR-gate 430 is represented by the following equation:

(44)  $CARRY-18 = NORMAL-INLU\ GLU + OIC$
$+ ITSCY\ G1 + ITSFCY\ M21\ GLU + G1\ (ISSCY$
$+ IFSCY)\ M31\ M32\ M33\ M34\ M35\ M36$

This equation represents the delivery of the CARRY-18 signal, representing a binary 1, when conditions in the System require the addition of a binary 1 to the data applied to upper half 301 of the Arithmetic Unit.

An OR-gate 440 delivers the CARRY–36 signal on the lead 312. OR-gate 440 receives the OIC signal on one input lead and the output signal delivered by an AND-gate 441 on the other input lead. AND-gate 441 receives the ITSFCY and G1 signals on respective input leads. Accordingly, the output signal delivered by OR-gate 440 is represented by the following equation:

(45)  $CARRY-36 = ITSFCY\ G1 + OIC$

This equation represents the delivery of the CARRY–36 signal, representing a binary 1, when conditions in the System require the addition of a binary 1 to the data applied to lower half 302 of the Arithmetic Unit.

DATA PROCESSING UNIT—INTERNALLY CONTROLLED OPERATION

There will now be described the manner of operation of the Data Processing Unit under sole control of a sequence of commands inserted into Command Register 10 from Memory Unit 18. This type of operation of the Data Processing Unit will hereinafter be identified as "internally controlled operation." During internally controlled operation, the Data Processing Unit executes a sequence of discrete operations on data, these operations being performed in response to a corresponding succession of commands transferred from Memory Unit 18 to Command Register 10, the succession of commands being independent of control by an External Unit.

The first phase of each discrete operation, during internally controlled operation, is the Instruction Cycle. Normally the Instruction Cycle is followed by an Indirect Cycle or an Operation Cycle. For a few types of commands an operation is completely executed during a single Instruction Cycle; however, a description of operations controlled by such commands is not pertinent to an understanding of the instant invention, and, accordingly, no further mention thereof will be made herein.

When an Operation Cycle follows an Instruction Cycle, a complete operation is executed in but two timing cycles. On the other hand, more than one Indirect Cycle may follow an Instruction Cycle, the last such Indirect Cycle normally being followed, in turn, by an Operation Cycle. Therefore, when an Indirect Cycle follows an Instruction Cycle, a complete operation requires three or more timing cycles for execution. Consequently, there will be described herein two types of operations which are executed by the System: a first type wherein the operation comprises an Instruction Cycle and an Operation Cycle, and a second type wherein the operation comprises an Instruction Cycle, one or more Indirect Cycles, and an Operation Cycle.

Generally, during an Instruction Cycle, an instruction is transferred to the M Register and the instruction controls the remainder of the operation. The instruction address controls the subsequent transfer to the M Register of an operand or an indirect word and the command portion controls the type of operation performed on the operand. During an Indirect Cycle, the control portion of the indirect word directs the type of indirect operation performed and the indirect word address identifies the storage location of a subsequent operand or indirect word. The indirect word may also provide for a following Indirect Cycle. During an Operation Cycle the command of the original instruction is executed on an operand provided from a storage location identified either during the Instruction Cycle or during an immediately preceding Indirect Cycle.

*Instruction Cycle*

During an Instruction Cycle an instruction is transferred from an address location in Storage Unit 101 to M Register 102 and subsequently the command portion of the instruction is transfered to Command Register 10, the tag portion of the instruction is transferred to Tag Register 28, and the address portion of the instruction is transferred to AR Register 103. Further, during an Instruction Cycle the modifier portion of the instruction is tested to determine whether the address portion is to be modified prior to transfer to the AR Register or whether the next timing cycle is to be an Indirect Cycle. Additionally, during an Instruction Cycle the I-digit is tested to determine whether the Data Processing Unit is to be permitted to be interrupted by an External Unit following completion of the current operation, or whether the next succeeding command is to be executed before an interrupt may be acknowledged.

The Instruction Cycle phase is controlled by the delivery of the INSCY signal by AND-gate 174 (FIG. 9) during a timing cycle. During the first clock period of the Instruction Cycle, the address of the instruction to be retrieved from Storage Unit 101 is transferred from Instruction Counter 26, through Register Switch 21, through Arithmetic Unit 20, wherein the address is incremented by 1, and to AR Register 103. This transfer is effected by the ICT CONT signal generated by OR-gate 416 (FIG. 17) and applied to Register Switch 21.

By the end of $t11$ of the Instruction Cycle the new instruction has been transferred from the addressed storage location in Storage Unit 101 to the M Register. During the $t12$ clock period, the output signal delivered by AND-gate 69 (FIG. 8) gates the command portion of the instruction to Command Register 10. This command remains in the Command Register for the duration of the operation and controls the type of operation performed during the succeeding Operation Cycle. At the same time that the command is transferred to the Command Register, Tag Register 28 receives the tag portion of the instruction.

During clock periods $t12$ and $t13$, the I-digit is tested, and if it represents a binary 1, the INH-INT flip-flop is transferred to the 1-state (Equation 18).

Immediately upon the transfer of the instruction to the M Register, the modifier thereof is tested. If the modifier is MOD-N (Table II), the next timing cycle is an Operation Cycle and the operand employed therein is obtained from the memory location identified by the address of the instruction. If the modifier is MOD-A, MOD-Q, MOD-X, or MOD-T the next timing cycle is also an Operation Cycle, but the operand employed therein is obtained from a memory location identified by the address of the instruction as modified by the register denoted by the modifier. Thus, if the modifier is MOD-T, the address of the instruction is incremented during clock period $t16$ by the contents of the Tag Register and the address so modified is subsequently transferred to the AR Register at the beginning of the following Operation Cycle. However, if the modifier is MOD-A, MOD-Q, or MOD-X the address of the instruction is incremented by the contents of the corresponding A Register, Q Register, or X Register when the address is transferred to the AR Register at the beginning of the following Operation Cycle. If the modifier is MOD-I, the next timing cycle is an Indirect Cycle and the indirect word employed therein is obtained from the memory location identified by the address of the instruction.

If the modifier is MOD-T, requiring modification of the instruction address by the Tag Register contents, the contents of the Tag Register are added to the address portion of the instruction word and the sum result replaces the original address portion of the instruction in the M Register at $t16$ of the Instruction Cycle. This step is represented by Equations 28, 39, and 26. Equation 28 represents by its subordinate logical group, G1 INSCY $\overline{GLU}$, the generation of the $MR_{1-18}$ CONT signal during $t15$ for transferring the address portion of the instruction in the M Register to the Memory Switch for application to the upper half of the Arithmetic Unit. Equation 39 represents by its subordinate logical group, MOD-T INSCY G1, the generation of the $T_1$ CONT signal during $t15$ for transferring the contents of the Tag Register to the Register Switch for application to the upper half of the Arithmetic Unit. Equation 26 represents by its subordinate logical group, MOD-T INSCY G1, the generation of the $ST_{MRU}$ signal during $t15$ for transferring the result digits provided by the upper half of the Arithmetic Unit to the Memory Register, where they are stored by the CP-16 clock pulse. Accordingly, by $t16$ of the Instruction Cycle, if the modifier is MOD-T, the original address in the instruction has been incremented by the contents of the Tag Register.

If the modifier is *not* MOD-I, the next timing cycle is an Operation Cycle. This sequence is represented by Equation 7, wherein the subordinate logical group OIC INSCY NORM-MODS represents the generation of the SET OPSCY signal for transferring the OPSCY flip-flop to the 1-state during the next timing cycle. If, however, the modifier is MOD-I, the next timing cycle is an Indirect Cycle. This sequence is represented by Equation 9, wherein the subordinate logical group MOD-I INSCY represents the generation of the SET INDCY signal for transferring the INDCY flip-flop for the 1-state during the next timing cycle.

For both the MOD-N and MOD-I modifiers, the address of the instruction is transferred to the AR Register, without modification, at the beginning of the following cycle, so that the new address in the AR Register thereupon represents either the location of the operand or the location of the indirect word to be employed. This step is represented by Equation 28, wherein the subordinate logical group GLU INSCY $\overline{INLU}$ $\overline{XFF}$ represents the generation of the $MR_{1-18}$ CONT signal during $t27-t30$ for transferring the address portion of the instruction in the M Register to the Memory Switch for application to the upper half of the Arithmetic Unit. Upon the occurrence of the CP-1 clock pulse of the following Operation Cycle or Indirect Cycle, the output signals delivered by the upper half of the Arithmetic Unit are gated directly to the AR Register.

If the modifier is MOD-A, MOD-Q, or MOD-X, the address of the instruction is incremented by the contents of the corresponding register when the address is transferred to the AR Register at the beginning of the following Operation Cycle. For MOD-A, this step is represented by Equation 36, wherein the subordinate logical group MOD-A INSCY GLU represents the generation of the $A_1$ CONT signal during $t27-t30$ for transferring the contents of the A Register to the Register Switch for application to the upper half of the Arithmetic Unit. For MOD-Q, this step is represented by Equation 37, wherein the subordinate logical group MOD-Q INSCY GLU represents the generation of the $Q_i$ CONT signal during $t27–t30$ for transferring the contents of the Q Register to the Register Switch for application to the upper half of the Arithmetic Unit. For MOD–X, this step is represented by Equation 38, wherein the subordinate logical group MOD–X INSCY GLU represents the generation of the $X_i$ CONT signal during $t27–t30$ for transferring the contents of the X Register to the Register Switch for application to the upper half of the Arithmetic Unit. Accordingly, for the MOD–A, MOD–Q, and MOD–X modifiers, at the same time that the address portion of the instruction in the M Register is being transferred to the Memory Switch, the contents of the respective A Register, Q Register, or X Register is being transferred to the Register Switch. The upper half of Arithmetic Unit 20 adds together the signal representations delivered by Memory Switch 19 and Register Switch 21 and upon the occurrence of the CP–1 clock pulse of the following Operation Cycle the sum result digits provided by Arithmetic Unit 20 are transferred to the AR Register.

Operation Cycle

During one type of Operation Cycle the operand is transferred from the addressed location in Storage Unit 101 to Register 102, an operation directed by the contents of Command Register 10 is performed on the operand, and preparations are completed for providing an Instruction Cycle as the next timing cycle.

The Operation Cycle phase is controlled by the delivery of the OPSCY signal by flip-flop 140 (FIG. 9) during a timing cycle. During the first clock period of the Operation Cycle, the address of the operand to be retrieved from Storage Unit 101 is transferred to AR Register 103 from M Register 102, in either unmodified or modified form. Apparatus for effecting this address transfer is described in the preceding section.

By the end of $t11$ of the Operation Cycle, the operand has been transferred from the addressed storage location in Storage Unit 101 to the M Register. From $t12–t15$ an arithmetic or logical operation is performed on the operand, under control of the command inserted into Command Register 10 during the preceding Instruction Cycle. The various OIC signals specified in the drawings are now effective to control the steps of these operations, these OIC signals originating as the output signals delivered by Command Decoder 72 of FIG. 8.

Following $t16$, initiation of the succeeding Instruction Cycle is now commenced. The first step is illustrated by Equation 21, which represents the generation of the INLU signal when the OPSCY and INDCY flip-flops are not to be transferred to their 1-states, a condition which occurs prior to an Instruction Cycle. The INLU signal initiates generation of the PRENORM–INLU signal Equation 22. Equation 22 represents by its subordinate logical group, $INLU \; \overline{XXEC} \; \overline{TTSFUT} \cdot \overline{II21} \; \overline{OIC}$, the generation of the PRENORM–INLU signal. The PRENORM–INLU signal, in turn, initiates generation of the NORMAL–INLU signal (Equation 23). Equation 23 represents the generation of the NORMAL–INLU signal at the time of occurrence of the GLU signal, $t27–t30$, providing a PRENORM–INLU signal issues. Therefore the NORMAL–INLU signal is generated during $t27–t30$.

The NORMAL–INLU signal which is generated, as described, at the conclusion of an Operation Cycle, directly controls the generation of the address for the next instruction and the transfer of such address to the AR Register. This step is represented by Equations 40 and 44. Equation 40 represents the generation of the ICT CONT signal by the NORMAL–INLU term thereof. The ICT CONT signal transfers the address of the instruction presently being executed and stored in Instruction Counter 26 through Register Switch 21 to the upper half of Arithmetic Unit 20. Equation 44 represents by its subordinate logical group, NORMAL–INLU GLU, the generation of the CARRY–18 signal during $t27–t30$. The CARRY–18 signal adds the quantity 1 to the contents of the upper half 301 of the Arithmetic Unit (FIG. 13) at the time that the contents of Instruction Counter 26 are being transferred through the Arithmetic Unit and to the AR Register. Accordingly, at $t1$ of the following Instruction Cycle the AR Register holds the address for an instruction in Storage Unit 101 next-following the address for the instruction which has just been executed. The output signals delivered by the upper half of the Arithmetic Unit to the AR Register at this time are also transferred in parallel to the Instruction Counter. Accordingly, the contents of the Instruction Counter are modified to represent the address of the instruction currently being executed.

However, the next successive instruction in Storage Unit 101 is *not* executed and the next timing cycle following the Operation Cycle may not be an Instruction Cycle, if one of the External Units provides a signal for interrupting the Data Processing Unit and if, in such event, the INH–INT flip-flop is not in its 1-state during the Operation Cycle. One type of signal provided by an External Unit, when acknowledged, controls issuance of either the SET OPSCY signal or the SET INDCY signal during $t27–t30$, thereby preventing issuance of the INLU signal, (Equation 21). Another type of signal provided by an External Unit, when acknowledged, prevents issuance of the PRENORM–INLU signal; i.e., if the XXEC signal (Equation 22) represents a binary 1, the PRENORM–INLU signal is suppressed during $t27–t30$. Inhibiting the PRENORM–INLU signal and, consequently, the NORMAL–INLU signal prevents the occurrence of the ICT–CONT signal (Equation 40). Hence, although the next timing cycle may be an Instruction Cycle, it will not be a normal Instruction Cycle inasmuch as the instruction word employed therein is obtained from a storage location determined by an address provided by an External Unit, rather than from a storage location determined by the contents of Instruction Counter 26.

The phases of operation of the system when an External Unit interrupt signal is acknowledged will be described in detail hereinafter.

Indirect Cycle

During an Indirect Cycle an indirect word is transferred from the addressed location in Storage Unit 101 to M Register 102. The control portion of the indirect word is then tested. If the control portion indicates that the indirect word has a modifier portion, the modifier portion is next tested. In accordance with the state of the modifier portion, the address of the indirect word may be incremented prior to its transfer to the AR Register at the conclusion of the Indirect Cycle. Additionally, in accordance with the modifier state the succeeding timing cycle is an Operation Cycle or an Indirect Cycle. If, however, the control portion indicates that the indirect word has a tally portion, rather than a modifier portion, the tally portion is appropriately incremented and certain control signals are generated. If no overflow into the E-digit position M21 (FIG. 2) results from the incrementation of tally portion, the address portion of the indirect word is transferred to the AR Register and the next timing cycle is an Operation Cycle. If, however, the incrementation of the tally portion results in an overflow into the E-digit position, the next timing cycle is an Instruction Cycle, wherein the instruction employed is obtained from a Storage Unit location immediately following the Storage Unit location of the indirect word employed in the Indirect Cycle.

The Indirect Cycle is controlled by the delivery of the INDCY signal by flip-flop 142 (FIG. 9) during a timing cycle. During the first clock period of the Indirect Cycle, the address of the indirect word to be retrieved from Storage Unit 101 is transferred to AR Register 103 from M Register 102, without modification. Apparatus for effecting this address transfer is described in the preceding section entitled "Instruction Cycle."

By the end of $t11$ of the Indirect Cycle, the indirect word has been transferred from the addressed storage location in Storage Unit 101 to the M Register. At this time the control portion of the indirect word in the M Register is tested, and the state of the contents determines the mode of performance of the Data Processing Unit in the remaining portion of the Indirect Cycle (see Table I). The four modes of operation in the Indirect Cycle are identified as the IMSCY, ITSCY, ISSCY, and IFSCY modes. The signals which control the mode of performance are generated by the apparatus shown in FIG. 9. A description of the detailed operation of the Data Processing Unit in each of the four indirect modes will now be described. The description of the four modes is supplemented by the following diagram.

28, wherein the subordinate logical group, GLU IMSCY $\overline{\text{INLU}}$ INDCY, represents the generation of the $MR_{1-18}$ CONT signal during $t27$–$t30$ for transferring the address portion of the indirect word in the M Register to the Memory Switch for application to the upper half of the Arithmetic Unit. Upon the occurrence of the CP–1 clock pulse of the following Operation Cycle, the output signals delivered by the upper half of the Arithmetic Unit are gated directly to the AR Register.

The initiation of the following timing cycle as an Operation Cycle is indicated by Equation 7, wherein the subordinate logical group, OIC IMSCY NORM–MODS represents the generation of the SET OPSCY signal for transferring the OPSCY flip-flop to the 1-state during the next timing cycle.

If the modifier is MOD–A, MOD–Q, MOD–T, or MOD–X, the address portion of the indirect word is trans-

DIAGRAM

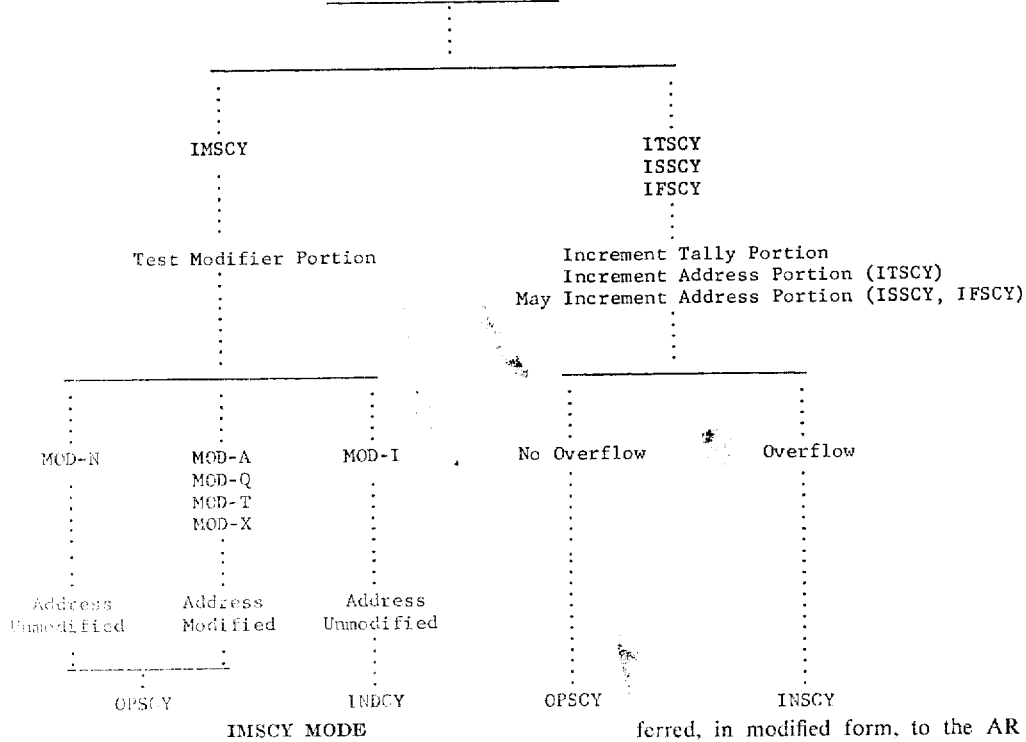

IMSCY MODE

In the IMSCY mode of operation, the address portion of the indirect word is employed either directly, or in modified form, for designating the location of the operand or indirect word to be employed in the succeeding timing cycle. Accordingly, the address provided in the initial instruction provides an indication of the location of the address of the operand to be subsequently employed in the operation.

The IMSCY mode is controlled by the delivery of the IMSCY signal by AND-gate 180 (FIG. 9) following transfer of the indirect word into the M Register during an Indirect Cycle. The IMSCY signal indicates that the M Register holds an indirect word–A comprising a modifier portion. Accordingly, the next step in this mode of operation is the testing of the modifier portion. Table II, provided previously herein, illustrates the signals generated in the IMSCY mode by the corresponding states of the modifier. One of these signals is generated in the IMSCY mode by the apparatus of FIG. 11.

If the modifier is MOD–N, the address portion of the indirect word is transferred, unmodified, to the AR Register, and the next timing cycle is an Operation Cycle. The transfer of the unmodified address portion of the indirect word to the AR Register is indicated by Equation ferred, in modified form, to the AR Register, and the next timing cycle is an Operation Cycle. If the modifier is MOD–T, the address portion of the indirect word is modified in the M Register by $t16$ of the Indirect Cycle. This modified address is subsequently transferred to the AR Register. If, however, the modifier is MOD–A, MOD–Q, or MOD–X, the address portion of the indirect word is modified at the time it is transferred through the Arithmetic Unit to the AR Register.

The modification of the address for the MOD–T modifier is represented by Equations 28, 39, and 26. Equation 28 represents by its subordinate logical group, G1 IMSCY $\overline{\text{GLU}}$, the generation of the $MR_{1-18}$ CONT signal during $t15$ for transferring the address portion of the indirect word in the M Register to the Memory Switch for application to the upper half of the Arithmetic Unit. Equation 39 represents by its subordinate logical group, MOD–T IMSCY G1, the generation of the $T_1$ CONT signal during $t15$ for transferring the contents of the Tag Register to the Register Switch for application to the upper half of the Arithmetic Unit. Equation 26 represents by its subordinate logical group, MOD–T IMSCY G1, the generation of the $ST_{MRU}$ signal during $t15$ for transferring the sum result digits provided by the upper half of the Arithmetic Unit to the M Register, wherein they are stored by the CP-16 clock pulse. Accordingly, by $t16$ of the IMSCY mode of Indirect Cycle, if the modifier is MOD-T, the original address in the indirect word has been incremented by the contents of the Tag Register.

The transfer of the address portion of the indirect word to the Arithmetic Unit for subsequent transfer to the AR Register is indicated by Equation 28, wherein the subordinate logical group, GLU IMSCY $\overline{\text{INLU}}$ INDCY, represents the generation of the $MR_{1-18}$ CONT signal during $t27-t30$ for transferring the address portion of the indirect word in the M Register to the Memory Switch for application to the upper half of the Arithmetic Unit. Upon the occurrence of the CP-1 clock pulse of the following Operation Cycle, the output signals delivered by the upper half of the Arithmetic Unit are gated directly to the AR Register. Where the modifier is MOD-T, the address portion has been modified previously at $t16$ and, accordingly, this modified address portion is transferred, through the Arithmetic Unit without further modification, to the AR Register. However, where the modifier is MOD-A, MOD-Q, or MOD-X this transfer of the address portion of the indirect word during $t27-t30$ is accompanied by a modification in the Arithmetic Unit. Thus, for the MOD-A modifier, this step is represented by Equation 36, wherein the subordinate logical group, MOD-A IMSCY GLU, represents the generation of the $A_i$ CONT signal during $t27-t30$ for transferring the contents of the A Register to the Register Switch for application to the upper half of the Arithmetic Unit. For the MOD-Q modifier this step is represented by Equation 37, wherein the subordinate logical group, MOD-Q IMSCY GLU, represents the generation of the $Q_i$ CONT signal during $t27-t30$ for transferring the contents of the Q Register to the Register Switch for application to the upper half of the Arithmetic Unit. For the MOD-X modifier, this step is represented by Equation 38, wherein the subordinate logical group, MOD-X IMSCY GLU, represents the generation of the $X_i$ CONT signal during $t27-t30$ for transferring the contents of the X Register to the Register Switch for application to the upper half of the Arithmetic Unit. Accordingly, where the modifier is MOD-A, MOD-Q, or MOD-X, during $t27-t30$ when the address portion of the indirect word in the M Register is being transferred to the Memory Switch, the contents of the respective A Register, Q Register, or X Register is being transferred to the Register Switch. The upper half of Arithmetic Unit 20 adds together the signal representations delivered by Memory Switch 19 and Register Switch 21, and upon the occurrence of the CP-1 clock pulse of the following Operation Cycle, the sum result digits provided by Arithmetic Unit 20 are transferred to the AR Register.

The initiation of the following timing cycle as an Operation Cycle for MOD-A, MOD-Q, MOD-T, and MOD-X is indicated by Equation 7 wherein the subordinate logical group, OIC IMSCY NORM-MODS, represents the generation of the SET OPSCY signal for transferring the OPSCY flip-flop to the 1-state during the next timing cycle.

If the modifier is MOD-I, the address portion of the indirect word is transferred, unmodified, to the AR Register, and the next timing cycle is an Indirect Cycle. The transfer of the unmodified address portion of the indirect word to the AR Register is indicated by Equation 28, wherein the subordinate logical group, GLU IMSCY $\overline{\text{INLU}}$ INDCY, represents the generation of the $MR_{1-18}$ CONT signal during $t27-t30$ for transferring the address portion of the indirect word in the M Register to the Memory Switch for application to the upper half of the Arithmetic Unit. Upon the occurrence of the CP-1 clock pulse of the following Indirect Cycle, the output signals delivered by the upper half of the Arithmetic Unit are gated directly to the AR Register.

The initiation of the following timing cycle as an Indirect Cycle is indicated by Equation 9, wherein the subordinate logical group, MOD-I IMSCY, represents the generation of the SET INDCY signal for transferring the INDCY flip-flop to the 1-state during the next timing cycle.

ITSCY MODE

In the ITSCY mode of operation, the address portion of the indirect word is employed directly for designating successive Storage Unit locations for employment by a particular command in a following Operation Cycle. Accordingly, the address provided in the initial instruction provides an indication of the location of the succession of addresses of the operands to be subsequently involved in the operation.

The ITSCY mode is controlled by the delivery of the ITSCY signal by AND-gate 181 (FIG. 9) following transfer of the indirect word into the M Register during an Indirect Cycle. The ITSCY signal indicates that the M Register holds an indirect word-B comprising a tally portion (FIG. 2).

The tally portion of an indirect word-B comprises digit positions 22–36. The 21st digit position, designated as the E-digit, is provided to indicate the presence of an overflow from the tally portion. The tally portion represents a number, the number being incremented for each execution of the command provided in the original instruction. At the same time that the tally is incremented, the address portion of the indirect word is also incremented. Thus, the tally serves as a record of the number of times the particular type of operation has been executed. The E-digit, or overflow digit, by providing a representation of an overflow from the tally portion, indicates that the particular operation has been executed a predetermined number of times.

At $t16$ of the ITSCY Indirect Cycle, the address and tally portions of the indirect word-B are both incremented by addition of the quantity 1. Incrementation of the address portion is represented by Equations 28, 44, and 26. Equation 28 represents by its subordinate logical group, ITSFCY $\overline{\text{SH1}}$ $\overline{\text{SH6}}$ G1, the generation of the $MR_{1-18}$ CONT signal during $t15$ for transferring the address portion of the indirect word in the M Register to the Memory Switch for application to the upper half of the Arithmetic Unit. The ITSFCY signal is generated (FIG. 9) for the Indirect Cycle modes wherein the modifier is not employed. Equation 44 represents by its subordinate logical group, ITSCY G1, the generation of the CARRY-18 signal during $t15$ for adding the quantity 1 to the data applied to the upper half of the Arithmetic Unit. Equation 26 represents by its subordinate logical group, ITSFCY G1, the generation of the $ST_{MRU}$ signal during $t15$ for transferring the sum result digits provided by the upper half of the Arithmetic Unit to the M Register. Accordingly, by $t16$ of the ITSCY mode, the address in the indirect word has been incremented by the quantity 1.

At the same time that the address is being incremented, the tally portion of the indirect word-B is also being incremented. This modification is represented by Equations 29, 45, and 27. Equation 29 represents by its subordinate logical group, ITSFCY G1 $\overline{\text{SH1}}$ $\overline{\text{SH6}}$, the generation of the $MR_{19-36}$ CONT signal during $t15$ for transferring the tally portion of the indirect word in the M Register to the Memory Switch for application to the lower half of the Arithmetic Unit. Equation 45 represents by its subordinate logical group, ITSFCY G1, the generation of the CARRY-36 signal during $t15$ for adding the quantity 1 to the data applied to the lower half of the Arithmetic Unit. Equation 27 represents by its subordinate logical group, ITSFCY G1, the generation of the $ST_{MRL}$ signal during $t15$ for transferring the sum result digits provided by the lower half of the Arithmetic Unit to the M Register. Accordingly, by t16 of the ITSCY mode, the tally in the instruction has been incremented by the quantity 1.

If incrementation of the tally portion at t16 of the ITSCY Indirect Cycle creates no overflow into flip-flop MR–21, the incremented address portion of indirect word–B is next transferred directly to the AR Register and the following timing cycle is an Operation Cycle. This transfer is indicated by Equation 28, wherein the subordinate logical group, ITSFCY $\overline{\text{M21}}$ GLU, represents the generation of the $MR_{1-18}$ CONT signal during t27–t30 for transferring the address portion of the indirect word in the M Register to the Memory Switch for application to the upper half of the Arithmetic Unit. Upon the occurrence of the CP–1 clock pulse of the following Operation Cycle, the output signals delivered by the upper half of the Arithmetic Unit are gated directly to the AR Register. The initiation of the following timing cycle as an Operation Cycle is indicated by Equation 7, wherein the subordinate logical group, OIC ITSFCY $\overline{\text{M21}}$, represents the generation of the SET OPSCY signal for transferring the OPSCY flip-flop to the 1-state during the next timing cycle.

However, if incrementation of the tally portion at t16 of the ITSCY Indirect Cycle results in the transfer of a binary 1 to the overflow flip-flop MR–21 in the M Register, the next timing cycle is an Instruction Cycle and the address portion of the indirect word is not transferred to the AR Register. Instead, the address transmitted to the AR Register is the address next following the address of the storage location from which the current indirect word–B has been retrieved. Thus, if an overflow results from incrementation of the tally portion, instead of the original instruction command being executed, a new instruction is executed. This new instruction may reinstate the original tally and address of indirect word–B, or may initiate a different type of operation.

If a tally overflow occurs, the succeeding Operation Cycle is prevented by the transfer of the MR–21 flip-flop to the 1-state. This is indicated by Equation 7, wherein the subordinate logical group, OIC ITSFCY $\overline{\text{M21}}$, represents suppression of the SET OPSCY signal when the MR–21 flip-flop is in the 1-state. In the absence of the OPSCY and INDCY signals the next timing cycle will be an Instruction Cycle (Equation 11). The transfer of an address next following the address of the location of the current indirect word is indicated by Equations 43 and 44. Equation 43 represents by its subordinate logical group, ITSFCY M21 GLU, the generation of the AR CONT signal during t27–t30 for transferring the contents of the AR Register to the Register Switch for application to the upper half of the Arithmetic Unit. Equation 44 represents by its subordinate logical group, ITSFCY M21 GLU, the generation of the CARRY–18 signal during t27–t30 for adding the quantity 1 to the data applied to the upper half of the Arithmetic Unit. Accordingly, upon the occurrence of the CP–1 clock pulse of the following Instruction Cycle, the address in the AR Register has been incremented by the quantity 1 and returned to the AR Register.

The ITSCY mode of operation is employed to automatically execute a particular command a predetermined number of times, the command involving an equal number of successive storage locations in Storage Unit 101. For example, a plurality of data word representations of the slant range of a moving target from a radar station may be stored in a succession of storage locations. By employing the ITSCY mode, the data words representing these ranges may be successively retrieved from Storage Unit 101, converted to horizontal distance, and restored in the same or different locations.

The maximum number of times a particular command may be executed with the ITSCY mode is $2^{15}-1$ times, since the tally is represented by 15 binary digits. Expressed as a decimal numeral, $2^{15}-1$ represents 32767.

For executing a particular command $n$ times, the contents of the tally portion must represent initially the decimal number $32767-n$ and the address portion must represent initially the starting address location less the quantity 1.

For example, if a required command must be executed four times and involve storage locations 1001–1004, the tally is preset to 32763 and the address portion to 1000. During the first ITSCY cycle, the tally and address portion are incremented to the numbers 32764 and 1001, respectively, and then the operation is executed. Thus, during the ensuing Operation Cycle, wherein the command provided by the corresponding Instruction Cycle is executed for the first time, the operation involves storage location 1001. The succession of operations in this example is represented by the following table.

TABLE III

| | Tally (end of ITSCY cycle) | Indirect Word Address (end of ITSCY cycle) | Over flow digit | OPSCY Follows | INSCY Follows |
|---|---|---|---|---|---|
| Original | 32763 | 1000 | 0 | | |
| 1st ITSCY | 32764 | 1001 | 0 | X | |
| 2nd ITSCY | 32765 | 1002 | 0 | X | |
| 3rd ITSCY | 32766 | 1003 | 0 | X | |
| 4th ITSCY | 32767 | 1004 | 0 | X | |
| 5th ITSCY | 00000 | 1005 | 1 | | X |

Therefore, Table III illustrates that the particular command is executed four times and involves four successive storage locations prior to the tally overflowing. The tally overflow forces the Data Processing Unit to branch to execute an instruction stored in the storage location immediately adjacent the storage location that stored the indirect word–B wherein the tally overflowed.

ISSCY MODE

In the ISSCY mode of operation, the address portion of the indirect word is employed directly for designating successive Storage Unit locations for employment by a particular command in a following Operation Cycle. Accordingly, the address provided in the initial instruction indicates the location of the succession of addresses of the operands to be subsequently involved in the operation. However, in performing this function, the ISSCY mode provides for the particular command to individually affect each digit held in all of the successive Storage Unit locations addressed.

The ISSCY mode is controlled by the delivery of the ISSCY signal by AND-gate 183 (FIG. 9) following transfer of the indirect word into the M Register during an Indirect Cycle. The ISSCY signal indicates that the M Register holds an indirect word–C comprising a tally portion and a subtally portion (FIG. 2).

The tally portion of an indirect word–C comprises digit positions 22–30 and the subtally portion comprises digit positions 31–36. The 21st digit position, designated as the E digit, is provided to indicate the presence of an overflow from the tally portion. The subtally portion represents a respective digit position of the storage location involved in the succeeding Operation Cycle. The subtally portion is incremented for each execution of the command provided in the original instruction. The subtally overflows into the tally when all 36 digits of a storage location have been involved by the command. The tally portion also represents a number, and is therefore incremented after the particular command provided in the original instruction has been executed 36 times. At the same time that the tally is incremented, the address portion of the indirect word is also incremented. Thus, the subtally provides an indication of the particular digit position to be involved in the succeeding Operation Cycle and the tally provides a record of the number of storage locations which have been involved in the series of operations. The E-digit, or overflow digit, by providing a representation of an overflow from the tally portion, indicates that the particular operation has involved a predetermined number of storage locations.

At $t16$ of the ISSCY Indirect Cycle, the subtally portion of the indirect word–C is incremented by the addition of the quantity 1. Additionally, at $t16$ of those ISSCY Indirect Cycles wherein the subtally portion overflows and adds the quantity 1 to the tally portion, the address portion of the indirect word–C is also incremented by the addition of the quantity 1. The incrementation of the subtally portion at $t16$ of the ISSCY Indirect Cycle is represented by Equations 29, 45, and 27. Equation 29 represents by its subordinate logical group, ITSFCY G1 $\overline{SIII}$ $\overline{SII6}$, the generation of the $MR_{19-36}$ CONT signal during $t15$ for transferring the subtally and tally portions of the indirect word in the M Register to the Memory Switch for application to the lower half of the Arithmetic Unit. Equation 45 represents by its subordinate logical group, ITSFCY G1, the generation of the CARRY–36 signal during $t15$ for adding the quantity 1 to the data applied to the lower half of the Arithmetic Unit. Equation 27 represents by its subordinate logical group, ITSFCY G1, the generation of the $ST_{MRL}$ signal during $t15$ for transferring the sum result digits provided by the lower half of the Arithmetic Unit to the M Register. Accordingly, by $t16$ of the ISSCY mode, the subtally in the indirect word has been incremented by the quantity 1. However, when all six digits of the subtally represent binary 1's (decimal 63) at the beginning of the ISSCY Indirect Cycle, incrementation of the subtally portion at $t15$ results in an overflow from the subtally to the 30th digit position of the tally; i.e., the least significant digit of the tally. Accordingly, in such instance, at $t16$, the subtally portion returns to zero and the tally portion of the indirect word is incremented by the quantity 1.

At the same time that the tally portion is incremented in an ISSCY Indirect Cycle wherein the subtally portion overflows, the address portion of the indirect word is also incremented. The incrementation of the address portion is represented by Equations 28, 44, and 26. Equation 28 represents by its subordinate logical group, ITSFCY $\overline{SIII}$ $\overline{SII6}$ G1, the generation of the $MR_{1-18}$ CONT signal during $t15$ for transferring the address portion of the indirect word in the M Register to the Memory Switch for application to the upper half of the Arithmetic Unit. Equation 44 represents by its subordinate logical group G1 ISSCY M31 M32 M33 M34 M35 M36, the generation of the CARRY–18 signal during $t15$ for adding the quantity 1 to the data applied to the upper half of the Arithmetic Unit. Equation 26 represents by its subordinate logical group, ITSFCY G1, the generation of the $ST_{MRU}$ signal during $t15$ for transferring the sum result digits provided by the upper half of the Arithmetic Unit to the M Register. Accordingly, by $t16$ of the ISSCY Indirect Cycle wherein the subtally portion overflows, the address in the indirect word has been incremented by the quantity 1.

During the timing cycle wherein an ISSCY Indirect Cycle is next executed, following the ISSCY Indirect Cycle wherein the subtally portion overflows into the tally portion and the subtally is restored to zero, the quantity 28, in addition to the quantity 1, is added to the subtally. By immediately modifying the subtally to represent the number 29 the ISSCY mode effects the execution of only 36 operations on the individual digits of a particular storage location before subtally overflow and the next storage location is addressed. The addition of the quantities 28 and 1 to the subtally portion of the indirect word during the ISSCY cycle wherein the subtally portion represents zero is indicated by Equations 34, 45, and 27. Equation 34 represents by its logical group, ISSCY G1 $\overline{M31}$, $\overline{M32}$, the generation of the ISSCY-SUBTALLY signal during $t15$ for transferring the quantity 28 to the Memory Switch for application to the lower half of the Arithmetic Unit (FIG. 14). Equations 45 and 27 represent, by subordinate logical groups described heretofore in the instant section, the respective generation of the CARRY–36 and $ST_{MRL}$ signals during $t15$. Accordingly, at $t15$, the ISSCY–SUBTALLY signal adds the quantity 28 to the subtally and the CARRY–36 signal adds the quantity 1 to the subtally. Accordingly, by $t16$ of the ISSCY mode wherein the subtally initially represents the quantity 0, the subtally has been modified and represents the quantity 29.

The aforementioned logical group of Equation 34 is effective only when the two most significant digits of the subtally portion each represent binary 0's. This condition is present only in the ISSCY Indirect Cycle immediately following the one in which the subtally overflows and is restored to zero, because in this following Indirect Cycle the addition of the quantity 29 to the subtally portion immediately forces the MR–32 flip-flop to the 1-state. For the next-following 36 ISSCY Indirect Cycles, either one or both of the MR–31 and MR–32 flip-flops are in the 1-state; i.e., until the subtally once again overflows.

In summary, therefore, the subtally portion is incremented during each ISSCY Indirect Cycle, but the address and tally portions of the indirect word–C are incremented only during those cycles wherein the subtally overflows.

If incrementation of the tally portion at $t16$ of the ISSCY Indirect Cycle creates no overflow into flip-flop MR–21, the address portion of the indirect word–C is next transferred directly to the AR Register and the following timing cycle is an Operation Cycle. This transfer is indicated by Equation 28, wherein the subordinate logical group, ITSFCY $\overline{M21}$ GLU, represents the generation of the $MR_{1-18}$ CONT signal during $t27$–$t30$ for transferring the address portion of the indirect word in the M Register to the Memory Switch for application to the upper half of the Arithmetic Unit. Upon the occurrence of the CP–1 clock pulse of the following Operation Cycle, the output signals delivered by the upper half of the Arithmetic Unit are gated directly to the AR Register.

The initiation of the following timing cycle as an Operation Cycle is indicated by Equation 7, wherein the subordinate logical group OIC ITSFCY $\overline{M21}$, represents the generation of the SET OPSCY signal for transferring the OPSCY flip-flop to the 1-state during the next timing cycle. In this Operation Cycle an operation directed by the command of the original instruction is executed and the operation involves a respective digit of the addressed storage location.

However, if incrementation of the tally portion at $t16$ of the ISSCY Indirect Cycle results in the transfer of a binary 1 to the overflow flip-flop MR–21, the next timing cycle is an Instruction Cycle and the address portion of the indirect word is not transferred to the AR Register. Instead, the address transferred to the AR Register is the address next following the address of the storage location from which the current indirect word–C has been retrieved. Thus, if an overflow results from incrementation of the tally portion, instead of the original instruction command being executed, a new instruction is executed. This new instruction may reinstate the original subtally, tally, and address of indirect word–C, or may initiate a different type of operation.

If a tally overflow occurs, the succeeding Operation Cycle is prevented by the transfer of the MR–21 flip-flop to the 1-state. This is indicated by Equation 7, wherein the subordinate logical group, OIC ITSFCY $\overline{M21}$, represents suppression of the SET OPSCY signal when the MR–21 flip-flop is in the 1-state. In the absence of the OPSCY and INDCY signals the next timing cycle will be an Instruction Cycle. The transfer of an address next following the address of the location of the current indirect word is indicated by Equations 43 and 44. Equation 43 represents by its subordinate logical group, ITSFCY M21 GLU, the generation of the AR CONT signal during t27–t30 for transferring the contents of the AR Register to the Register Switch for application to the upper half of the Arithmetic Unit. Equation 44 represents by its subordinate logical group, ITSFCY M21 GLU, the generation of the CARRY–18 signal during t27–t30 for adding the quantity 1 to the data applied to the upper half of the Arithmetic Unit. Accordingly, upon the occurrence of the CP–1 clock pulse of the following Instruction Cycle, the address in the AR Register has been incremented by the quantity 1 and returned to the AR Register.

At the time that the Operation Cycle is entered, the SH1–FF flip-flop is transferred to the 1-state. This flip-flop thereupon provides for an upward shift by one digit position of the operand retrieved from the identified storage location and transferred through the Memory Switch during the Operation Cycle. Thus, the SH1–FF flip-flop is the mechanism by which 36 successive executions of a particular command in the ISSCY mode of operation affects, individually, each one of the 36 digit positions of a storage location. The transfer of the SH1–FF flip-flop to the 1-state at the beginning of the Operation Cycle is indicated by Equation 12, wherein the logical group, ISSCY $\overline{M21}$ GLU, represents the generation of the SET SH1 signal for enabling the transfer of the SH1–FF flip-flop to the 1-state (FIG. 10). Upon the occurrence of the CP–1 clock pulse of the following Operation Cycle, the enabled flip-flop is transferred to the 1-state, and remains in the 1-state for the complete Operation Cycle. The flip-flop is restored to the 0-state at the end of the Operation Cycle, as indicated by Equation 13. The SH1 signal is the signal which directly controls the required shifting operation in the Operation Cycle. The SH1–FF flip-flop, in turn, controls generation of the SH1 signal, as indicated by Equation 16, wherein the subordinate logical group SH1–FF $\overline{XXEC}$ indicates the generation of the SH1 signal when the SH1–FF flip-flop is in the 1-state.

If the tally portion overflows during the ISSCY Indirect Cycle, the transfer of the MR–21 flip-flop to the 1-state inhibits transfer to the 1-state of the SH1–FF flip-flop, and therefore the flip-flop will not influence the subsequent Instruction Cycle (Equation 12).

The ISSCY mode of operation is employed to automatically execute a particular command to involve the contents of a predetermined number of storage locations in Storage Unit 101, and to execute the command for each digit of all of these storage locations. In employing the ISSCY mode, a data word stored in one of these locations may be retrieved from memory 36 times, a particular operation performed on each digit thereof, and when all 36 digits have been operated on the next successive data word may be similarly treated. This operation continues until a predetermined number of such data words have been affected by the same command operation.

The maximum number of storage locations a particular command may affect with the ISSCY mode is $2^9$ locations, since the tally is represented by nine binary digits. Expressed as a decimal numeral, $2^9$ represents 512. For executing a particular command on $n$ data words, the contents of the tally portion must represent initially the decimal number $512-n$, and the address portion must represent initially the starting address location. (The initial representations of the tally and address portions differ for the ISSCY mode of Indirect Cycle from those for the ITSCY mode, because in the ISSCY mode the address and tally portions are not incremented prior to the first Operation Cycle.)

For example, if the required command must involve storage locations 1001–1004, the tally is preset to 508 and the address portion to 1001. The subtally is preset to 27 in order that the particular command may be executed 36 times before the address and tally portions are incremented. The initial number 27 is provided because the subtally portion is incremented by the quantity 1 before the first Operation Cycle. During the first 36 executions of the particular command, the 36 digits of storage location 1001 are involved. During this period the subtally portion is incremented from the number 27 to the number 63. In the 37th ISSCY cycle the subtally is incremented again, but a digit overflows into the tally portion and the subtally is restored to zero. The digit overflowing into the tally portion changes the number represented therein to 509; at the same time, the address portion is incremented by the quantity 1 and, accordingly, during the succeeding Operation Cycle the first digit in storage location 1002 is affected by the command. The succession of operations involving the individual digits of the particular memory locations, for this example, is represented by the following Table IV and the successive operations involving complete data words in successive memory locations is represented by the following Table V.

TABLE IV

| ISSCY Cycle | Subtally Start of Cycle | Subtally End of Cycle | Subtally Overflow |
|---|---|---|---|
| 1 | 27 | 28 | |
| 2 | 28 | 29 | |
| 3 | 29 | 30 | |
| . | . | . | |
| . | . | . | |
| 36 | 62 | 63 | |
| 37 | 63 | 0 | X |
| 38 | 0 | 29 | |
| 39 | 29 | 30 | |
| . | . | . | |
| . | . | . | |
| 72 | 62 | 63 | |
| 73 | 63 | 0 | X |

TABLE V

| | Tally (end of ISSCY cycle) | Indirect Word Address (end of ISSCY cycle) | Overflow digit | OPSCY | INSCY |
|---|---|---|---|---|---|
| Original | 508 | 1001 | 0 | X | |
| 37th ISSCY | 509 | 1002 | 0 | X | |
| 73rd ISSCY | 510 | 1003 | 0 | X | |
| 109th ISSCY | 511 | 1004 | 0 | X | |
| 145th ISSCY | 0 | 1005 | 1 | | X |

Therefore, Tables IV and V illustrate that the particular command is executed 144 times and involves each of the digits of four successive storage locations prior to the tally overflowing. The tally overflow forces the Data Processing Unit to execute an instruction stored in the storage location immediately adjacent the storage location that stored the indirect word–C wherein the tally overflowed.

IFSCY MODE

In the IFSCY mode of operation, the address portion of the indirect word is employed directly for designating successive Storage Unit locations for employment by a particular command in a following Operation Cycle. Accordingly, the address provided in the initial instruction indicates the location of the succession of addresses of the operands to be subsequently involved in the operation. However, in performing this function, the IFSCY mode provides for the particular command to individually affect each 6-digit character held in all of the successive Storage Unit locations addressed.

The IFSCY mode is controlled by the delivery of the IFSCY signal by AND-gate 185 (FIG. 9) following transfer of the indirect word into the M Register during an Indirect Cycle. The IFSCY signal indicates that the M Register holds an indirect word–C comprising a tally portion and a subtally portion.

The indirect word–C employed for the IFSCY mode is of the same type as the indirect word–C, previously described, employed for the ISSCY mode. The subtally portion, however, represents a respective character position of the storage location involved in the succeeding Operation Cycle. The subtally portion is incremented for each execution of the command provided in the original instruction. The subtally overflows into the tally when all six characters of a storage location have been involved by the command. The tally portion also represents a number, and is therefore incremented after the particular command provided in the original instruction has been executed six times. At the same time that the tally is incremented, the address portion of the indirect word is also incremented. Thus, the subtally provides an indication of the particular character position to be involved in the succeeding Operation Cycle and the tally provides a record of the number of storage locations which have been involved in the series of operations. The F-digit, or overflow digit, by providing a representation of an overflow from the tally portion, indicates that the particular operation has involved a predetermined number of storage locations.

At $t16$ of the IFSCY Indirect Cycle, the subtally portion of the indirect word–C is incremented by the addition of the quantity 1. Additionally, at $t16$ of those IFSCY Indirect Cycles wherein the subtally portion overflows and adds the quantity 1 to the tally portion, the address portion of the indirect word–C is also incremented by the addition of the quantity 1. The incrementation of the subtally portion at $t16$ of the IFSCY Indirect Cycle is represented by Equations 29, 45, and 27. Equation 29 represents by its subordinate logical group, ITSFCY G1 $\overline{SIII}$ $\overline{SII6}$, the generation of the $MR_{19-36}$ CONT signal during $t15$ for transferring the subtally and tally portions of the indirect word in the M Register to the Memory Switch for application to the lower half of the Arithmetic Unit. Equation 45 represents by its subordinate logical group, ITSFCY G1, the generation of the CARRY–36 signal during $t15$ for adding the quantity 1 to the data applied to the lower half of the Arithmetic Unit. Equation 27 represents by its subordinate logical group, ITSFCY G1, the generation of the $ST_{MRL}$ signal during $t15$ for transferring the sum result digits provided by the lower half of the Arithmetic Unit to the M Register. Accordingly, by $t16$ of the IFSCY mode, the subtally in the indirect word has been incremented by the quantity 1. However, when all six digits of the subtally represent binary 1's (decimal 63) at the beginning of the IFSCY Indirect Cycle, incrementation of the subtally portion at $t15$ results in an overflow from the subtally to the 30th digit position of the tally; i.e., the least significant digit of the tally. Accordingly, in such instance, at $t16$, the subtally portion returns to zero and the tally portion of the indirect word is incremented by the quantity 1.

At the same time that the tally portion is incremented in an IFSCY Indirect Cycle wherein the subtally portion overflows, the address portion of the indirect word is also incremented. The incrementation of the address portion is represented by Equations 28, 44, and 26. Equation 28 represents by its subordinate logical group, ITSFCY $\overline{SIII}$ $\overline{SII6}$ G1, the generation of the $MR_{1-18}$ CONT signal during $t15$ for transferring the address portion of the indirect word in the M Register to the Memory Switch for application to the upper half of the Arithmetic Unit. Equation 44 represents by its subordinate logical group G1 IFSCY M31 M32 M33 M34 M35 M36, the generation of the CARRY–18 signal during $t15$ for adding the quantity 1 to the data applied to the upper half of the Arithmetic Unit. Equation 26 represents by its subordinate logical group, ITSFCY G1, the generation of the $ST_{MRU}$ signal during $t15$ for transferring the sum result digits provided by the upper half of the Arithmetic Unit to the M Register. Accordingly, by $t16$ of the IFSCY Indirect Cycle wherein the subtally portion overflows, the address in the indirect word has been incremented by the quantity 1.

During the timing cycle wherein an IFSCY Indirect Cycle is next executed, following the IFSCY Indirect Cycle wherein the subtally portion overflows into the tally portion and the subtally is restored to zero, the quantity 58, in addition to the quantity 1, is added to the subtally. By immediately modifying the subtally to represent the number 59 the IFSCY mode effects the execution of only six operations on the individual characters of a particular storage location before subtally overflow and the next storage location is addressed. The addition of the quantities 58 and 1 to the subtally portion of the indirect word during the IFSCY cycle wherein the subtally portion represents zero is indicated by Equations 35, 45, and 27. Equation 35 represents by its logical group, IFSCY G1 $\overline{M31}$ $\overline{M32}$, the generation of the IFSCY–SUBTALLY signal during $t15$ for transferring the quantity 58 to the Memory Switch for application to the lower half of the Arithmetic Unit (FIG. 14). Equations 45 and 27 represent, by subordinate logical groups described heretofore in the instant section, the respective generation of the CARRY–36 and $ST_{MRL}$ signals during $t15$. Accordingly, at $t15$ the IFSCY–SUBTALLY signal adds the quantity 58 to the subtally and the CARRY–36 signal adds the quantity 1 to the subtally. Accordingly, by $t16$ of the IFSCY mode wherein the subtally initially represents the quantity 0, the subtally has been modified and represents the quantity 59.

The aforementioned logical group of Equation 35 is effective only when the two most significant digits of the subtally portion each represent binary 0's. This condition is present only in the IFSCY Indirect Cycle immediately following the one in which the subtally overflows and is restored to zero, because in this following Indirect Cycle the addition of the quantity 59 to the subtally portion immediately forces the MR–31 flip-flop to the 1-state. For the next following six IFSCY Indirect Cycles, the MR–31 flip-flop is in the 1-state; i.e., until the subtally once again overflows.

In summary, therefore, the subtally portion is incremented during each IFSCY Indirect Cycle, but the address and tally portions of the indirect word–C are incremented only during those cycles wherein the subtally overflows.

If incrementation of the tally portion at $t16$ of the IFSCY Indirect Cycle creats no overflow into flip-flop M–21, the address portion of the indirect word–C is next transferred directly to the AR Register and the following timing cycle is an Operation Cycle. This transfer is indicated by Equation 28, wherein the subordinate logical group, ITSFCY $\overline{M21}$ GLU, represents the generation of the $MR_{1-18}$ CONT signal during $t27$–$t30$ for transferring the address portion of the indirect word in the M Register to the Memory Switch for application to the upper half of the Arithmetic Unit. Upon the occurrence of the CP–1 clock pulse of the following Operation Cycle, the output signals delivered by the upper half of the Arithmetic Unit are gated directly to the AR Register.

The initiation of the following timing cycle as an Operation Cycle is indicated by Equation 7, wherein the subordinate logical group OIC ITSFCY $\overline{M21}$, represents the generation of the SET OPSCY signal for transferring the OPSCY flip-flop to the 1-state during the next timing cycle. In this Operation Cycle an operation directed by the command of the original instruction is executed and the operation involves a respective character of the addressed storage location.

However, if incrementation of the tally portion at $t16$ of the IFSCY Indirect Cycle results in the transfer of a binary 1 to the overflow flip-flop MR–21, the next timing cycle is an Instruction Cycle and the address portion of the indirect word is not transferred to the AR Register. Instead, the address transferred to the AR Register is the address next following the address of the storage location from which the current indirect word–C has been retrieved. Thus, if an overflow results from incrementation of the tally portion, instead of the original instruction command being executed, a new instruction is executed. This new instruction may reinstate the original subtally, tally, and address of indirect word–C, or may initiate a different type of operation.

If a tally overflow occurs, the succeeding Operation Cycle is prevented by the transfer of the MR–21 flip-flop to the 1-state. This is indicated by Equation 7, wherein the subordinate logical group, OIC ITSFCY $\overline{M21}$, represents suppression of the SET OPSCY signal when the MR–21 flip-flop is in the 1-state. In the absence of the OPSCY and INDCY signals the next timing cycle will be an Instruction Cycle. The transfer of an address next following the address of the location of the current indirect word is indicated by Equations 43 and 44. Equation 43 represents by its subordinate logical group, ITSFCY M21 GLU, the generation of the AR CONT signal during $t27$–$t30$ for transferring the contents of the AR Register to the Register Swith for application to the upper half of the Arithmetic Unit. Equation 44 represents by its subordinate logical group, ITSFCY M21 GLU, the generation of the CARRY–18 signal during $t27$–$t30$ for adding the quantity 1 to the data applied to the upper half of the Arithmetic Unit. Accordingly, upon the occurrence of the CP–1 clock pulse of the following Instruction Cycle, the address in the AR Register has been incremented by the quantity 1 and returned to the AR Register.

At the time that the Operation Cycle is entered, the SH6–FF flip-flop is transferred to the 1-state. This flip-flop thereupon provides for an upward shift by six digit positions of the operand retrieved from the identified storage location and transferred through the Memory Switch during the Operation Cycle. Thus, the SH6–FF flip-flop is the mechanism by which six successive executions of a particular command in the IFSCY mode of operation affects, individually, each one of the six character positions of a storage location. The transfer of the SH6–FF flip-flop to the 1-state at the beginning of the Operation Cycle is indicated by Equation 14, wherein the logical group, IFSCY $\overline{M21}$ GLU, represents the generation of the SET SH6 signal for enabling the transfer of the SH6–FF flip-flop to the 1-state (FIG. 10). Upon the occurrence of the CP–1 clock pulse of the following Operation Cycle, the enabled flip-flop is transferred to the 1-state, and remains in the 1-state for the complete Operation Cycle. The flip-flop is restored to the 0-state at the end of the Operation Cycle, as indicated by Equation 15. The SH6 signal is the signal which directly controls the required shifting operation in the Operation Cycle. The SH6–FF flip-flop, in turn, controls generation of the SH6 signal, as indicated by Equation 17, wherein the subordinate logical group SH6–FF $\overline{XXFC}$ indicates the generation of the SH6 signal when the SH6–FF flip-flop is in the 1-state.

If the tally portion overflows during the IFSCY Indirect Cycle, the transfer of the MR–21 flip-flop to the 1-state inhibits transfer to the 1-state of the SH6–FF flip-flop, and therefore the flip-flop will not influence the subsequent Instruction Cycle (Equation 14).

The IFSCY mode of operation is employed to automatically execute a particular command to involve the contents of a predetermined number of storage locations in Storage Unit 101, and to execute the command for each character of all of these storage locations. In employing the IFSCY mode, a data word stored in one of these locations may be retrieved from memory six times, a particular operation performed on each character thereof, and when all six characters have been operated on the next successive data word may be similarly treated. This operation continues until a predetermined number of such data words have been affected by the same command operation.

The maximum number of storage locations a particular command may affect with the IFSCY mode is $2^9$ locations, since the tally is represented by nine binary digits. Expressed as a decimal numeral, $2^9$ represents 512. For executing a particular command on $n$ data words, the contents of the tally portion must represent initially the decimal number $512-n$, and the address portion must represent initially the starting address location. (The initial representations of the tally and address portions differ for the IFSCY mode of Indirect Cycle from those for the ITSCY mode, because in the IFSCY mode the address and tally portions are not incremented prior to the first Operation Cycle.)

For example, if the required command must involve storage locations 1001–1004, the tally is preset to 508 and the address portion to 1001. The subtally is preset to 57 in order that the particular command may be executed six times before the address and tally portions are incremented. The initial number 57 is provided because the subtally portion is incremented by the quantity 1 before the first Operation Cycle. During the first six executions of the particular command, the six characters of storage location 1001 are involved. During this period the subtally portion is incremented from the number 57 to the number 63. In the seventh IFSCY cycle the subtally is incremented again, but a digit overflows into the tally portion and the subtally is restored to zero. The digit overflowing into the tally portion changes the number represented therein to 509; at the same time, the address portion is incremented by the quantity 1 and, accordingly, during the succeeding Operation Cycle the first character in storage location 1002 is affected by the command. The succession of operations involving the individual characters of the particular memory locations, for this example, is represented by the following Table VI and the successive operations involving complete data words in successive memory locations are represented by the following Table VII.

TABLE VI

| IFSCY Cycle | Subtally Start of Cycle | Subtally End of Cycle | Subtally Overflow |
|---|---|---|---|
| 1 | 57 | 58 | |
| 2 | 58 | 59 | |
| 3 | 59 | 60 | |
| 4 | 60 | 61 | |
| 5 | 61 | 62 | |
| 6 | 62 | 63 | |
| 7 | 63 | 0 | X |
| 8 | 0 | 59 | |
| 9 | 59 | 60 | |
| 10 | 60 | 61 | |
| 11 | 61 | 62 | |
| 12 | 62 | 63 | |
| 13 | 63 | 0 | X |

TABLE VII

| | Tally (end of IFSCY cycle) | Indirect Word Address (end of IFSCY cycle) | Overflow digit | OPSCY Follows | INSCY Follows |
|---|---|---|---|---|---|
| Original | 508 | 1001 | 0 | X | |
| 7th IFSCY | 509 | 1002 | 0 | X | |
| 13th IFSCY | 510 | 1003 | 0 | X | |
| 19th IFSCY | 511 | 1004 | 0 | X | |
| 25th IFSCY | 0 | 1005 | 1 | | X |

Therefore, Tables VI and VII illustrate that the particular command is executed 24 times and involves each of the characters of four successive storage locations prior to the tally overflowing. The tally overflow forces the Data Processing Unit to execute an instruction stored in the storage location immediately adjacent the storage location that stored the indirect word–C wherein the tally overflowed.

EXTERNAL UNITS

External Units 12–15, described generally heretofore, transmit data words to the Data Processing Unit for storage in Memory Unit 18, receive data words from Memory Unit 18, and control the Data Processing Unit to execute commands selected by the External Units. Accordingly, the External Unit transmits signals to and receives signals from the Data Processing Unit, these signals including both data signals and control signals.

The signals transmitted and received by an External Unit are illustrated, symbolically, in FIG. 18 for a representative one of the External Units. Thus, External Unit C transmits an interrupt pulse–C on a lead 501. An interrupt pulse is transmitted when the corresponding External Unit requires communication with Memory Unit 18 or requires the Data Processing Unit to execute a command selected by the External Unit. At the same time the External Unit transmits an interrupt pulse, it transmits one or more external command signals and external address signals.

Each of the external command signals represents a command or a command supplement for initiating control of the Data Processing Unit to transfer data between Memory Unit 18 and the External Unit or to execute an internal instruction. The external command signals comprise the LOAD, STORE, SHIFT1, SHIFT6, and DIR/IND signals, these signals being provided on respective leads 502, 503, 504, 505, and 506. The LOAD signal initiates control of the Data Processing Unit to transfer data signals from Memory Unit 18 to the External Unit. The STORE signal initiates control of the Data Processing Unit to transfer data signals from the External Unit to the Memory Unit. The SHIFT1 signal initiates control of the Data Processing Unit to provide an upward shift, by one digit position, of the data word involved in a data transfer operation. The SHIFT6 signal initiates control of the Data Processing Unit to provide an upward shift, by six digit positions, of the data word involved in a data transfer operation. The DIR/IND signal determines whether the address of the storage location to be involved in a data transfer operation is obtained directly or indirectly. The absence of both the LOAD and STORE signals initiates control of the Data Processing Unit to execute an internal instruction selected by the External Unit.

The external address signals represent the storage location of Memory Unit 18 involved in the operation or instruction first executed by the Data Processing Unit under control of the corresponding External Unit. These address signals, representing an address of Storage Unit 101, are provided on the ADB bus of that External Unit, the ADB bus of Unit C comprising the leads 508.

When the STORE signal is transmitted, the External Unit also transmits signals representing the data digits to be stored. These data signals are delivered on the DA bus of that External Unit, the DA bus of Unit C comprising the leads 510. An External Unit may supply a single data digit signal, six data digits, simultaneously, or 36 data digits at a time. In the instance where but one data digit at a time is supplied by the External Unit, the 36 digits of a complete data word are delivered serially, one digit being supplied for each interrupt pulse provided. Similarly, where six digits are supplied, the digits representing a character, the six characters of a complete data word are delivered in sequence, one character being supplied for each interrupt pulse provided. When the External Unit delivers simultaneously the digits of a complete data word, this data word is transferred in its entirety to Storage Unit 101 following a single interrupt pulse provided by the External Unit.

When the LOAD signal is transmitted, the External Unit subsequently accepts output signals representing the data digits to be received upon receipt of an output pulse. These output signals are delivered from the M Register on a common Output Data Bus, comprising the leads 512, to all of the External Units. In a manner similar to the delivery of data signals by an External Unit for transfer upon the occurrence of a STORE signal, the output signals delivered on leads 512 may comprise one digit, the six digits of a character, or the 36 digits of a complete data word. The output pulse is delivered by Interrupt Control and Priority Allocation Unit 33 to the particular External Unit accorded communication with Memory Unit 18. In the example illustrated, External Unit C receives the corresponding output pulse on a lead 513.

In summary, an External Unit transmits an interrupt pulse for initiating control of the Data Processing Unit, one or more external command signals, and the address of a location in Storage Unit 101. If the External Unit is to transmit data to the Data Processing Unit for storage, a data item or a portion thereof, is supplied on the DA bus. If the External Unit is to receive data from the M Register, an output pulse provided by the Data Processing Unit controls the receipt of all or a portion of the digital contents of the M Register.

DATA PROCESSING UNIT—EXTERNAL UNIT COOPERATING APPARATUS

The Data Processing Unit provides apparatus (FIG. 1) for cooperating with External Units 12–15, such apparatus controlling the transfer of data between an External Unit and Memory Unit 18 or controlling the Data Processing Unit to execute instructions designated by the External Units.

Interrupt Control and Priority Allocation Unit 33 comprises an interrupt cell for each External Unit, a priority chain, and an output pulse switch. An interrupt cell provides timing, gating and priority control signals when the corresponding External Unit is granted communication with the Data Processing Unit. The priority chain accords recognition to the highest priority External Unit requiring communication with the Data Processing Unit. The output pulse switch supplies an output pulse to the External Unit granted communication for accepting data from the Memory Unit.

Input Command Switch 34 transmits to the Data Processing Unit the external command signals provided by the External Unit recognized for communication with the Data Processing Unit. Input Data Switch 32 transmits to the Data Processing Unit the external address signals provided by the External Unit recognized for communication with the Data Processing Unit. The Input Data Switch also transmits to the Data Processing Unit the data digit signals, if any, provided by the External Unit recognized for communication with the Data Processing Unit.

Control Unit 30 responds to external command signals delivered by Input Command Switch 34 for controlling the Data Processing Unit during its period of communication with an External Unit.

Interrupt cell

That portion of Interrupt Control and Priority Allocation Unit 33 directed toward providing timing, gating and priority control signals when the corresponding External Unit is granted communication with the Data Processing Unit is shown in FIG. 19. The apparatus of FIG. 19 is identified as an interrupt cell, and one such interrupt cell is provided for each External Unit. The interrupt cell effects the following functions:

(1) Storing a representation of an interrupt pulse delivered by the corresponding External Unit until this External Unit is granted communication with the Data Processing Unit;

(2) Aiding in controlling the sequence of steps performed by the Data Processing Unit in communicating with the respective External Unit;

(3) Providing gating signals for controlling the transfer of external command signals and external address signals provided by the corresponding External Unit, gating signals for controlling the transfer of data digit signals when this External Unit transfers data to Memory Unit 18, and gating signals for controlling the delivery of an output pulse to the corresponding External Unit when this External Unit receives data digits from Memory Unit 18; and (4) Providing a priority control signal to the priority chain for representing that the corresponding External Unit requires communication with the Data Processing Unit.

The interrupt cell illustrated in FIG. 19 is provided for External Unit C, although all interrupt cells are substantially alike. The interrupt cell comprises flip-flops 529 and 521, flip-flop 520 being designated as the $IS_C$ flip-flop, and flip-flop 521 being designated as the $IA_C$ flip-flop. When the $IS_C$ flip-flop is in the 1-state, a binary 1 output signal is delivered on the 1-output lead 523. This output signal, denoted as the $IS_C$ signal, when a binary 1, indicates that External Unit C has provided an interrupt pulse and thereby demanded communication with the Data Processing Unit. When the $IA_C$ flip-flop is in the 1-state, a binary 1 output signal is delivered on the 1-output lead 524. This output signal, denoted as the $IA_C$ signal, when a binary 1, provides a signal to the priority chain representing the allocated order of priority for communication with the Data Processing Unit.

External Unit C delivers an interrupt pulse–C on lead 501 when such External Unit requires communication with the Data Processing Unit. The signal delivered on lead 501 transfers the $IS_C$ flip-flop to the 1-state. Accordingly, the signal delivered on lead 501 and applied to the 1-input lead of the $IS_C$ flip-flop is represented by the following generalized equation

(46)     $SET\ IS(i) = INTERRUPT\ PULSE-(i)$

This equation represents the delivery of a signal representing a binary 1 when any one of the External Units, designated generally by the letter $(i)$, requires communication with the Data Processing Unit.

An AND-gate 526 delivers an output signal on lead 527 for transferring the $IS_C$ flip-flop to the 0-state. AND-gate 526 receives the TSI signal (FIG. 12) on one input lead and the $IAN_C$ signal on another input lead. Accordingly, the output signal delivered by AND-gate 526 and applied to the 0-input lead of the $IS_C$ flip-flop is represented by the the following generalized equation:

(47)     $RESET\ IS(i) = TSI\ IAN(i)$

This equation represents the delivery of an output signal representing a binary 1 during the last portion of the interval during which the corresponding External Unit is communicating with the Data Processing Unit.

An AND-gate 530 delivers an output signal on a lead 531 for transferring the $IA_C$ flip-flop to the 1-state. An AND-gate 532 delivers an output signal on a lead 533 for transferring the $IA_C$ flip-flop to the 0-state.

AND-gate 530 receives the TSI signal on one input lead and the signal delivered by the 0-output lead of the $IS_C$ flip-flop, in inverted logic sense, on the other input lead. Accordingly, the output signal delivered by AND-gate 530 and applied to the 1-input lead of the $IA_C$ flip-flop is represented by the following generalized equation:

(48)     $SET\ IA(i) = TSI\ IS(i)$

This equation represents the delivery of an output signal representing a binary 1 after an interrupt pulse has been received by the interrupt cell and at the time conditions in the Data Processing Unit permit an External Unit to communicate with the Data Processing Unit.

AND-gate 532 receives the CP–6 clock pulse on one input lead and the $IANS_C$ signal on another input lead. Accordingly, the output signal delivered by AND-gate 532 and applied to the 0-input lead of the $IA_C$ flip-flop is represented by the following generalized equation:

(49)     $RESET\ IA(i) = IANS(i)\cdot CP-6$

This equation represents the delivery of an output signal representing a binary 1 during the timing cycle following the transfer of the $IS(i)$ flip-flop to the 0-state.

An AND-gate 535, which is a portion of the priority chain (FIG. 21), delivers the $IAN_C$ signal on a lead 536. AND-gate 535 receives the $IA_C$ signal on one input lead, the $IS_C$ signal on another input lead, and the CH–B signal, in inverted logic sense, on another input lead. Accordingly, the output signal delivered by AND-gate 535 is represented by the following generalized equation:

(50)     $IAN(i) = IA(i)\ IS(i)\ \overline{CH-(i-1)}$

This equation represents delivery of the $IAN(i)$ signal, representing a binary 1, when the corresponding External Unit is the highest priority unit ready to communicate with the Data Processing Unit.

An AND-gate 538 delivers the $IANS_C$ signal on a lead 539. AND-gate 538 receives the $IA_C$ and $\overline{IS_C}$ signals on respective input leads. Accordingly, the output signal delivered by AND-gate 539 is represented by the following generalized equation:

(51)     $IANS(i) = IA(i)\ \overline{IS(i)}$

This equation represents the delivery of the $IANS(i)$ signal, representing a binary 1, when the corresponding External Unit has been granted communication with the Data Processing Unit.

An OR-gate 541, which is also a portion of the priority chain, delivers the CH–C signal on a lead 542. OR-gate 541 receives the $IAN_C$ signal on one input lead, and the CH–B signal, supplied on a lead 543, on the other input lead. Accordingly, the output signal delivered by OR-gate 541 is represented by the following generalized equation:

(52)     $CH-(i) = CH-(i-1) + IAN(i)$

This equation represents delivery of the CH–$(i)$ signal, representing a binary 1, when either External Unit $(i)$, or an External Unit allocated higher priority, is ready to communicate with the Data Processing Unit. Thus, if the CH–$(i-1)$ signal is a binary 1, an External Unit allocated higher priority than External Unit $(i)$ is ready to communicate with the Data Processing Unit.

The mode of operation and the sequence of the individual steps in the operation of the typical interrupt cell of FIG. 19 will now be described with reference to the waveforms of FIG. 20. The first waveform in FIG. 20 illustrates clock pulses which are employed in synchronizing and controlling the operation of the interrupt cell and their relative order of appearance in the timing cycle. The second waveform illustrates the relative time of arrival of an interrupt pulse–C. The time of arrival of the interrupt pulse need not be synchronized with any particular clock period of Timer 29; instead, it is a function of the interrupt cell to receive an interrupt pulse whenever it is supplied and to subsequently synchronize communication of the corresponding External Unit with the Data Processing Unit.

The $IS_C$ flip-flop is transferred to its 1-state upon the receipt of the corresponding interrupt pulse (Equation 46), as illustrated by the third waveform in FIG. 20. Accordingly, when the $IS_C$ flip-flop is in the 1-state it provides a representation that External Unit C has supplied an interrupt pulse and thereby requires communication with the Data Processing Unit. The $IS_C$ flip-flop remains in the 1-state until after External Unit C has been granted communication with the Data Processing Unit.

The TSI control signal is a signal which represents a binary 1 at the time of the occurrence of the CP–16 clock pulse if conditions in the Data Processing Unit permit interruption thereof and communication by an External Unit during the next following timing cycle (Equation 25). Accordingly, following receipt of the interrupt pulse–C signal and transfer of the $IS_C$ flip-flop to the 1-state, no further action takes place in the interrupt cell of FIG. 19 until the TSI signal becomes a binary 1, whereupon the $IA_C$ flip-flop is transferred to the 1-state. The $IA_C$ flip-flop now supplies a signal, representing a binary 1, to AND-gate 535 of the priority chain, this signal providing at the proper point in the chain an indication that External Unit C requires communication with the Data Processing Unit. If no External Unit allocated higher priority currently requires communication with the Data Processing Unit, the $IAN_C$ signal represents a binary 1 upon the transfer of the $IA_C$ flip-flop to the 1-state (Equation 50).

An $IAN_C$ signal, when a binary 1, represents that External Unit C was the highest priority External Unit requiring communication with the Data Processing Unit when the last-occurring TSI signal issued. In the waveform for the $IAN_C$ signal shown in FIG. 20, External Unit C has the highest priority of the External Units requiring communication with the Data Processing Unit, and accordingly at the time the $IA_C$ flip-flop is transferred to the 1-state, the $IAN_C$ signal also transfers to the 1-state.

Thus, the External Unit having the highest priority of the External Units requiring communication is granted such communication upon the occurrence of the TSI signal. At the next-following CP–1 clock pulse the steps of communication are initiated. Accordingly, in FIG. 20, at the time of occurrence of the second CP–1 clock pulse, External Unit C initiates communication with the Data Processing Unit.

At $t16$ of the last timing cycle of the interval during which External Unit C is communicating with the Data Processing Unit, another TSI signal is provided for indicating that the Data Processing Unit is ready to provide communication for another External Unit. At this time, the $IS_C$ flip-flop is transferred to the 0-state, and correspondingly, the $IANS_C$ signal transfers to the 1-state (Equations 47 and 51). The $IANS_C$ signal represents the completion of communication between the Data Processing Unit and External Unit C.

During the timing cycle immediately following the cycle wherein the $IANS_C$ signal transfers to the 1-state, the $IA_C$ flip-flop and the $IANS_C$ signal are each transferred to the 0-state (Equations 49 and 51). However, by $t1$ of this last timing cycle communication has either been granted to another External Unit, if one was requiring communication with the Data Processing Unit, or the Data Processing Unit has resumed execution of its normal sequence of commands from the point of interruption.

FIGURE 20 also illustrates the state of operation of an XFF flip-flop (FIG. 26). The XFF flip-flop, when in the 1-state, initiates control of the Data Processing Unit to provide the communication required by the External Unit acknowledged at that time. In the particular example illustrated in FIG. 20, the XFF flip-flop transfers to the 1-state near the conclusion of the timing cycle in which External Unit C is granted communication. The time of return of the XFF flip-flop to the 0-state is governed by several factors which will be described in detail hereinafter.

*Priority chain*

That portion of Interrupt Control and Priority Allocation Unit 33 directed toward recognizing and acknowledging the highest priority External Unit requiring communication with the Data Processing Unit is shown in FIG. 21. The apparatus of FIG. 21 is identified as the priority chain. The priority chain effects the following functions:

(1) Providing a representation of the External Unit currently recognized for communication with the Data Processing Unit, and (2) Providing a common chain output signal denoting that an External Unit has been recognized for communication with the Data Processing Unit.

All interrupt cells are coupled to the priority chain, the cells being coupled to the chain along its length in decreasing order of allocated priority. Accordingly, the interrupt cell allocated highest priority is coupled to the priority chain near the input end thereof and the interrupt cell allocated lowest priority is coupled to the chain near the output end thereof. The External Units are designated by successive letters of the alphabet in inverse order to their priority allocations. Thus, as shown in FIG. 21, External Unit A is allocated highest priority, External Unit B is allocated next highest priority, and External Unit S is allocated lowest priority.

The priority chain comprises a plurality of AND-gates 535 and a plurality of OR-gates 541, there being provided one AND-gate 535 for each interrupt cell. One OR-gate 541 is also provided for each interrupt cell except the cell allocated highest priority. Each AND-gate 535 delivers the corresponding $IAN_{(i)}$ signal on the output lead thereof; this signal, when a binary 1, denoting that the corresponding External Unit has been recognized for communication with the Data Processing Unit at that time. Each AND-gate 535, except for the AND-gate corresponding to the highest priority External Unit, receives the $IA_{(i)}$ and $IS_{(i)}$ signals on a pair of input leads, and the $CH-(i-1)$ signal, in inverted logic sense, on another input lead. The output signal delivered by each of these AND-gates is represented by the preceding Equation 50. Thus, an AND-gate 535 cannot deliver an output signal representing a binary 1 if an External Unit allocated higher priority than the External Unit corresponding to such AND-gate requires communication with the Data Processing Unit and thereby controls delivery of a $CH-(i-1)$ signal representing a binary 1. The AND-gate 535 corresponding to the highest priority External Unit receives no signal from a higher priority External Unit and therefore receives only the signals delivered by the interrupt cell for External Unit A. Therefore, if External Unit A requires communication with the Data Processing Unit, it inhibits such communication for all other External Units.

Accordingly, only one of the output signals $IAN_{(i)}$ of the priority chain can be a binary 1 at any one time, this signal representing the External Unit that is currently recognized for communication with the Data Processing Unit.

The chain of OR-gates 541 delivers the common chain output signal on a lead 550 when any one of the External Units has been recognized for communication with the Data Processing Unit. The output signal delivered on lead 550 is designated as the INT–PRES signal. For example, when External Unit B is recognized for communication, the CH–B output signal represents a binary 1 and this signal is coupled through the succeeding OR-gates 541 in the priority chain to provide an output signal on lead 550.

*Input Command Switch*

Input Command Switch 34 (FIG. 22) transmits to Control Unit 30 the external command signals provided by the External Unit currently recognized for communication with the Data Processing Unit. However, these external command signals, although transmitted, are not effective to initiate control of the Data Processing Unit until the corresponding External Unit is actually granted communication.

The gates of the Input Command Switch are coupled for receiving one or more of the external command signals LOAD, STORE, SHIFT1, SHIFT6, and DIR/IND from the corresponding External Unit. A particular External Unit may require only certain types of communication with the Data Processing Unit and, accordingly, only selected ones of the external command signals are delivered, as required. For example, in FIG. 22, External Unit C is shown as requiring only the communication operations controlled by the LOAD, SHIFT1 and DIR/IND external command signals. Accordingly, the STORE and SHIFT6 external command signals are either not provided by External Unit C or are not coupled to the Input Command Switch.

The external command signals provided by the External Units are selectively transmitted to Control Unit 30 on the output leads 601, 602, 603, 604, and 605 of the Input Command Switch. The output signal delivered on lead 601 is designated as the LOAD–COM signal. Similarly, the output signal delivered on leads 602–605 are designated respectively as the STORE–COM, SHIFT1–COM, SHIFT6–COM, and DIR/IND–COM signals.

The $IAN_{(i)}$ signals function as control signals for selectively transferring the external command signals applied to the gates of the Input Command Switch onto output leads 601–605. If one or more of the External Units require communication with the Data Processing Unit, only the $IAN_{(i)}$ signal corresponding to the one of these External Units allocated highest priority becomes a binary 1. If no External Unit requires communication, all $IAN_{(i)}$ signals are binary 0's.

A set of AND-gates is provided for receiving the external command signals delivered by each of the External Units. The corresponding $IAN_{(i)}$ signal is coupled to and enables each gate set for transferring the corresponding external command signals to output leads 601–605. For example, the $IAN_A$ signal transfers the external command signals provided by External Unit A to output leads 601–605 by enabling AND-gates 608 and the $IAN_C$ signal transfers the external command signals provided by External Unit C to output leads 601–605 by enabling AND-gates 609.

*Input Data Switch*

Input Data Switch 32 (FIGS. 23 and 24) transmits to Register Switch 21 the external address signals provided by the External Unit currently recognized for communication with the Data Processing Unit and the data digit signals provided by such External Unit if data is to be transmitted to the Data Processing Unit in the subsequent communication. However, these external address and data digit signals, although transmitted to Register Switch 21, are not further transmitted until the corresponding External Unit is actually granted communication.

A first group of gates (FIG. 23) of the Input Data Switch receives the external address signals provided by the External Units. These external address signals are selectively transmitted to Register Switch 21 on the output leads 615, designated generally as the ADB lines. The $IAN_{(i)}$ signals function as control signals for selectively transferring the external address signals applied to the first group of gates of the Input Data Switch onto output leads 615.

A set of the first group of AND-gates is provided for receiving the external address signals delivered by each of the External Units. The corresponding $IAN_{(i)}$ signal is coupled to and enables each such gate set for transferring the corresponding external address signals to the ADB lines. For example, the $IAN_A$ signal transfers the external address signals provided by External Unit A to the ADB lines by enabling AND-gates 619 and the $IAN_C$ signal transfers the external address signals provided by External Unit C to the ADB lines by enabling AND-gates 620.

A second group of gates (FIG. 24) of the Input Data Switch is coupled for receiving one or more data digits from the corresponding External Unit. A particular External Unit may provide the digits of a data word serially, and thereby supply one data digit at a time; may provide the characters of a data word serially, and therefore supply the six digits of a character simultaneously; or may provide all 36 digits of a data word simultaneously. For example, in FIG. 24, External Unit A is shown as supplying the six digits of a character simultaneously, External Unit C is shown as supplying but one digit, and External Units R and S are shown as supplying simultaneously the entire 36 digits of data words.

The data digit signals are selectively transmitted to Register Switch 21 on the output leads 625, designated generally as the DA lines. The $IAN_{(i)}$ signals function as control signals for selectively transferring the data digit signals applied to the second group of gates of the Input Data Switch onto output leads 625.

A set of the second group of AND-gates is provided for receiving the data digit signals delivered by each of the External Units. The corresponding $IAN_{(i)}$ signal is coupled to and enables each such gate set for transferring the corresponding data digit signals to the DA lines. For example, the $IAN_A$ signal transfers the data digit signals provided by External Unit A to the DA lines by enabling AND-gates 629.

Although the same $IAN_{(i)}$ signal transfers both the external address signals and the data digit signals provided by the corresponding External Unit to Register Switch 21, these transferred signals are applied to different sets of gates in Register Switch 21, as shown in FIG. 16.

*Output pulse switch*

That portion of Interrupt Control and Priority Allocation Unit 33 directed toward supplying an output pulse to the particular External Unit granted communication, is shown in FIG. 25. The apparatus of FIG. 25 is identified as the output pulse switch. An External Unit may respond to the output pulse provided by the output pulse switch to accept data digits from Memory Unit 18.

The output pulse switch comprises a plurality of AND-gates, such as AND-gates 635, 636, 637, 638, and 639. Each of these AND-gates is coupled to receive a respective one of the $IANS_{(i)}$ signals delivered by the interrupt cells. When one of the External Units is granted communication with the Data Processing Unit, the corresponding $IANS_{(i)}$ signal subsequently becomes a binary 1. The CP–1 clock pulse is applied to and enables AND-gates 635–639 during $t1$. Therefore, during the timing cycle following the issuance of an $IANS_{(i)}$ signal, the CP–1 clock pulse enables the corresponding one of AND-gates 635–639 to deliver an output pulse–$(i)$ signal on a corresponding lead.

For example, after External Unit C is granted communication with the Data Processing Unit the $IANS_C$ signal becomes a binary 1. Upon the occurrence of the next-following CP–1 clock pulse, an output pulse–C is delivered on lead 513 to External Unit C.

The output pulse signal transmitted to the corresponding External Unit enables such unit to accept the data digit signals provided on the output data bus, FIG. 18. Each External Unit continuously receives those data digit signals representing the contents of all or a portion of the M Register. However, only upon receipt of the corresponding output pulse signal is the External Unit enabled to accept the data digit signals.

*External communication—Control apparatus*

That portion of Control Unit 30 directed toward supplying control signals for controlling the Data Processing Unit during its period of communication with an External Unit is shown in FIG. 26. The apparatus of FIG. 26 delivers the required control signals in response to receipt of one or more external command signals when an External Unit is granted communication with the Data Processing Unit.

The transfer of a flip-flop 651, denoted as the XFF flip-flop, to its 1-state is the positive step which interrupts the normal sequential execution of commands by the Data Processing Unit and grants communication to the highest priority External Unit requiring communication at that time. When the XFF flip-flop is in the 1-state a binary 1 output signal, designated as the XFF signal, is delivered on the 1-output lead 371. The XFF signal enables the delivery of the required control signals by the apparatus of FIG. 26.

An AND-gate 655 delivers an output signal on a lead 656 for transferring the XFF flip-flop to the 1-state. An OR-gate 657 delivers an output signal on a lead 658 for transferring the XFF flip-flop to the 0-state.

AND-gate 655 receives the GSI, INT-PRES, and G3 signals on respective input leads. Accordingly, the output signal delivered by AND-gate 655 and applied to the 1-input lead of the XFF flip-flop is represented by the following equation:

(53) $SET\ XFF = GSI\ INT\text{-}PRES\ G3$

This equation represents the delivery of an output signal representing a binary 1 during $t20$-$t26$ of the timing cycle wherein a GSI signal occurs, providing an External Unit requires communication with the Data Processing Unit. The clock pulse input lead of the XFF flip-flop receives the TAS clock pulse. Accordingly, if the SET XFF signal is a binary 1 at the moment the $t27$ clock period is entered, the corresponding TAS clock pulse controls the XFF flip-flop to transfer to the 1-state and grant communication to the External Unit recognized for communication by the priority chain. FIGURE 20 illustrates a waveform of the XFF signal.

OR-gate 657 receives the output signals delivered by AND-gates 660 and 661 on respective input leads. AND-gate 660 receives the output signal delivered by AND-gate 655, in inverted logic sense, on one input lead, the output signal delivered by an OR-gate 662 on another input lead, and the G1 signal on another input lead. OR-gate 662 receives the INSCY signal on one input lead and the output signal delivered by an AND-gate 663 on the other input lead. AND-gate 663 receives the output signal delivered by an OR-gate 664 on one input lead and the OPSCY signal on the other input lead. OR-gate 664 receives the XLD and XST signals on respective input leads. AND-gate 661 receives GLU signal on one input lead and the ITSFCY M21 signal on the other input lead.

Accordingly, the output signal delivered by OR-gate 657 and applied to the 0-input lead of the XFF flip-flop is represented by the following equation:

(54) $RESET\ XFF = \overline{SET\ XFF}\ G1\ [INSCY\\ +OPSCY\ (XLD+XST)] + ITSFCY\cdot M21\ GLU$ This equation represents a delivery of an output signal representing a binary 1 when communication between an External Unit and the Data Processing Unit is to terminate. Accordingly, when the RESET XFF signal becomes a binary 1 the next TAS clock pulse controls the XFF flip-flop to transfer to the 0-state.

The XXEC control signal is generated by an AND-gate 671 and delivered on lead 78 (FIG. 26). The XXEC signal controls the Data Processing Unit to execute an internal instruction selected by the External Unit. AND-gate 671 receives the XFF signal on one input lead, the LOAD-COM signal, in inverted logic sense, on another input lead, and the STORE-COM signal, in inverted logic sense, on another input lead. Accordingly, the output signal delivered by AND-gate 671 is represented by the following equation:

(55) $XXEC = XFF\ \overline{LOAD\text{-}COM}\ \overline{STORE\text{-}COM}$

This equation represents the delivery of an output signal representing a binary 1 when the XFF flip-flop is in its 1-state, providing neither the LOAD-COM nor STORE-COM external command signals are supplied.

The XLD control signal is generated by an AND-gate 672 and delivered on lead 154. The XLD signal controls the Data Processing Unit to transfer data digit signals from Memory Unit 18 to an External Unit. AND-gate 672 receives the XFF and LOAD-COM signals on respective input leads. Accordingly, the output signal delivered by AND-gate 672 is represented by the following equation:

(56) $XLD = XFF\ LOAD\text{-}COM$

This equation represents the delivery of an output signal representing a binary 1 when the XFF flip-flop is in its 1-state and the LOAD-COM external command signal is supplied.

The XST control signal is generated by an AND-gate 673 and delivered on lead 155. The XST signal controls the Data Processing Unit to transfer data digit signals from an External Unit to the Memory Unit. AND-gate 673 receives the XFF and STORE-COM signals on respective input leads. Accordingly, the output signal delivered by AND-gate 673 is represented by the following equation:

(57) $XST = XFF\ STORE\text{-}COM$

This equation represents the delivery of an output signal representing a binary 1 when the XFF flip-flop is in the 1-state and the STORE-COM external command signal is supplied.

The XSH1 control signal is generated by an AND-gate 674 and delivered on lead 220. The XSH1 signal controls the Data Processing Unit to provide an upward shift, by one digit position, of the data word involved in the data transfer operation controlled by an External Unit. AND-gate 674 receives the XFF and SHIFT1-COM signals on respective input leads. Accordingly, the output signal delivered by AND-gate 674 is represented by the following equation:

(58) $XSH1 = XFF\ SHIFT1\text{-}COM$

This equation represents the delivery of output signal representing a binary 1 when the XFF flip-flop is in the 1-state and the SHIFT1-COM signal is supplied.

The XSH6 control signal is generated by an AND-gate 675 and delivered on lead 222. The XSH6 signal controls the Data Processing Unit to provide an upward shift, by six digit positions, of the data word involved in the data transfer operation controlled by an External Unit. AND-gate 675 receives the XFF and SHIFT6-COM signals on respective input leads. Accordingly, the output signal delivered by AND-gate 675 is represented by the following equation:

(59) $XSH6 = XFF\ SHIFT6\text{-}COM$

This equation represents the delivery of an output signal representing a binary 1 when the XFF flip-flop is in the 1-state and the SHIFT6-COM signal is supplied.

The XDIR control signal is generated by an AND-gate 676 and delivered on lead 157. The XDIR signal controls the direct addressing of the storage location to be involved in a data transfer controlled by an External Unit. AND-gate 676 receives the XFF and DIR/IND-COM signals on respective input leads. Accordingly, the output signal delivered by AND-gate 676 is represented by the following equation:

(60) $XDIR = XFF\ DIR/IND\text{-}COM$

This equation represents the delivery of an output signal representing a binary 1 when the XFF flip-flop is in the 1-state and the DIR/IND-COM signal represents a binary 1.

The INDX control signal is generated by an AND-gate 677 and delivered on lead 170. The INDX signal controls the indirect addressing of the storage location to be involved in a data transfer controlled by an External Unit. AND-gate 677 receives the XFF signal on one input lead and the DIR/IND–COM signal, in inverted logic sense, on the other input lead. Accordingly, the output signal delivered by AND-gate 677 is represented by the following equation:

(61) $\quad INDX = XFF \overline{DIR/IND-COM}$

This equation represents the delivery of an output signal representing a binary 1 when the XFF flip-flop is in the 1-state and the DIR/IND–COM signal represents a binary 0.

In summary, upon the transfer of the XFF flip-flop to the 1-state, one or more of the XXEC, XLD, XST, XSH1, XSH6, XDIR and INDX control signals are delivered by the apparatus of FIG. 26, in direct response to the ones of the LOAD–COM, STORE–COM, SHIFT1–COM, SHIFT6–COM and DIR/IND–COM signals which are transmitted to the Control Unit by the Input Command Switch from the External Unit granted communication with the Data Processing Unit.

DATA PROCESSING UNIT—EXTERNALLY CONTROLLED OPERATION

There will now be described the manner of operation of the Data Processing Unit under control of external commands supplied to Control Unit 30 from one of External Units 12–15. This type of operation of the Data Processing Unit will hereinafter be identified as "externally controlled operation." During externally controlled operation, the Data Processing Unit operates following interruption of its normal execution of a sequence of operations on data, this sequence having been performed in response to a corresponding succession of command portions of instructions transferred from Memory Unit 18. Following such interruption, the Data Processing Unit executes one of several types of discrete operations on data. Two classes of such operations are performed as externally controlled operations; namely, "explicit operations" and "implicit operations."

The explicit operation is executed when the External Unit provided communication with the Data Processing Unit supplies an explicit external command. An explicit external command specifies directly the type of operation to be performed on the data. The implicit operation is executed when the External Unit provides an implicit external command. An implicit external command controls the immediate retrieval of an instruction from the Memory Unit, the command portion of this instruction specifying and subsequently controlling the next-occurring operation.

Two explicit external commands may be provided by an External Unit: i.e., the LOAD and STORE commands. The LOAD command initiates control of the Data Processing Unit to transfer data digit signals from Memory Unit 18 to the External Unit. The STORE command initiates control of the Data Processing Unit to transfer data digit signals from the External Unit to the Memory Unit. Three external command supplements may be employed with an explicit external command; namely, the SHIFT1 command, the SHIFT6 command, and the DIR/IND command.

The single implicit external command which may be provided by an External Unit is represented by the absence of both of the LOAD and STORE external commands. No command supplements are employed with the implicit external command.

The first phase of each discrete operation, during externally controlled operation, depends on the type of external command supplied. When an explicit external command is executed, the first phase of operation is the Operation Cycle or the Indirect Cycle, according to whether the DIR/IND command signal represents respectively a binary 1 or a binary 0. When an implicit external command is executed, the first phase of operation is the Instruction Cycle.

For those externally controlled operations wherein the first phase is an Operation Cycle, the complete externally controlled operation requires only the single Operation Cycle and at the conclusion thereof control of the System is returned to the Data Processing Unit. If, however, the first phase of operation is the Indirect Cycle, one or more Indirect Cycles followed by a single Operation Cycle are required to complete the externally controlled operation. When the first phase of the externally controlled operation is the Instruction Cycle, control of the System is immediately returned to the Data Processing Unit during the Instruction Cycle, and the following cycles are determined by the command portion of the instruction employed. Therefore, the cycles of operation following such an Instruction Cycle are described herein under the preceding heading "Data Processing Unit—Internally Controlled Operation."

During the Instruction Cycle of an externally controlled operation an instruction word is transferred to the M Register from the storage location identified by the external address provided by the External Unit, and this instruction word controls the remainder of the operation. During the Indirect Cycle of an externally controlled operation the control portion of a channel control word directs the type of indirect operation performed and the channel control address identifies the storage location of a subsequent operand or indirect word. The channel control word may also provide for a following Indirect Cycle. During the Operation Cycle of an externally controlled operation the external command is executed on an operand with respect to a storage location identified by either the external address or the address portion of an immediately preceding channel control word.

Load operation—General

During an externally controlled load operation a single digit, a character, or a data word is transferred from the Memory Unit storage location identified by the external address signals to the External Unit granted communication with the Data Processing Unit. The ensuing description in the instant section relates to an externally controlled load operation wherein the external command supplement signals SHIFT1 and SHIFT6 are each binary 0's, but wherein the DIR/IND signal is a binary 1.

The externally controlled load operation is controlled by the delivery of the external LOAD command signal from the External Unit granted communication.

An External Unit is granted communication for controlling an externally controlled load operation when it supplies an interrupt pulse, a LOAD command signal, and external address signals representing the storage location of the data to be transferred. The interrupt pulse immediately transfers the $IS_{(i)}$ flip-flop of the corresponding interrupt cell to the 1-state, this step being represented by Equation 46. At this time the LOAD command signal is being applied to Input Command Switch 34 and the external address signals are being applied to Input Data Switch 32.

The next-occurring TSI signal (at $t16$), transfers the corresponding $IA_{(i)}$ flip-flop to the 1-state, this step being represented by Equation 48. If, at this time, the interrupt cell of this $IA_{(i)}$ flip-flop represents the highest priority External Unit currently requiring communication, the corresponding $IAN_{(i)}$ signal will issue, this occurrence being represented by Equation 50.

The $IAN_{(i)}$ signal that issues during the $t16$ clock period in which a TSI signal occurs (Equation 25) denotes the corresponding External Unit that will be granted communication with the Data Processing Unit in the next-following timing cycle. In the instant example, if at the moment the $IA_{(i)}$ flip-flop is transferred to the 1-state the corresponding interrupt cell does not represent the highest priority External Unit requiring communication, communication for the corresponding External Unit will be postponed until the first following TSI signal wherein such External Unit has the highest priority of the External Units requiring communication. This condition is achieved after higher priority External Units have had their communication requirements satisfied.

After the $IAN_{(i)}$ signal (FIG. 20) for the External Unit requiring the externally controlled load operation, transfers to the 1-state at $t16$ communication will be granted during the next-following timing cycle. The $IAN_{(i)}$ signal now provides for delivery of the INT-PRES signal by the priority chain (FIG. 21) and the Data Processing Unit thereupon has its normal sequential execution of operations interrupted. The $IAN_{(i)}$ signal also gates the LOAD command signal through Input Command Switch 34 (FIG. 22) to Control Unit 30 and the external address signals through Input Data Switch 32 (FIG. 23) to Register Switch 21.

The XFF flip-flop is provided to directly control interruption of the normal sequential execution of commands by the Data Processing Unit and to grant communication to the External Unit represented by the $IAN_{(i)}$ signal that is in the 1-state. The XFF flip-flop is transferred to the 1-state at $t27$ of the timing cycle wherein the INT-PRES signal occurs, as represented by Equation 53.

In its 1-state the XFF flip-flop now enables AND-gates 671–677 of Control Unit 30 (FIG. 26). Gates 672 and 676 which receive the respective LOAD–COM and DIR/IND–COM signals, each of these signals now being in the 1-state, deliver the respective XLD and XDIR control signals. The XLD and XDIR control signals are thus rendered effective at $t27$ of the timing cycle wherein the initiating External Unit is granted communication. In the Operation Cycle to follow, the XLD signal controls the Data Processing Unit to transfer data digits from Memory Unit 18 to the recognized External Unit.

The succeeding timing cycle is provided as an Operation Cycle by transfer of the OPSCY flip-flop to the 1-state at $t1$. Thus, in Equation 7, the subordinate logical group XLD XDIR $\overline{iTi}$ represents the generation of the SET OPSCY signal for transferring the OPSCY flip-flop to the 1-state at $t1$ of the timing cycle immediately following the issuance of the XLD signal. Additionally, at $t1$ of this timing cycle, the external address is transferred through Register Switch 21 and the upper half of Arithmetic Unit 20 to the AR Register of the Memory Unit. Thus, in Equation 41, the subordinate logical group GLU $\overline{INDCY}$ XLD represents the generation of the ADB CONT signal for transferring the external address signals through thhe Register Switch to the Arithmetic Unit. As has been described previously, the output signals of the upper half of the Arithmetic Unit are transferred to the AR Register at $t1$.

Memory unit 18 enters its read period at clock period $t1$, and by the end of clock period $t11$ of the Operation Cycle the data word has been transferred to the M Register from the storage location identified by the external address which is now in the AR Register. All or a portion of this data word in the M Register is continuously supplied to all External Units on the common output data bus until the M Register is cleared at $t6$ of the next timing cycle. The various External Units receive from the common data bus either the least significant digit in the M Register (the digit stored in the MR–36 flip-flop), the six least significant digits in the M Register, also identifiable as the least significant character (the digits stored in the MR–31 to MR–36 flip-flops), or the entire 36 digits in the M Register. However, although all the External Units continuously receive one or more of the digits stored in the M Register, no External Unit accepts the received digits until a corresponding output pulse (FIG. 18) is also received thereby.

Generation of this output pulse is initiated by the issuance of the TSI signal at $t16$ of the current Operation Cycle. The TSI signal, which is enabled by the GSI signal, issues at $t15$ because neither the OPSCY nor the INDCY flip-flop is ready to be transferred to the 1-state and, therefore, the INLU signal is a binary 1 (Equations 21, 22 and 24). If, however, another External Unit is at this time requiring communication, it will be recognized at $t16$ and by $t27$ a SET OPSCY or SET INDCY signal will issue.

The TSI signal transfers the $IS_{(i)}$ flip-flop to the 0-state at $t16$ (Equation 47). At the same time, the corresponding $IANS_{(i)}$ signal becomes a binary 1 (Equation 51).

During this same $t16$ clock period, inasmuch as the SET XFF signal has been a binary 0 during the immediately preceding $t15$ clock period (Equation 53), the XFF flip-flop is transferred to the 0-state, as represented in Equation 54 by the subordinate logical group, $\overline{SET}$ $\overline{XFF}$ G1 OPSCY XLD. The transfer of the XFF flip-flop to the 0-state thereby renders ineffective the XLD and XDIR signals (Equations 56 and 60).

During the first clock period of the timing cycle next following the Operation Cycle herein described the required data is accepted by the External Unit granted communication. Thus, the CP–1 clock pulse enables the delivery of an output pulse by the one of AND-gates 635–639 of the output pulse switch (FIG. 25) which receives $IANS_{(i)}$ signal at that time representing a binary 1. This output pulse is received by the corresponding External Unit and enables the unit to accept the data digits being received thereby from the M Register on the output data bus. The data word of the M Register at this time is the same data word transferred thereinto at the preceding $t11$ clock period.

Thus, the externally controlled load operation is completed by the delivery of an output pulse from the output pulse switch to the External Unit requiring such load operation at $t1$ of the timing cycle following the Operation Cycle. However, during the immediately preceding $t27$ clock period the Data Processing Unit may initiate another externally controlled operation or may resume control over its normal sequence of operations. In the latter instance, re-entry into the normal sequence of operations is provided by issuance of the ICT CONT and CARRY–18 signals during $t27$–$t30$ of the Operation Cycle, these signals delivering to the AR Register the address of the next-following instruction in the normal sequence of commands by $t1$ of the following cycle. (See previous section "Operation Cycle.") This early relinquishment of control to the Data Processing Unit is possible because the M Register is not again employed until $t11$ of the timing cycle following the Operation Cycle.

During an externally controlled load operation Control Unit 30 supplies the control signals for the Data Processing Unit in response to the external command signals received from an External Unit, and is rendered ineffective to respond to signals delivered by Command Register 10 by apparatus not shown in complete detail herein.

LOAD OPERATION—SHIFT MODIFICATIONS

During the previously described externally controlled load operation the data word to be transferred from the Memory Unit to the External Unit is rotated upwardly prior to the data transfer if either the SHIFT1 or the SHIFT6 command supplement signal is a binary 1 at the time that the load operation is initiated.

If the SHIFT1 signal is a binary 1 the data word to be transferred is rotated upwardly by one digit position prior to the data transfer. This type of operation is normally employed when the External Unit accepts but one data digit from the Memory Unit. In such instance, by employing the SHIFT1 signal during the externally controlled load operation, a serial transfer of the individual digits of the data word in the externally addressed storage location is provided during a succession of such load operations.

If the SHIFT6 signal is a binary 1 the data word to be transferred is rotated upwardly by six digit positions prior to the data transfer. This type of operation is normally employed when the External Unit accepts but one character from the Memory Unit. In this instance, by employing the SHIFT6 signal, a serial transfer of the characters of the data word addressed by the External Unit is provided during a succession of load operations.

When the External Unit providing the SHIFT1 or SHIFT6 signal is recognized, the corresponding $IAN_{(i)}$ signal gates the SHIFT1 or SHIFT6 command signal through Input Command Switch 34 (FIG. 22) to Control Unit 30. The subsequent transfer of the XFF flip-flop to the 1-state at $t27$ of the timing cycle enables AND-gates 674 and 675 of Control Unit 30 (FIG. 26) to generate the corresponding XSH1 or XSH6 signal, depending on whether the External Unit accorded recognition supplies the SHIFT1 or SHIFT6 signal.

The generation of the XSH1 or XSH6 signal results, in turn, in the immediate generation the respective SH1 or SH6 control signals. Thus, in Equation 16, the subordinate logical group XSH1 $\overline{XXEC}$ represents delivery of the SH1 signal and in Equation 17, the subordinate logical group XSH6 $\overline{XXEC}$ represents delivery of the SH6 signal. The SH1 and SH6 signals directly control, during the ensuing Operation Cycle, the amount of upward rotation performed on the data word to be transferred.

As was indicated in the preceding section, by the end of $t11$ of the Operation Cycle the data word to be involved in the transfer operation has been transferred to the M Register from the storage location identified by the external address. The requisite rotation is now initiated on this data word, so that by $t16$ the rotation has been completed and the data word returned to the M Register. During $t11$ to $t15$ of the Operation Cycle the $G0P_{1X}$ signal issues to enable the requisite rotation. Thus, in Equation 20, the subordinate logical group XLD OPSCY G1 represents the generation of the $G0P_{1X}$ signal during $t11-t15$ of the Operation Cycle wherein an externally controlled load operation is performed.

If the SH1 signal is provided by Control Unit 30, the contents of the M Register are supplied to the Arithmetic Unit during $t11-t15$ and during $t16$ are restored to the M Register, rotated upwardly by 1 digit position. Thus, in Equation 30, the subordinate logical group SH1 $G0P_{1X}$ represents the issuance of the $M_{i+1}$ CONT signal. The $M_{i+1}$ CONT signal transfers the contents of M Register 102 shifted upwardly by one digit position, through Memory Switch 19 to the Arithmetic Unit. Additionally, in Equation 32, the subordinate logical group SH1 $G0P_{1X}$ XLD represents the issuance of the $MR_{SW36}$ CONT signal. The $MR_{SW36}$ CONT signal transfers the most significant digit in the M Register through the Memory Switch to the least significant digit stage of the Arithmetic Unit. The output signals of the Arithmetic Unit are then gated into the M Register at $t16$ by the $ST_{MRU}$ and $ST_{MRL}$ control signals. In the respective Equations 26 and 27, the subordinate logical group XLD SH1 $G0P_{1X}$ represents the issuance of the $ST_{MRU}$ and $ST_{MRL}$ signals during $t11-t15$.

Thus, by $t16$ of the Operation Cycle, if the External Unit granted communication provides the SHIFT1 external command signal, the entire data word in the M Register has been rotated upwardly by one digit position. When the External Unit subsequently accepts the least significant digit in the M Register the digit received will be that which occupied the most significant position when the data word was first received by the M Register at $t11$ of the Operation Cycle. By providing the SHIFT1 signal during 36 successive externally controlled load operations directed to the same Memory Unit storage location, an External Unit receives in serial order the digits of a complete data word.

If the SH6 signal is provided by Control Unit 30, the contents of the M Register are supplied to the Arithmetic Unit during $t11-t15$ and during $t16$ are restored to the M Register, rotated upwardly by six digit positions. Thus, in Equation 31, the subordinate logical group SH6 $G0P_{1X}$ represents the issuance of the $M_{i+6}$ CONT signal. The $M_{i+6}$ CONT signal transfers the contents of M Register 102, shifted upwardly by six digit positions, through Memory Switch 19 to the Arithmetic Unit. Additionally, in Equation 33, the subordinate logical group SH6 $G0P_{1X}$ XLD represents the issuance of the $M_{i+6}$ ROT signal. The $M_{i+6}$ ROT signal transfers the most significant character in the M Register through the Memory Switch to the six least significant digit stages of the Arithmetic Unit. The output signals of the Arithmetic Unit are then gated into the M Register at $t16$ by the $ST_{MRU}$ and $ST_{MRL}$ control signals. In the respective Equations 26 and 27, the subordinate logical group XLD SH6 $G0P_{1X}$ represents the issuance of the $ST_{MRU}$ and $ST_{MRL}$ signals during $t11-t15$.

Thus, by $t16$ of the Operation Cycle, if the External Unit granted communication provides the SHIFT6 external command signal, the entire data word in the M Register has been rotated upwardly by six digit positions. When the External Unit subsequently accepts the least significant character in the M Register, the character received will be that which occupied the most significant character position when the data word was first received by the M Register at $t11$ of the Operation Cycle. By providing the SHIFT6 signal during six successive externally controlled load operations directed to the same Memory Unit storage location, an External Unit receives in serial order the characters of a complete data word.

*Store operation—General*

During an externally controlled store operation a single digit, a character, or a data word is transferred from the External Unit granted communication with the Data Processing Unit to a Memory Unit storage location identified by the external address signals. The ensuing description in the instant section relates to an externally controlled store operation wherein the external command supplement signals SHIFT1 and SHIFT6 are each binary 0's, but wherein the DIR/IND signal is a binary 1. The description herein is supplemented by reference to the preceding section "Load Operation—General."

The externally controlled store operation is controlled by the delivery of the external STORE command signal from the External Unit granted communication.

An External Unit is granted communication for controlling an externally controlled store operation when it supplies an interrupt pulse, a STORE command signal, signals representing data digits to be stored and external address signals representing a storage location for receiving the data digits supplied. The external address signals and the data digit signals are applied to respective gate sets of Input Data Switch 32 and the STORE command signal is applied to Input Command Switch 34. Upon recognition of the External Unit supplying these signals, the corresponding $IAN_{(i)}$ signal gates the STORE command signal through Input Command Switch 34 to Control Unit 30 and the external address and data digit signals through Input Data Switch 32 to respective gate sets of Register Switch 21.

When the XFF flip-flop is transferred to the 1-state at $t27$ of the timing cycle wherein the External Unit providing the described signals is recognized, AND-gates 673 and 676 of Control Unit 30 (FIG. 26) are enabled to generate the respective XST and XDIR control signals. In the Operation Cycle to follow, the XST signal controls the Data Processing Unit to transfer the data digits supplied by the External Unit to Memory Unit 18.

The succeeding timing cycle is provided as an Operation Cycle by transfer of the OPSCY flip-flop to the 1-state at $t1$. Thus, in Equation 7, the subordinate logical group XST XDIR $\overline{G1}$ represents the generation of the SET OPSCY signal for transferring the OPSCY flip-flop to the 1-state at $t1$ of the timing cycle immediately following the issuance of the XST signal. Additionally, at $t1$ of this timing cycle, the external address is transferred through Register Switch 21 and the upper half of Arithmetic Unit 20 to the AR Register of the Memory Unit. Thus, in Equation 41, the subordinate logical group, GLU $\overline{\text{INDCY}}$ XST represents the generation of the ADB CONT signal for transferring the external address signals through the Register Switch to the Arithmetic Unit. The output signals of the upper half of the Arithmetic unit are transferred to the AR Register at $t1$.

Memory Unit 18 enters its read period at clock period $t1$, and by the end of clock period $t11$ of the Operation Cycle a data word has been transferred to the M Register from the storage location identified by the external address which is now in the AR Register. All or a portion of this data word in the M Register is replaced during the subsequent portion of the Operation Cycle.

During $t11-t15$, the $G0P_{1X}$ signal issues to enable the requisite transfer of data digits for completing the externally store operation. In Equation 20, the subordinate logical combination XST OPSCY G1 represents the generation of the $G0P_{1X}$ signal during $t11-t15$ of the Operation Cycle. The $G0P_{1X}$ signal, in turn, enables the generation of the DA CONT and the $ST_{MRU}$ and $ST_{MRL}$ signals. Thus, in Equations 42, 26, and 27 the subordinate logical group XST $G0P_{1X}$ represents the generation of the respective DA CONT, ST $_{MRU}$, and $ST_{MRL}$ signals. The DA CONT signal transfers the data digit signals applied on the DA lines through Register Switch 21 to the Arithmetic Unit. The $ST_{MRU}$ and $ST_{MRL}$ signals gate the output signals delivered by the Arithmetic Unit into the M Register. Thus, by $t16$ of the Operation Cycle, the data digits supplied by the External Unit have been transferred through Register Switch 21 and Arithmetic Unit 20 to the M Register.

If the External Unit supplies but one data digit, this data digit is normally coupled by the Register Switch to the least significant digit stage of the Arithmetic Unit. In this instance, this single digit replaces the contents of the least significant digit position in the M Register at $t16$. If the External Unit supplies a single character, the six digits thereof are normally coupled to the six least significant digit stages of the Arithmetic Unit. In this instance, this single character replaces the contents of the least significant character position in the M Register at $t16$. If the External Unit supplies an entire data word, the entire contents of the M Register are replaced at $t16$.

Memory Unit 18 enters its write period following clock period $t16$ and by the end of the Operation Cycle, the modified contents of the M Register have been transferred to the storage location specified by the external address signals supplied from the External Unit. Thus, the externally controlled store operation is completed by the end of the Operation Cycle.

During $t16$ of the Operation Cycle, the XFF flip-flop is transferred to the 0-state, as represented in Equation 54 by the subordinate logical group, $\overline{\text{SET XFF}}$ G1 OPSCY XST. The transfer of the XFF flip-flop to the 0-state thereby immediately renders ineffective the XST and XDIR signals (Equations 57 and 60). Accordingly, during $t27$ of the Operation Cycle, the Data Processing Unit may initiate another externally controlled operation or may resume control over its normal sequence of operations.

STORE OPERATION—SHIFT MODIFICATIONS

During the previously described externally controlled store operation, the data word to be partially or completely replaced is shifted upwardly prior to transfer of the external data digits to the M Register, provided that either the SHIFT1 or the SHIFT6 command supplement signal is a binary 1 at the time the store operation is initiated.

If the SHIFT1 signal is a binary 1, the data word to be partially or completely replaced is shifted upwardly by one digit position prior to transfer of the external data digits to the M Register. This type of operation is normally employed when the External Unit supplies but one data digit. In such instance, by employing the SHIFT1 signal during the externally controlled store operation, a serial transfer of the individual digits of a data word into the externally addressed storage location is provided during a succession of such store operations.

If the SHIFT6 signal is a binary 1, the data word to be partially or completely replaced is shifted upwardly by six digit positions prior to transfer of the external data digits to the M Register. This type of operation is normally employed when the External Unit supplies one character. In this instance, by employing the SHIFT6 signal, a serial transfer of the characters of a data word is provided during a succession of such store operations.

When the External Unit providing the SHIFT1 or SHIFT6 signal is recognized, the corresponding $IAN_{(1)}$ signal gates the SHIFT1 or SHIFT6 command signal through Input Command Switch 34 to Control Unit 30. The subsequent transfer of the XFF flip-flop to the 1-state at $t27$ of the timing cycle enables AND-gates 674 and 675 of Control Unit 30 (FIG. 26) to generate the corresponding XSH1 or XSH6 signal, depending on whether the External Unit accorded recognition supplies the SHIFT1 or SHIFT6 signal.

The generation of the XSH1 or XSH6 signal results, in turn, in the immediate generation of the respective SH1 or SH6 control signals. Thus, in Equation 16, the subordinate logical group XSH1 $\overline{\text{XXEC}}$ represents delivery of the SH1 signal and in Equation 17, the subordinate logical group XSH6 $\overline{\text{XXEC}}$ represents delivery of the SH6 signal. The SH1 and SH6 signals directly control, during the ensuing Operation Cycle, the amount of upward shift performed on the data word to be partially or completely replaced.

As was indicated in the preceding section, by the end of $t11$ of the Operation Cycle, the data word intended for partial or complete replacement has been transferred to the M Register from the storage location identified by the external address. The requisite shift is now initiated on this data word, so that by $t16$ the shift has been completed and the data word returned to the M Register. During $t11$ to $t15$ of the Operation Cycle the $G0P_{1X}$ signal issues, and, in turn, enables the requisite data shift.

If the SH1 signal is provided by Control Unit 30, the contents of the M Register are supplied to the Arithmetic Unit during $t11-t15$ and during $t16$ are restored to the M Register, shifted upwardly by one digit position. Thus, in Equation 30, the subordinate logical group SH1 $G0P_{1X}$ represents the issuance of the $M_{i+1}$ CONT signal. The $M_{i+1}$ CONT signal transfers the contents of M Register 102, shifted upwardly by one digit position, through Memory Switch 19 to the Arithmetic Unit. The output signals of the Arithmetic Unit are then gated into the M Register at $t16$ by the $ST_{MRU}$ and $ST_{MRL}$ control signals. In the respective Equations 26 and 27, the subordinate logical group XST $G0P_{1X}$ represents the issuance of the $ST_{MRU}$ and $ST_{MRL}$ signals during $t11-t15$.

Thus, by $t16$ of the Operation Cycle, if the External Unit granted communication provides the SHIFT1 external command signal, the 2nd–36th digits in the M Register have been shifted upwardly by one digit position and restored to the 1st–35th digit positions of the M Register and the external data digit supplied by the External Unit has been transferred into the 36th digit position of the M Register. By providing the SHIFT1 signal during 36 successive externally controlled store operations directed to the same Memory Unit storage location, an External Unit transmits in serial order the digits of a complete data word to such storage location.

If the SH6 signal is provided by Control Unit 30, the contents of the M Register are supplied to the Arithmetic Unit during $t11$–$t15$ and during $t16$ are restored to the M Register, shifted upwardly by six digit positions. Thus, in Equation 31, the subordinate logical group $SH6 \, G0P_{1X}$ represents the issuance of the $M_{i+6}$ CONT signal. The $M_{i+6}$ CONT signal transfers the contents of the M Register 102, shifted upwardly by six digit positions, through Memory Switch 19 to the Arithmetic Unit. The output signals of the Arithmetic Unit are then gated into the M Register at $t16$ by the $ST_{MRU}$ and $ST_{MRL}$ control signals. In the respective Equations 26 and 27, the subordinate logical group $XST \, G0P_{1X}$ represents the issuance of the $ST_{MRU}$ and $ST_{MRL}$ signals during $t11$–$t15$.

Thus, by $t16$ of the Operation Cycle, if the External Unit granted communication provides the SHIFT6 external command signal, the 7th–36th digits in the M Register have been shifted upwardly by six digit positions and restored to the 1st–30th digit positions of the M Register and the external data character supplied by the External Unit has been transferred into the 31st–36th digit positions of the M Register. By providing the SHIFT6 signal during six successive externally controlled store operations directed to the same Memory Unit storage location, an External Unit transmits in serial order the characters of a complete data word to such storage location.

LOAD AND STORE OPERATIONS—INDIRECT MODIFICATIONS

During an externally controlled load or store operation, data may be transferred between an External Unit and a Memory Unit storage location and indirectly specified by the external address supplied by the External Unit. An operation of this type is initiated when the External Unit accorded recognition delivers either a LOAD command signal or a STORE command signal and wherein the DIR/IND signal delivered is a binary 0.

This type of operation normally comprises one or more Indirect Cycles followed by a single Operation Cycle, the Operation Cycle completing the externally controlled operation. However, one circumstance can occur which precludes completion of the externally controlled operation: in this event, the last Indirect Cycle is followed by an Instruction Cycle.

An External Unit is granted communication for controlling the instant operation when it supplies an interrupt pulse, a LOAD or STORE command signal, a DIR/IND command signal representing a binary 0, signals representing data digits to be stored if the STORE command signal is supplied, and external address signals indirectly representing a storage location for supplying or receiving the data digits to be transferred. The external address signals and the data digit signals, if present, are applied to respective gate sets of Input Data Switch 32. The LOAD or STORE command signal and the DIR/IND command signal are applied to Input Command Switch 34. Upon recognition of the External Unit supplying these signals, the corresponding $IAN_{(i)}$ signal gates the LOAD or STORE signal and the DIR/IND signal through Input Command Switch 34 to Control Unit 30 and the external address and data digit signals through Input Data Switch 32 to respective gate sets of Register Switch 21.

When the XFF flip-flop is transferred to the 1-state at $t27$ of the timing cycle wherein the External Unit providing the described signals is recognized, AND-gates 672, 673 and 677 of Control Unit 30 (FIG. 26) are enabled for generating the respective XLD or XST control signals and the INDX control signal. In the one or more Indirect Cycles to follow, the XLD or XST signal and the INDX signal control the Data Processing Unit to provide an address identifying a storage location for employment in the subsequent Operation Cycle. In the Operation Cycle, the XLD or XST signal controls the Data Processing Unit to transfer data between the storage location identified in the last Indirect Cycle and the External Unit provided communication.

The first timing cycle of the operation is provided as an Indirect Cycle by transfer of the INDCY flip-flop to the 1-state at $t1$. Thus, in Equation 9, the subordinate logical group $\overline{G1} \, INDX \, \overline{XXEC} \, \overline{INDCY}$ represents the generation of the SET INDCY signal for transferring the INDCY flip-flop to the 1-state at $t1$ of the timing cycle immediately following the issuance of the INDX signal. Additionally, at $t1$ of this timing cycle, the external address is transferred through Register Switch 21 and the upper half of Arithmetic Unit 20 to the AR Register of the Memory Unit. Thus, in Equation 41, the subordinate logical group $GLU \, \overline{INDCY} \, (XLD + XST)$ represents the generation of the ADB CONT signal for transferring the external address signals through the Register Switch to the Arithmetic Unit. The output signals of the upper half of the Arithmetic Unit are subsequently transferred to the AR Register at $t1$.

The Data Processing Unit now enters the first Indirect Cycle, under control of the XLD or XST control signals, the INDX control signal, and the INDCY signal. By the end of $t11$ of the Indirect Cycle, a channel control word has been transferred from the addressed storage location in Storage Unit 101 to the M Register. The contents of a channel control word–$(i)$ are the same as the contents of an indirect word–$(i)$, the only difference being in the designation. Thus, a channel control word is employed to control the "channeling" of data into or out of the Memory Unit for a particular External Unit.

Immediately upon transfer of the channel control word to the M Register the control portion of the word is tested, and the state of the contents of the control portion determines the mode of performance of the Data Processing Unit in the remaining portion of the Indirect Cycle (see Table I). The four modes of operation in the Indirect Cycle are again identified as the IMSCY, ITSCY, ISSCY, and IFSCY modes. The signals which control the mode of performance are correspondingly designated. The four modes of the instant Indirect Cycle are executed similarly to the corresponding four modes of the Indirect Cycle described in the preceding section entitled "Indirect Cycle." Accordingly, in the ensuing descriptions of operation in the four Indirect Cycle modes, only the significant relations to or distinctions from the preceding description will be provided. Wherever the phrase "indirect word" appears in the section "Indirect Cycle," it should be replaced with the phrase "channel control word" for applicability to an externally controlled operation.

IMSCY MODE

In the IMSCY mode of externally controlled operation, the address portion of the channel control word is employed either directly, or in modified form, for designating the storage location to be employed in the succeeding timing cycle. Accordingly, the external address supplied by the recognized External Unit provides an indication of the address of the storage location to be subsequently employed in the externally controlled load or store operation.

As described in the previous correspondingly labelled subsection, the modifier portion of the channel control word is tested to determine the manner of operation during the remainder of the IMSCY mode following $t11$.

If the modifier is MOD-N, the address portion of the channel control word is transferred, unmodified, to the AR Register and the next timing cycle is an Operation Cycle (see preceding DIAGRAM). The initiation of the following timing cycle as an Operation Cycle, is indicated by Equation 7, wherein the subordinate logical group $(XLD+XST) \, IMSCY \, NORM-MODS \, \overline{OPSCY}$ represents the generation of the SET OPSCY signal for transferring the OPSCY flip-flop to the 1-state during the next timing cycle.

If the modifier is MOD–A, MOD–Q, MOD–T, or MOD–X, the address portion of the channel control word is transferred, in modified form, to the AR Register and the next timing cycle is also an Operation Cycle. If the modifier is MOD–T, the address portion of the channel control word is incremented by the contents of the Tag Register and restored to the M Register by $t16$ of the Indirect Cycle. This modified address is subsequently transferred to the AR Register. If, however, the modifier is MOD–A, MOD–Q, or MOD–X, the address portion of the channel control word is incremented by the respective contents of the A Register, Q Register, or X Register at the time such address portion is transferred through the Arithmetic Unit to the AR Register. Initiation of the following timing cycle as an Operation Cycle for MOD–A, MOD–Q, MOD–T, and MOD–X is indicated by the same subordinate logical group of Equation 7 employed for MOD–N.

If the modifier is MOD–I, the address portion of the channel control word is transferred, unmodified, to the AR Register and the next timing cycle is an Indirect Cycle.

During the Operation Cycle following MOD–N, MOD–A, MOD–Q, MOD–T, and MOD–X the externally controlled load or store operation is executed in the manner described heretofore. At the beginning of the Operation Cycle, the XFF flip-flop remains in the 1-state, the transfer to the 0-state not being enabled during a normal Indirect Cycle, as indicated in Equation 54. The operation performed during the Operation Cycle involves the storage location address provided by the channel control word of the immediately preceding Indirect Cycle, if the modifier was MOD–N, or involves the address of such channel word as incremented by the contents of the A Register, Q Register, X Register, or Tag Register, if the modifier was MOD–A, MOD–Q, MOD–T, or MOD–X, respectively.

ITSCY MODE

In the ITSCY mode of externally controlled operation, the address portion of the channel control word is employed directly for designating successive Storage Unit locations for employment with a particular external command of a particular External Unit. Accordingly, the external address provided by the particular External Unit provides an indication of the location of the succession of addresses to be subsequently employed in the externally controlled load or store operation.

The ITSCY signal delivered in this mode indicates that the M Register holds a channel control word–B (FIG. 2) comprising a tally portion and an overflow digit for indicating the presence of an overflow from the tally portion. The tally portion represents the number of times the particular external command has been executed for the particular External Unit. At the same time that the tally is incremented, the address portion of the channel control word is also incremented. An overflow from the tally portion into the overflow digit provides a representation that the particular externally controlled operation has been executed a predetermined number of times.

The SHIFT1 and SHIFT6 external command signals are each provided as a binary 0 for the instant mode of operation.

During $t16$ of the ITSCY Indirect Cycle, the address and tally portions of the channel control word–B are both incremented by the addition of the quantity 1. Following $t16$, Memory Unit 18 executes a write period, restoring the incremented contents of the M Register to the original storage location of the channel control word. This channel control word is now ready for its next employment.

If incrementation of the tally portion creates no overflow into the MR–21 flip-flop, the incremented address portion of the channel control word–B is next transferred directly to the AR Register and the following timing cycle is an Operation Cycle (see preceding DIAGRAM). The AR Register receives this incremented address at $t1$ of the following Operation Cycle. The initiation of the following timing cycle as an Operation Cycle is indicated by Equation 7, wherein the subordinate logical group $(XLD+XST)$ ITSFCY $\overline{M21}$ $\overline{t1}$, represents the generation of the SET OPSCY signal for transferring the OPSCY flip-flop to the 1-state during the next timing cycle.

During the Operation Cycle, the load or store externally controlled operation is executed with respect to the address provided by the channel control word, as incremented during the immediately preceding Indirect Cycle. At the beginning of the Operation Cycle, the XFF flip-flop remains in the 1-state, the transfer to the 0-state not being enabled during the ITSCY mode, if no tally overflow occurs, Equation 54. Accordingly, the XLD or XST control signal remains effective to control the Operation Cycle.

If incrementation of the tally portion creates an overflow into the MR–21 flip-flop, the next timing cycle is an Instruction Cycle and the address portion of the channel control word is not transferred to the AR Register. Instead, the address transmitted to the AR Register is the address next following the address of the storage location from which the current channel control word–B has been retrieved (FIG. 5). Thus, if an overflow results from incrementation of the tally portion, instead of the external command being executed, a new instruction is executed. This new instruction may reinstate the original address and tally or may initiate a different type of operation.

A tally overflow prevents a succeeding Operation Cycle, as indicated by Equation 7, wherein the subordinate logical group $(XLD+XST)$ ITSFCY $\overline{M21}$ $\overline{OPSCY}$, represents suppression of the SET OPSCY signal when the MR–21 flip-flop is in the 1-state. In the absence of the OPSCY and INDCY signals, the next timing cycle is an Instruction Cycle (Equation 11). Upon the occurrence of the CP–1 clock pulse of the Instruction Cycle, the address in the AR Register has been incremented and restored to the AR Register. The XFF flip-flop is transferred to the 0-state at $t1$ of the Instruction Cycle, as indicated by Equation 54, wherein the subordinate logical group, ITSFCY M21 GLU, represents the generation of the RESET XFF signal for transferring the XFF flip-flop to the 0-state during the next timing cycle. Consequently, the Instruction Cycle following a tally overflow is not affected by an external command signal.

The ITSCY mode of externally controlled operation is employed to automatically transfer a predetermined number of data words between the Memory Unit and an External Unit, employing a group of successive storage locations, one location for each such data word. When the entire group of storage locations has been employed, the tally overflows, thereby providing execution of the instruction stored adjacent the channel control word being employed. This instruction usually provides for resuming execution of the particular external command by the particular External Unit at the beginning of the group of storage locations.

Table III provides an example of indirect words used in the ITSCY mode for executing a particular command four times. This table demonstrates the involvement of four successive storage locations. Therefore, Table III is directly applicable to the employment of a channel control word in the ITSCY mode for executing a particular external command four times and thereby involving four successive storage locations.

ISSCY MODE

In the ISSCY mode of externally controlled operations, the address portion of the channel control word is employed directly for designating successive Storage Unit locations for employment with a particular external command of a particular External Unit. Accordingly, the external address provided by the particular External Unit provides an indication of the location of the succession of addresses to be subsequently employed in the externally controlled load or store operation. However, in performing this function, the ISSCY mode provides for the particular external command to individually affect each digit held in all of the successive Storage Unit locations addressed.

The ISSCY signal delivered in this mode indicates that the M Register holds a channel control word–C (FIG. 2) comprising a subtally portion, a tally portion, and an overflow digit for indicating the presence of an overflow from the tally portion. The subtally portion represents the respective digit position of the storage location to be involved in the succeeding Operation Cycle and the tally portion represents the number of storage locations which have been involved in the series of ISSCY operations relating to the particular external command. The subtally portion is incremented for each execution of the external command. The subtally overflows into the tally when all 36 digits of a storage location have been involved by the external command. Thus, the tally portion is incremented after the particular external command has been executed 36 times. At the same time that the tally is incremented, the address portion of the channel control word is also incremented. An overflow from the tally portion into the overflow digit provides a representation that the particular externally controlled operation has involved a predetermined number of storage locations.

The SHIFT1 and SHIFT6 external command signals are each provided as a binary 0 for the instant mode of operation.

During $t16$ of the ISSCY Indirect Cycle, the subtally portion of the channel control word–C is incremented by the addition of the quantity 1. Additionally, at $t16$ of those ISSCY Indirect Cycles wherein the subtally portion overflows and adds the quantity 1 to the tally portion, the address portion of the channel control word–C is also incremented by the addition of the quantity 1. In these cycles wherein the subtally portion overflows, the subtally portion returns to zero. Following $t16$, Memory Unit 18 executes a write period, restoring the incremented contents of the M Register to the original storage location of the channel control word. This channel control word is now ready for its next employment.

During the timing cycle wherein an ISSCY Indirec Cycle is next executed, following a corresponding ISSCY Indirect Cycle wherein the subtally portion overflowed into the tally portion and the subtally was restored to zero, the quantity 28, in addition to the quantity 1, is added to the subtally. By immediately modifying the subtally to represent the number 29, the ISSCY mode effects the execution of only 36 operations on the individual digits of a particular storage location before subtally overflow and the next storage location is addressed.

If incrementation of the tally portion creats no overflow into the MR–21 flip-flop, the incremented address portion of the channel control word–C is next transferred directly to the AR Register, and the following timing cycle is an Operation Cycle (see preceding DIAGRAM). The AR Register receives this incremented address at $t1$ of the following Operation Cycle. The initiation of the following timing cycle as an Operation Cycle is indicated by Equation 7, wherein the subordinate logical group $(XLD+XST)$ $ITSFCY$ $\overline{JT21}$ $\overline{t1}$, represents the generation of the SET OPSCY signal for transferring the OPSCY flip-flop to the 1-state during the next timing cycle.

During the Operation Cycle, a load or store externally controlled operation is executed with respect to a particular digit of the storage location indicated by the address in the AR Register. At the beginning of the Operation Cycle, the XFF flip-flop remains in the 1-state, the transfer to the 0-state being inhibited during the ISSCY mode if no tally overflow occurs (Equation 54). Accordingly, the XLD or XST control signal remains effective to control the Operation Cycle.

At the time that the Operation Cycle is entered, the SH1–FF flip-flop is transferred to the 1-state. This flip-flop thereupon provides for an upward shift, by one digit position, of the data word retrieved from the identified storage location and transferred through the Memory Switch during the Operation Cycle, if the XST control signal is a binary 1. However, the SH1–FF flip-flop provides for an upward rotation, by one digit position, of the data word retrieved from the identified storage location and transferred through the Memory Switch during the Operation Cycle, if the XLD control signal is a binary 1. Thus, the SH1–FF flip-flop is the mechanism by which 36 successive executions of a particular external command in the ISSCY mode of operation affects, individually, each one of the 36 digit positions of a storage location.

The transfer of the SH1–FF flip-flop to the 1-state at the beginning of the Operation Cycle is indicated by Equation 12, which represents the generation of the SET SH1 signal during $t27$–$t30$ of the ISSCY Indirect Cycle. The consequent SH1 signal (Equation 16) directly controls the upward shift or rotation, by one digit position, of the data word retrieved from the identified storage location during the Operation Cycle. For both types of externally controlled operations, the contents of the M Register are supplied to the Arithmetic Unit during $t11$–$t15$, shifted upwardly by one digit position. Thus, in Equation 30, the subordinate logical group SH1 $G0P_{1X}$ represents the issuance of the $M_{I+1}$ CONT signal for transferring the contents of the M Register, shifted upwardly by one digit position, through Memory Switch 19 to Arithmetic Unit 20. Additionally, in Equation 32, the subordinate logical group SH1 $G0P_{1X}$ XLD represents the issuance of the $MR_{SW36}$ CONT signal for transferring the most significant digit in the M Register through the Memory Switch to the least significant digit stage of the Arithmetic Unit for the externally controlled load operation.

Accordingly, during the externally controlled store operation the single digit supplied by the External Unit is transferred through the Register Switch and into the 36th digit position of the M Register (Equation 42) at the same time that the original contents of the 2nd–36th digit positions of the M Register are shifted upwardly by one digit position. In this manner 36 successive externally controlled store operations, employing the ISSCY indirect mode, transfer serially the 36 digits of a full data word into the addressed storage location.

During the externally controlled load operation, the entire contents of the M Register are rotated upwardly by one digit position during the Operation Cycle. At $t1$ of the next following cycle an output pulse is transmitted to the External Unit granted recognition during the current externally controlled operation, thereby enabling such External Unit to accept the digit contents of the MR–36 flip-flop at this time. In this manner, during 36 successive executions of the externally controlled load operation, employing the ISSCY indirect mode, the 36 digits of a particular storage location are transmitted serially to an External Unit.

If incrementation of the tally portion creates an overflow into the MR–21 flip-flop, the next timing cycle is an Instruction Cycle and the address portion of the channel control word is not transferred to the AR Register. Instead, the address transmitted to the AR Register is the address next following the address of the storage location from which the current channel control word–C has been retrieved (FIG. 5). Thus, if an overflow results by incrementation of the tally portion, instead of the external command being executed, a new instruction is executed. This new instruction may reinstate the original address, tally, and subtally portions or may initiate a different type of operation.

A tally overflow prevents a succeeding Operation Cycle, as indicated by Equation 7, wherein the subordinate logical group $(XLD+XST)$ $ITSFCY$ $\overline{M21}$ $\overline{OPSCY}$ represents suppression of the SET OPSCY signal when the MR–21 flip-flop is in the 1-state. In the absence of the OPSCY and INDCY signals, the next timing cycle is an Instruction Cycle (Equation 11). Upon the occurrence of the CP–1 clock pulse of the Instruction Cycle, the address in the AR Register has been incremented and restored to the AR Register. The XFF flip-flop is transferred to the 0-state at $t1$ of the Instruction Cycle, as indicated by Equation 54, wherein the subordinate logical group, ITSFCY M21 GLU, represents the generation of the RESET XFF signal for transferring the XFF flip-flop to the 0-state. Consequently, the Instruction Cycle following a tally overflow is not affected by an external command signal.

The ISSCY mode of externally controlled operation is employed to transfer serially the digits of a predetermined number of data words between the Memory Unit and an External Unit, employing a group of successive storage locations, one location for each such data word. When the entire group of storage locations has been employed, the tally overflows, thereby providing for execution of the instruction stored adjacent the channel control word being employed. This instruction usually provides for resuming execution of the particular external command by the particular External Unit at the beginning of the group of storage locations.

Tables IV and V provide an example of indirect words used in the ISSCY mode for executing a particular external command 144 times. These tables demonstrate the involvement of four successive storage locations. Therefore, Tables IV and V are directly applicable to the employment of a channel control word in the ISSCY mode for executing a particular external command 144 times, thereby involving the serial transfer of the 36 digits of four successive storage locations.

IFSCY MODE

In the IFSCY mode of externally controlled operations, the address portion of the channel control word is employed directly for designating successive Storage Unit locations for employment with a particular external command of a particular External Unit. Accordingly, the external address provided by the particular External Unit provides an indication of the location of the succession of addresses to be subsequently employed in the externally controlled load or store operation. However, in performing this function, the IFSCY mode provides for the particular external command to individually affect each character held in all of the successive Storage Unit locations addressed.

The IFSCY signal delivered in this mode indicates that the M Register holds a channel control word–C (FIG. 2) comprising a subtally portion, a tally portion, and an overflow digit for indicating the presence of an overflow from the tally portion. The subtally portion represents the respective character position of the storage location to be involved in the succeeding Operation Cycle and the tally portion represents the number of storage locations which have been involved in the series of IFSCY operations relating to the particular external command. The subtally portion is incremented for each execution of the external command. The subtally overflows into the tally when all six characters of a storage location have been involved by the external command. Thus, the tally portion is incremented after the particular external command has been executed six times. At the same time that the tally is incremented, the address portion of the channel control word is also incremented. An overflow from the tally portion into the overflow digit provides a representation that the particular externally controlled operation has involved a predetermined number of storage locations.

The SHIFT1 and SHIFT6 external command signals are each provided as a binary 0 for the instant mode of operation.

During $t16$ of the IFSCY Indirect Cycle, the subtally portion of the channel control word–C is incremented by the addition of the quantity 1. Additionally, at $t16$ of those IFSCY Indirect Cycles wherein the subtally overflows and adds the quantity 1 to the tally portion, the address portion of the channel control word–C is also incremented by the addition of the quantity 1. In those cycles wherein the subtally portion overflows, the subtally portion returns to zero. Following $t16$, Memory Unit 18 executes a write period, restoring the incremented contents of the M Register to the original storage location of the channel control word. This channel control word is now ready for its next employment.

During the timing cycle wherein an IFSCY Indirect Cycle is next executed, following a corresponding IFSCY Indirect Cycle wherein the subtally portion overflowed into the tally portion and the subtally was restored to zero, the quantity 58, in addition to the quantity 1, is added to the subtally. By immediately modifying the subtally to represent the number 59, the IFSCY mode effects the execution of only six operations on the individual characters of a particular storage location before subtally overflow and the next storage location is addressed.

If incrementation of the tally portion creates no overflow into the MR–21 flip-flop, the incremented address portion of the channel control word–C is next transferred directly to the AR Register, and the following timing cycle is an Operation Cycle. The AR Register receives this incremented address at $t1$ of the following Operation Cycle. The initiation of the following timing cycle as an Operation Cycle is indicated by Equation 7, wherein the subordinate logical group $(XLD+XST)$ $ITSFCY$ $\overline{M21}$ $\overline{G1}$, represents the generation of the SET OPSCY signal for transferring the OPSCY flip-flop to the 1-state during the next timing cycle.

During the Operation Cycle, a load or store externally controlled operation is executed with respect to a particular character of the storage location indicated by the address in the AR Register. At the beginning of the Operation Cycle, the XFF flip-flop remains in the 1-state, the transfer to the 0-state being inhibited during the IFSCY mode if no tally overflow occurs (Equation 54). Accordingly, the XLD or XST control signal remains effective to control the Operation Cycle.

At the time that the Operation Cycle is entered, the SH6–FF flip-flop is transferred to the 1-state. This flip-flop thereupon provides for an upward shift, by six digit positions, of the data word retrieved from the identified storage location and transferred through the Memory Switch during the Operation Cycle, if the XST control signal is a binary 1. However, the SH6–FF flip-flop provides for an upward rotation, by six digit positions, of the data word retrieved from the identified storage location and transferred through the Memory Switch during the Operation Cycle, if the XLD control signal is a binary 1. Thus, the SH6–FF flip-flop is the mechanism by which six succesive executions of a particular external command in the IFSCY mode of operation affects, individually, each one of the six character positions of a storage location.

The transfer of the SH6–FF flip-flop to the 1-state at the beginning of the Operation Cycle is indicated by Equation 14, which represents the generation of the SET SH6 signal during $t27$–$t30$ of the IFSCY Indirect Cycle. The consequent SH6 signal (Equation 17) directly controls the upward shift or rotation, by six digit positions, of the data word retrieved from the identified storage location during the Operation Cycle. For both types of externally controlled operations, the contents of the M Register are supplied to the Arithmetic Unit during $t11$–$t15$, shifted upwardly by six digit positions. Thus, in Equation 31, the subordinate logical group SH6 G0P$_{1x}$ represents the issuance of the M$_{1+6}$ CONT signal for transferring the contents of the M Register, shifted upwardly by six digit positions, through Memory Switch 19 to Arithmetic Unit 20. Additionally, in Equation 33, the subordinate logical group SH6 G0P$_{1x}$ XLD represents the issuance of the M$_{1+6}$ ROT signal for transferring the six most significant digits in the M Register through the Memory Switch to the six least significant digit stages of the Arithmetic Unit for the externally controlled load operation.

Accordingly, during the externally controlled store operation the six digits supplied by the External Unit are transferred through the Register Switch and into the 31st–36th digit positions of the M Register (Equation 42) at the same time that the original contents of the 7th–36th digit positions of the M Register are shifted upwardly by six digit positions. In this manner six successive externally controlled store operations, employing the IFSCY indirect mode, transfer serially the six characters of a full data word into the addressed storage location.

During the externally controlled load operation, the entire contents of the M Register are rotated upwardly by six digit positions during the Operation Cycle. At $t1$ of the next-following cycle an output pulse is transmitted to the External Unit granted recognition during the current externally controlled operation, thereby enabling such External Unit to accept the digit contents of the MR–31 to MR–36 flip-flops at this time. In this manner, during six successive executions of the externally controlled load operation, employing the IFSCY indirect mode, the six characters of a particular storage location are transmitted serially to an External Unit.

If incrementation of the tally portion creates an overflow into the MR–21 flip-flop, the next timing cycle is an Instruction Cycle and the address portion of the channel control word is not transferred to the AR Register. Instead, the address transmitted to the AR Register is the address next following the address of the storage location from which the current channel control word–C has been retrieved. Thus, if an overflow results by incrementation of the tally portion, instead of the external command being executed, a new instruction is executed. This new instruction may reinstate the original address, tally, and subtally portions or may initiate a different type of operation.

A tally overflow prevents a succeeding Operation Cycle, as indicated by Equation 7, wherein the subordinate logical group $(XLD+XST)$ $ITSFCY$ $\overline{M21}$ $\overline{OPSCY}$ represents suppression of the SET OPSCY signal when the MR–21 flip-flop is in the 1-state. In the absence of the OPSCY and INDCY signals, the next timing cycle is an Instruction Cycle (Equation 11). Upon the occurrence of the CP–1 clock pulse of the Instruction Cycle, the address in the AR Register has been incremented and restored to the AR Register. The XFF flip-flop is transferred to the 0-state at $t1$ of the Instruction Cycle, as indicated by Equation 54, wherein the subordinate logical group ITSFCY M21 GLU, represents the generation of the RESET XFF signal for transferring the XFF flip-flop to the 0-state. Consequently, the Instruction Cycle following a tally overflow is not affected by an external command signal.

The IFSCY mode of externally controlled operation is employed to transfer serially the characters of a predetermined number of data words between the Memory Unit and an External Unit, employing a group of successive storage locations, one location for each such data word. When the entire group of storage locations has been employed, the tally overflows, thereby providing for execution of the instruction stored adjacent the channel control word being employed. This instruction usually provides for resuming execution of the particular external command by the particular External Unit at the beginning of the group of storage locations.

Tables VI and VII provide an example of indirect words used in the IFSCY mode for executing a particular external command 24 times. These tables demonstrate the involvement of four successive storage locations. Therefore, Tables VI and VII are directly applicable to the employment of a channel control word in the IFSCY mode for executing a particular external command 24 times, thereby involving the serial transfer of the six characters of four successive storage locations.

*Externally initiated instruction operation*

During the external operation for initiating an instruction, execution of an instruction in the storage location of the Memory Unit identified by the external address signals is initiated. External command supplement signals are not recognized in this operation.

The externally initiated instruction operation is controlled by an implicit external command; i.e., by the absence of both the external LOAD and external STORE command signals when an External Unit is granted communication with the Data Processing Unit.

An External Unit is granted communication for controlling an externally initiated instruction operation when it supplies an interrupt pulse, LOAD and STORE command signals each representing a binary 0, and external address signals representing the storage location of the instruction to be executed. The external address signals are applied to Input Data Switch 32 and the LOAD and STORE command signals are applied to Input Command Switch 34. Upon the recognition of the External Unit providing these signals, the corresponding IAN$_{(i)}$ signal becomes a binary 1. The IAN$_{(i)}$ signal provides for delivery of the INT–PRES signal by the priority chain, gates the external address signals through Input Data Switch 32 to Register Switch 21, and gates the LOAD and STORE command signals through Input Command Switch 34 to Control Unit 30.

The XFF flip-flop next transfers to the 1-state at $t27$ of the timing cycle wherein the INT–PRES signal occurs, as represented by Equation 53. In its 1-state the XFF flip-flop enables AND-gates 671–673 of Control Unit 30 (FIG. 26). AND-gate 671 thereupon delivers the XXEC control signal representing a binary 1 and AND-gates 672 and 673 deliver signals representing binary 0's. The operation of AND-gate 671 is represented by Equation 55, wherein there is indicated that when the external LOAD and STORE command signals are binary 0's, the XXEC control signal is a binary 1. The XXEC control signal is thus rendered effective at $t27$ of the timing cycle wherein the initiating External Unit is granted communication. In the timing cycle which follows, the XXEC signal controls the Data Processing Unit to execute the instruction stored in the storage location identified by the external address signals provided by the recognized External Unit.

The succeeding timing cycle is provided as an Instruction Cycle by the absence of the SET OPSCY and SET INDCY signals during $t27$–$t30$ of the timing cycle wherein the External Unit is recognized. The inhibiting of the SET OPSCY signal is represented by Equation 7, wherein the subordinate logical group $$(XLD+XST)\ XDIR\ \overline{G1}$$

represents a binary 0 since each of the XLD and XST control signals is a binary 0. The inhibiting of the SET INDCY signal is represented by Equation 9, wherein the subordinate logical group, $\overline{G1}$ INDX $\overline{XXEC}$ $\overline{INDCY}$, represents a binary 0 since the XXEC signal is a binary 1.

Thus, the failure of either of the OPSCY or INDCY flip-flops to be in the 1-state at t1 of the next timing cycle provides that this timing cycle is an Instruction Cycle (Equation 11). The inhibiting effect of the XXEC signal on the SET INDCY signal and on the SH1 and SH6 signals (Equations 16 and 17) prevents any external command supplement signal from influencing the operation.

Therefore, beginning at the following t1 clock period an Instruction Cycle is executed. However, this is not a normal Instruction Cycle, wherein the address of the instruction is obtained from the contents of Instruction Counter 26. Instead, during t27–t30 of the timing cycle wherein the External Unit is recognized the XXEC signal inhibits entry into such a normal Instruction Cycle and thereby prevents transfer of the incremented Instruction Counter address to the AR Register. This effect is indicated by Equations 40 and 44, wherein the subordinate logical group NORMAL–INLU is not a binary 1, and therefore the contents of the Instruction Counter are not applied to the Arithmetic Unit ($ICT\ CONT=0$) and the CARRY–18 signal is not applied to the Arithmetic Unit. The XXEC signal inhibits the PRENORM–INLU signal and, therefore, the NORMAL–INLU signal as indicated by Equations 22 and 23. Thus, in Equation 22, the subordinate logical group INLU, $\overline{XXEC}\ \overline{ITSFCY}\ \overline{M21}\ \overline{OIC}$, represents the effect of the XXEC signal on inhibiting the PRENORM–INLU signal.

Therefore, the Instruction Cycle is not provided with an address from the Instruction Counter. Instead, an address is provided by the external address signals. This is indicated by Equation 41, wherein the subordinate logical group, GLU $\overline{INDCY}$ XXEC, represents the generation of the ADB CONT signal during t27–t30 of the timing cycle wherein the External Unit is recognized. The ADB Cont signal transfers the external address signals supplied to Register Switch 21 to the upper half of the Arithmetic Unit. Therefore, at t1 of the Instruction Cycle the output signals of the Arithmetic Unit, which represent this external address, are transmitted to the AR Register. Accordingly, the instruction executed during the Instruction Cycle following recognition of an External Unit supplying no LOAD or STORE external signals is that obtained from the storage location identified by the external address signals provided by such External Unit.

Additionally, at t1 Command Register 10 is cleared (FIG. 8), as indicated by Equation 5, wherein the subordinate logical combination, XXEC GLU TAS, represents the generation of the RESET IR₁ signal for transferring the flip-flops of the Command Register to the 0-state. Accordingly, the Command Register is now prepared to receive the command portion of the required instruction.

At t11 of the Instruction Cycle, the addressed instruction is transferred to the M Register and the instruction is executed according to its contents.

During t16 of the Instruction Cycle, the XFF flip-flop is transferred to the 0-state, as indicated by Equation 54, wherein the subordinate logical group $\overline{SET\ XFF}$ G1 INSCY represents the generation of the RESET XFF signal for transferring the XFF flip-flop to the 0-state. Simultaneously with the transfer of the XFF flip-flop to the 0-state, the XXEC signal transfers to the 0-state (Equation 55) and the Data Processing Unit resumes independent control of the execution of the instruction which was placed in the M Register from the storage location addressed by the External Unit.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a data processing system, the combination comprising: a data processing unit comprising command executing means for executing a plurality of different operations on data items received by said system, each of said data items comprising a plurality of data elements, each of said operations being executed in response to a respective command signal group received by said means, and controllable means for supplying command signal groups in sequence to said command executing means; a data handling unit disposed externally to said data processing unit, said data handling unit being adapted to provide first and second control signals, said first control signal representing a simultaneous transfer of a plurality of the elements of a data item and said second control signal representing a sequential transfer of the elements of a data item, said data handling unit supplying one of said control signals when said data handling unit must employ said data processing unit to effect a transfer of data elements between said data handling unit and said data processing unit; said data processing unit further comprising means responsive to said first control signal for providing for the parallel transfer of said plurality of data elements between said data handling unit and said data processing unit, and means responsive to said second control signal for providing for the serial transfer of data elements between said data handling unit and said data processing unit.

2. In a data processing system, the combination comprising: a data processing unit comprising command executing means for executing a plurality of different operations on data items received by said system, each of said data items comprising a plurality of data elements, each of said operations being executed in response to a respective command signal group received by said means, and controllable means, when enabled, for supplying command signal groups in sequence to said command executing means; a data handling unit disposed externally to said data processing unit, said data handling unit being adapted to provide first, second, and third control signals, said first control signal representing a simultaneous transfer of all of the data elements of a data item, said second control signal representing a simultaneous transfer of a set of the data elements of a data item, and said third control signal representing a transfer of one of said data elements, said data handling unit supplying one of said control signals when said data handling unit must employ said data processing unit to effect a transfer of data elements between said data handling unit and said data processing unit; said data processing unit further comprising means responsive to said first control signal for providing for the parallel transfer of all of the data elements of a data item between said data handling unit and said data processing unit, means responsive to said second control signal for providing for the parallel transfer of all of the data elements of said set between said data handling unit and said data processing unit, and means responsive to said third control signal for providing for the transfer of one of said data elements between said data handling unit and said data processing unit.

3. In a data processing system, the combination comprising: a data processing unit comprising command executing means for executing a plurality of different operations on data items received by said system, each of said data items comprising a plurality of data elements, each of said operations being executed in response to a respective command signal group received by said means, and controllable means, when enabled, for supplying command signal groups in sequence to said command executing means; a data handling unit disposed externally to said data processing unit, said data handling unit being adapted to provide first and second control signals, said first control signal representing a simultaneous transfer of a plurality of the elements of a data item and said second control signal representing a sequential transfer of the elements of a data item, said data handling unit supplying one of said control signals when said data handling unit must employ said data processing unit to effect a transfer of data elements between said data handling unit and said data processing unit; said data processing unit further comprising means responsive to one of said control signals for disabling said controllable means, means responsive to said first control signal for providing for the parallel transfer of said plurality of data elements between said data handling unit and said data processing unit, and means responsive to said second control signal for providing for the serial transfer of data elements between said data handling unit and said data processing unit.

4. In a data processing system, the combination comprising: a data processing unit comprising command executing means for executing a plurality of different operations on data items received by said system, each of said data items comprising a plurality of data elements, each of said operations being executed in response to a respective command signal group received by said means, and controllable means, when enabled, for supplying command signal groups in sequence to said command executing means; a data handling unit disposed externally to said data processing unit, said data handling unit being adapted to provide first, second, and third control signals, said first control signal representing a simultaneous transfer of all of the data elements of a data item, said second control signal representing a simultaneous transfer of a set of the data elements of a data item, and said third control signal representing a transfer of one of said data elements, said data handling unit supplying one of said control signals when said data handling unit must employ said data processing unit to effect a transfer of data elements between said data handling unit and said data processing unit; said data processing unit further comprising means responsive to one of said control signals for disabling said controllable means, means responsive to said first control signal for providing for the parallel transfer of all of the data elements of a data item between said data handling unit and said data processing unit, means responsive to said second control signal for providing for the parallel transfer of all of the data elements of said set between said data handling unit and said data processing unit, and means responsive to said third control signal for providing for the transfer of one of said data elements between said data handling unit and said data processing unit.

5. In a data processing system, the combination comprising: a data processing unit comprising command executing means for executing a plurality of different operations on data items received by said system, each of said data items comprising a plurality of data elements, each of said operations being executed in response to a respective command signal group received by said means, and controllable means, when enabled, for supplying command signal groups in sequence to said command executing means; a data handling unit disposed externally to said data processing unit, said data handling unit being adapted to provide first, second, and third control signals, said first control signal representing a simultaneous transfer of all of the data elements of a data item, said second control signal representing a parallel transfer of a set of the data elements of a data item, and said third control signal representing a transfer of one of said data elements, said data handling unit supplying one of said control signals and an interrupt signal when said data handling unit must employ said data processing unit to effect a transfer of data elements between said data handling unit and said data processing unit; said data processing unit further comprising means responsive to said interrupt signal for disabling said controllable means, means responsive to said first control signal for providing for the parallel transfer of all of the data elements of a data item between said data handling unit and said data processing unit, means responsive to said second control signal for providing for the parallel transfer of all of the data elements of said set between said data handling unit and said data processing unit, and means responsive to said third control signal for providing for the transfer of one of said data elements between said data handling unit and said data processing unit.

6. In a data processing system, the combination comprising: a data processing unit comprising command executing means for executing a plurality of different operations on data items received by said system, each of said data items comprising a plurality of data characters and each of said characters comprising a plurality of data digits, each of said operations being executed in response to a respective command signal group received by said means, and controllable means for supplying command signal groups in sequence to said command executing means; a data handling unit disposed externally to said data processing unit, said data handling unit being adapted to provide first, second, and third control signals, said first control signal representing the transfer of a complete data item, said second control signal representing the transfer of a complete character, and said third control signal representing the transfer of a digit, said data handling unit supplying one of said control signals when said data handling unit must employ said data processing unit to effect a transfer of data between said data handling unit and said data processing unit; said data processing unit further comprising means responsive to said first control signal for providing for the parallel transfer of all of the digits of a data item between said data handling unit and said data processing unit, means responsive to said second control signal for providing for the parallel transfer of all of the digits of a data character between said data handling unit and said data processing unit, and means responsive to said third control signal for providing for the transfer of a data digit between said data handling unit and said data processing unit.

7. In a data processing system, the combination comprising: a data processing unit comprising command executing means for executing a plurality of different operations on data items received by said system, each of said data items comprising a plurality of data elements, each of said operations being executed in response to a respective command signal group received by said means, and controllable means for supplying command signal groups in sequence to said command executing means; a plurality of data handling units disposed externally to said data processing unit, each of said data handling units being adapted to provide first and second control signals, said first control signal representing a simultaneous transfer of a plurality of the elements of a data item and said second control signal representing a sequential transfer of the elements of a data item, each one of said data handling units supplying one of said control signals when said one data handling unit must employ said data processing unit to effect a transfer of data elements between said one data handling unit and said data processing unit; said data processing unit further comprising means responsive to the first control signal supplied by said one data handling unit for providing for the parallel transfer of said plurality of data elements between said one data handling unit and said data processing unit, and means responsive to the second control signal supplied by said one data handling unit for providing for the serial transfer of data elements between said one data handling unit and said data processing unit.

8. In a data processing system, the combination comprising: a data processing unit comprising command executing means for executing a plurality of different operations on data items received by said system, each of said data items comprising a plurality of data elements, each of said operations being executed in response to a respective command signal group received by said means, and controllable means, when enabled, for supplying command signal groups in sequence to said command executing means; a plurality of data handling units disposed externally to said data processing unit, each of said data handling units being adapted to provide first, second, and third control signals, said first control signal representing a simultaneous transfer of all of the data elements of a data item, said second control signal representing a simultaneous transfer of a set of the data elements of a data item, and said third control signal representing a transfer of one of said data elements, each one of said data handling units supplying one of said control signals when said one data handling unit must employ said data processing unit to effect a transfer of data elements between said one data handling unit and said data processing unit; said data processing unit further comprising means responsive to the first control signal supplied by said one data handling unit for providing for the parallel transfer of all of the data elements of a data item between said one data handling unit and said data processing unit, means responsive to the second control signal supplied by said one data handling unit for providing for the parallel transfer of all of the data elements of said set between said one data handling unit and said data processing unit, and means responsive to the third control signal supplied by said one data handling unit for providing for the transfer of one of said data elements between said one data handling unit and said data processing unit.

9. In a data processing system, the combination comprising: a data processing unit comprising command executing means for executing a plurality of different operations on data items received by said system, each of said data items comprising a plurality of data elements, each of said operations being executed in response to a respective command signal group received by said means, and controllable means, when enabled, for supplying command signal groups in sequence to said command executing means; a plurality of data handling units disposed externally to said data processing unit, each of said data handling units being adapted to provide first, second, and third control signals, said first control signal representing a simultaneous transfer of all of the data elements of a data item, said second control signal representing a parallel transfer of a set of the data elements of a data item, and said third control signal representing a transfer of one of said data elements, each one of said data handling units supplying one of said control signals and an interrupt signal when said one data handling unit must employ said data processing unit to effect a transfer of data elements between said one data handling unit and said data processing unit; said data processing unit further comprising means responsive to said interrupt signal for disabling said controllable means, means responsive to the first control signal supplied by said one data handling unit for providing for the parallel transfer of all of the data elements of a data item between said one data handling unit and said data processing unit, means responsive to the second control signal supplied by said one data handling unit for providing for the parallel transfer of all of the data elements of said set between said one data handling unit and said data processing unit, and means responsive to the third control signal supplied by said one data handling unit for providing for the transfer of one of said data elements between said one data handling unit and said data processing unit.

No references cited.

ROBERT C. BAILEY, *Primary Examiner.*

G. D. SHAW, *Assistant Examiner.*